US012544439B2

(12) United States Patent
Dittel

(10) Patent No.: US 12,544,439 B2
(45) Date of Patent: Feb. 10, 2026

(54) METHOD OF TREATING AUTOIMMUNE AND INFLAMMATORY DISEASES USING B CELLS

(71) Applicant: VERSITI BLOOD RESEARCH INSTITUTE FOUNDATION, INC., Milwaukee, WI (US)

(72) Inventor: Bonnie N. Dittel, Milwaukee, WI (US)

(73) Assignee: VERSITI BLOOD RESEARCH INSTITUTE FOUNDATION, INC., Milwaukee, WI (US)

( * ) Notice: Subject to any disclaimer, the term of this patent is extended or adjusted under 35 U.S.C. 154(b) by 1178 days.

(21) Appl. No.: 17/413,456

(22) PCT Filed: Dec. 10, 2019

(86) PCT No.: PCT/US2019/065472
§ 371 (c)(1),
(2) Date: Jun. 11, 2021

(87) PCT Pub. No.: WO2020/123502
PCT Pub. Date: Jun. 18, 2020

(65) Prior Publication Data
US 2022/0054547 A1 Feb. 24, 2022

Related U.S. Application Data

(60) Provisional application No. 62/779,275, filed on Dec. 13, 2018.

(51) Int. Cl.
*A61K 40/24* (2025.01)
*A61K 40/13* (2025.01)
*A61K 40/22* (2025.01)
*A61K 40/41* (2025.01)
*A61P 37/06* (2006.01)

(52) U.S. Cl.
CPC .............. *A61K 40/24* (2025.01); *A61K 40/13* (2025.01); *A61K 40/22* (2025.01); *A61K 40/416* (2025.01); *A61P 37/06* (2018.01); *A61K 2239/31* (2023.05); *A61K 2239/38* (2023.05)

(58) Field of Classification Search
CPC .......... A61K 39/4622; A61K 39/4612; A61K 39/4621; A61K 39/46433; A61K 2239/31; A61K 2239/38; A61P 37/06; A61P 29/00; A61P 37/02
See application file for complete search history.

(56) References Cited

U.S. PATENT DOCUMENTS

| 2012/0052059 A1 | 3/2012 | Rothstein et al. | |
|---|---|---|---|
| 2014/0065118 A1* | 3/2014 | Tedder | A61P 19/08 435/7.1 |
| 2016/0355783 A1* | 12/2016 | Hyde | C07K 16/44 |

FOREIGN PATENT DOCUMENTS

| WO | WO-2017093969 A1 * | 6/2017 | ......... A61K 31/7088 |
|---|---|---|---|
| WO | WO-2018031811 A1 * | 2/2018 | ........... A61K 31/475 |

OTHER PUBLICATIONS

Ray, A and Dittel, BN, "Mechanisms of Regulatory B cell Function in Autoimmune and Inflammatory Diseases beyond IL-10", 2017, Journal of Clinical Medicine, 6(12), 1-7. (Year: 2017).*
Dittel, BN, "Mechanisms of Regulatory B Cell Function", 2013, National Institutes of Health, URL: https://grantome.com/grant/NIH/R56-AI106672-01. (Year: 2013).*
Moratto, D et. al. "Combined decrease of defined B and T cell subsets in a group of common variable immunodeficiency patients", 2006, Critical Immunology, 121, 203-214. (Year: 2006).*
Mensah, FFK et. al. "CD24 Expression and B Cell Maturation Shows a Novel Link With Energy Metabolism: Potential Implications for Patients With Myalgic Encephalomyelitis/Chronic Fatigue Syndrome", Oct. 2018, 9(2421), 1-14. (Year: 2018).*
Russell et al., In Vitro Suppression of Cell Mediated Autoimmunity in NZB Mice, Nature, 1974, 249(5452):43-45.
Saito et al., Notch2 is Preferentially Expressed in Mature B Cells and Indispensable for Marginal Zone B Lineage Development, Immunity, 2003, 18(5):675-685.
Savage et al., Characteristics of Natural Antibody-Secreting Cells, Annals of the New York Academy of Sciences, 2015, 1362(1):132-142.
Seidel-Guyenot et al., B Cells are not Required for T Cell Priming in Low Zone Tolerance to Contact Allergens and Contact Hypersensitivity, European Journal of Immunology, 2004, 34(11):3082-3090.
Srivastava et al., Characterization of Marginal Zone B Cell Precursors, Journal of Experimental Medicine, 2005, 202(9):1225-1234.
Takeuchi et al., Roles of Regulatory T Cells in Cancer Immunity, International Immunology, 2016, 28(8):401-409.
Tedder, B10 Cells: A Functionally Defined Regulatory B Cell Subset, Journal of Immunology, 2015, 194(4):1395-1401.
The Gene Ontology Consortium, Expansion of the Gene Ontology Knowledgebase and Resources, Nucleic Acids Research, 2017, vol. 45, Database Issue, pp. D331-D338.
Thome et al., Spatial Map of Human T Cell Compartmentalization and Maintenance Over Decades of Life, Cell, 2014, 159(4):814-828.
Tipton et al., Antigenic Modulation Limits the Effector Cell Mechanisms Employed by Type I Anti-CD20 Monoclonal Antibodies, Blood, 2015, 125(12):1901-1909.
Trapnell et al., Differential Analysis of Gene Regulation at Transcript Resolution with RNA-seq, Nature Biotechnology, 2013, 31(1):46-53.

(Continued)

Primary Examiner — Nelson B Moseley, II
Assistant Examiner — Alyssa Rae Stonebraker
(74) Attorney, Agent, or Firm — Quarles & Brady LLP

(57) ABSTRACT

GITRL$^+$ IgD$^{low/-}$ B cells as well as methods of making and using said cells are described herein. Also described are methods for treating an autoimmune disease or an inflammatory condition in a subject in need thereof of using said B cells. The B cells may be GITRL$^+$ IgD$^{low}$CCR7$^+$ CXCR5$^+$ B cells or GITRL$^+$ IgD$^{low}$ CCR7$^+$ CXCR5$^+$ CD23$^+$ CD24$^+$ B cells.

11 Claims, 35 Drawing Sheets

Specification includes a Sequence Listing.

(56) References Cited

OTHER PUBLICATIONS

Weiner, Rituximab: Mechanism of Action, Seminars in Hematology, 2010, 47(2):115-123.
Wolf et al., Experimental Autoimmune Encephalomyelitis Induction in Genetically B Cell-Deficient Mice, Journal of Experimental Medicine, 1996, 184(6):2271-2278.
Woodland et al., Homeostatic Proliferation of B Cells, Seminars in Immunology, 2005, 17(3):209-217.
Zhang et al., Effect of B-Cell Depletion Using Anti-CD20 Therapy on Inhibitory Antibody Formation to Human FVIII in Hemophilia A Mice, Blood, 2011, 117(7):2223-2226.
Zhang, Regulatory Functions of Innate-Like B Cells, Cellular & Molecular Immunology, 2013, 10(2):113-121.
Zhang et al., Regulation of Germinal Center B-Cell Differentiation, Immunological Reviews, 2016, 270(1):8-19.
Dittel, Mechanisms of Regulatory B Cell Function, National Institute of Health, Grant Document, Project Start: Sep. 1, 2013, 3 pages.
Lykken, et al., Regulatory B10 Cell Development and Function, International Immunology, 2015, 27(10):471-477.
Ray et al., A Novel IL-10-Independent Regulatory Role for B Cells in Suppressing Autoimmunity by Maintenance of Regulatory T Cells via GITR Ligand, Journal of Immunology, 2012, 188:3188-3198.
Ray et al., Mechanisms of Regulatory B Cell Function in Autoimmune and Inflammatory Diseases Beyond IL-10, Journal of Clinical Medicine, 2017, 6(12):1-7.
Ray et al., Mature IgDlow/-B Cells Maintain Tolerance by Promoting Regulatory T Cell Homeostasis, Nature Communications, 2019, vol. 10, No. 1, 16 pages.
PCT International Search Report and Written Opinion, PCT/US2019/065472, Mar. 23, 2020, 20 pages.
Alduaij et al., Novel Type II Anti-CD20 Monoclonal Antibody (GA101) Evokes Homotypic Adhesion and Actin-Dependent, Lysosome-Mediated Cell Death in B-Cell Malignancies, Blood, 2011, 117(17):4519-4529.
Allman et al., Resolution of Three Nonproliferative Immature Splenic B Cell Subsets Reveals Multiple Selection Points During Peripheral B Cell Maturation, Journal of Immunology, 2001, 167(12):6834-6840.
Allman et al., Peripheral B Cell Subsets, Current Opinion in Immunology, 2008, 20(2): 149-157.
Arellano et al., Regulatory T Cell-Based Therapies for Autoimmunity, Discovery Medicine, 2016, 22(119):73-80.
Ashburner et al., Gene Ontology: Tool for the Unification of Biology, Nature Genetics, 2000, 25(1):25-29.
Bar-Or et al., Rituximab in Relapsing-Remitting Multiple Sclerosis: A 72-Week, Open-Label, Phase I Trial, Annals of Neurology, 2008, 63(3):395-400.
Barr et al., TLR-Mediated Stimulation of APC: Distinct Cytokine Responses of B Cells and Dendritic Cells, European Journal of Immunology, 2007, 37(11):3040-3053.
Barr et al., B Cell Depletion Therapy Ameliorates Autoimmune Disease through Ablation of IL-6-Producing B Cells, Journal of Experimental Medicine, 2012, 209(5):1001-1010.
Basu et al., Cannabinoid Receptor 2 is Critical for the Homing and Retention of Marginal Zone B Lineage Cells and for Efficient T-Independent Immune Responses, Journal of Immunology, 2011, 187(11):5720-5732.
Beers et al., Type II (tositumomab) Anti-CD20 Monoclonal Antibody Out Performs Type I (rituximab-like) Reagents in B-cell Depletion Regardless of Complement Activation, Blood, 2008, 112(10):4170-4177.
Beers et al., Antigenic Modulation Limits the Efficacy of Anti-CD20 Antibodies: Implications for Antibody Selection, Blood, 2010, 115(25):5191-5201.
Blair et al., CD19+CD24hiCD38hi B Cells Exhibit Regulatory Capacity in Healthy Individuals but are Functionally Impaired in Systemic Lupus Erythematosus Patients, Immunity, 2010, 32(1):129-140.
Bologna et al., Mechanism of Action of Type II, Glycoengineered, Anti-CD20 Monoclonal Antibody GA101 in B-Chronic Lymphocytic Leukemia Whole Blood Assays in Comparison with Rituximab and Alemtuzumab, Journal of Immunology, 2011, 186(6):3762-3769.
Bruhns et al., Mouse and Human FcR Effector Functions, Immunological Reviews, 2015, 268(1):25-51.
Clark et al., How Does B Cell Depletion Therapy Work, and How can it be Improved, Annals of the Rheumatic Diseases, 2005, 64:iv77-iv80.
Cunningham et al., B1b Cells Recognize Protective Antigens After Natural Infection and Vaccination, Frontiers in Immunology, 2014, vol. 5, Article 535, pp. 1-11.
Dittel et al., Evidence for Fas-Dependent and Fas-Independent Mechanisms in the Pathogenesis of Experimental Autoimmune Encephalomyelitis, Journal of Immunology, 1999, 162(11):6392-6400.
Fillatreau et al., B Cells Regulate Autoimmunity by Provision of IL-10, Nature Immunology, 2002, 3(10):944-950.
Geisberger et al., The Riddle of the Dual Expression of IgM and IgD, Immunology, 2006, 118(4):429-437.
Ghosn et al., Distinct B-Cell Lineage Commitment Distinguishes Adult Bone Marrow Hematopoietic Stem Cells, Proceedings of the National Academy of Sciences, 2012, 109(14):5394-5398.
Gorczynski, Immunity to Murine Sarcoma Virus-Induced Tumors II. Suppression of T Cell-Mediated Immunity by Cells from Progressor Animals, Journal of Immunology, 1974, 112(5):1826-1838.
Heine et al., Autocrine IL-10 Promotes Human B-Cell Differentiation into IgM-or IgG-Secreting Plasmablasts, European Journal of Immunology, 2014, 44(6):1615-1621.
Ivanov et al., Monoclonal Antibodies Directed to CD20 and HLA-DR can Elicit Homotypic Adhesion Followed by ysosome-Mediated Cell Death in Human Lymphoma and Leukemia Cells, Journal of Clinical Investigation, 2009, 119 (8):2143-2159.
Kanehisa et al., KEGG: Kyoto Encyclopedia of Genes and Genomes, Nucleic Acids Research, 2000, 28(1):27-30.
Kanehisa et al., KEGG: New Perspectives on Genomes, Pathways, Diseases and Drugs, Nucleic Acids Research, 2017, vol. 45, Database Issue, pp. D353-D361.
Katz et al., B-Cell Suppression of Delayed Hypersensitivity Reactions, Nature, 1974, 251(5475):550-551.
Kobayashi et al., Functional B-1 Progenitor Cells are Present in the Hematopoietic Stem Cell-Deficient Embryo and Depend on Cbfß for their Development, Proceedings of the National Academy of Sciences, 2014, 111(33):12151-12156.
Liao et al., GITR Engagement Preferentially Enhances Proliferation of Functionally Competent CD4+ CD25+ FoxP3+ Regulatory T Cells, International Immunology, 2010, 22(4):259-270.
Lim et al., Anti-CD20 Monoclonal Antibodies: Historical and Future Perspectives, Haematologica, 2010, 95(1):135-143.
Lino et al., LAG-3 Inhibitory Receptor Expression Identifies Immunosuppressive Natural Regulatory Plasma Cells, Immunity, 2018, 49(1):120-133.
Loder et al., B Cell Development in the Spleen Takes Place in Discrete Steps and is Determined by the Quality of B Cell Receptor-Derived Signals, Journal of Experimental Medicine, 1999, 190(1):75-89.
Lykken et al., Acute and Chronic B Cell Depletion Disrupts CD4+ and CD8+ T Cell Homeostasis and Expansion During Acute Viral Infection in Mice, Journal of Immunology, 2014, 193(2):746-756.
Mann et al., B Cell Regulation of CD4+ CD25+ T Regulatory Cells and IL-10 via B7 is Essential for Recovery from Experimental Autoimmune Encephalomyelitis, Journal of Immunology, 2007, 178(6):3447-3456.
Mauri et al., Immune Regulatory Function of B Cells, Annual Review of Immunology, 2012, 30:221-241.
Mauri et al., Human Regulatory B Cells in Health and Disease: Therapeutic Potential, Journal of Clinical Investigation, 2017, 127(3):772-779.
Mayer et al., CD23 Shedding: Requirements for Substrate Recognition and Inhibition by Dipeptide Hydroxamic Acids, Inflammation Research, 2002, 51(2):85-90.
Meng et al., An Atlas of B-Cell Clonal Distribution in the Human Body, Nature Biotechnology, 2017, 35(9):879-884.

(56) References Cited

OTHER PUBLICATIONS

Meyer-Bahlburg et al., Characterization of a Late Transitional B Cell Population Highly Sensitive to BAFF-Mediated Homeostatic Proliferation, Journal of Experimental Medicine, 2008, 205(1):155-168.

Mizoguchi et al., Regulatory Role of Mature B Cells in a Murine Model of Inflammatory Bowel Disease, International Immunology, 2000, 12(5):597-605.

Mizoguchi et al., Chronic Intestinal Inflammatory Condition Generates IL-10-Producing Regulatory B Cell Subset Characterized by CD1d Upregulation, Immunity, 2002, 16(2):219-230.

Moore et al., B Cell Requirement for Robust Regulatory T Cell Responses to Friend Retrovirus Infection, mBio, 2017, 8(4):e01122-17, 13 pages.

Naismith et al., Rituximab Add-On Therapy for Breakthrough Relapsing Multiple Sclerosis: A 52-Week Phase II Trial, Neurology, 2010, 74(23):1860-1867.

Pescovitz, Rituximab, an Anti-cd20 Monoclonal Antibody: History and Mechanism of Action, American Journal of Transplantation, 2006, 6(5):859-866.

Pillai et al., Marginal Zone B Cells, Annu. Rev. Immunol., 2005, 23:161-196.

Ray et al., A Case for Regulatory B Cells in Controlling the Severity of Autoimmune-Mediated Inflammation in Experimental Autoimmune Encephalomyelitis and Multiple Sclerosis, Journal of Neuroimmunology, 2011, 230(1-2):1-9.

Ray et al., Gut Microbial Dysbiosis Due to Helicobacter Drives an Increase in Marginal Zone B Cells in the Absence of L-10 Signaling in Macrophages, Journal of Immunology, 2015, 195(7):3071-3085.

Reimand et al., g: Profiler—A Web Server for Functional Interpretation of Gene Lists (2016 Update), Nucleic Acids Research, 2016, 44(W1):W83-W89.

Ronchetti et al., Glucocorticoid-Induced Tumour Necrosis Factor Receptor-Related Protein: A Key Marker of Functional Regulatory T Cells, Journal of Immunology Research, 2015, vol. 215, Article ID 171520, 17 pages.

Rosser et al., Regulatory B Cells: Origin, Phenotype, and Function, Immunity, 2015, 42(4):607-612.

Rudensky, Regulatory T Cells and Foxp3, Immunological Reviews, 2011, 241(1):260-268.

\* cited by examiner

FIGS. 9A-9F CONTINUED
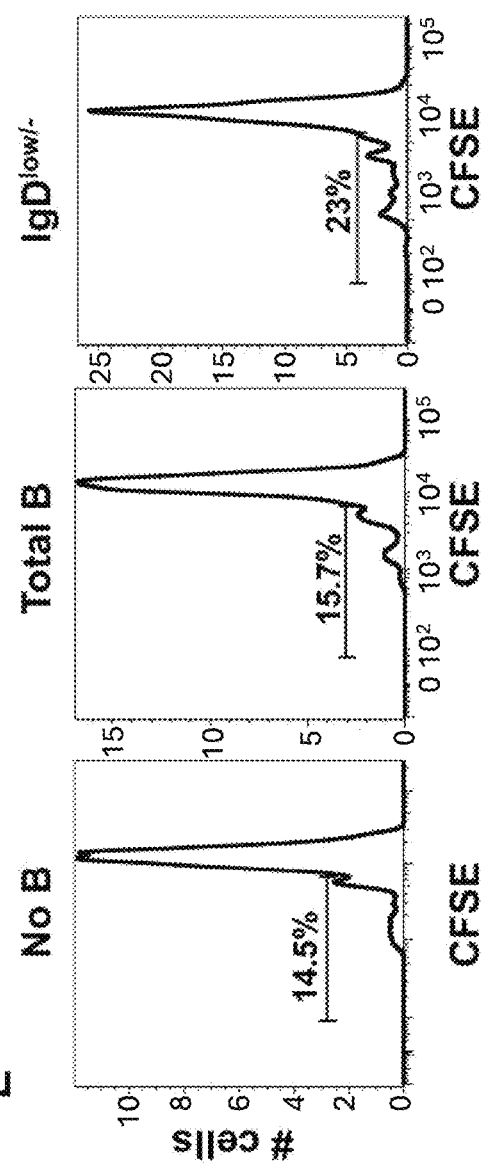
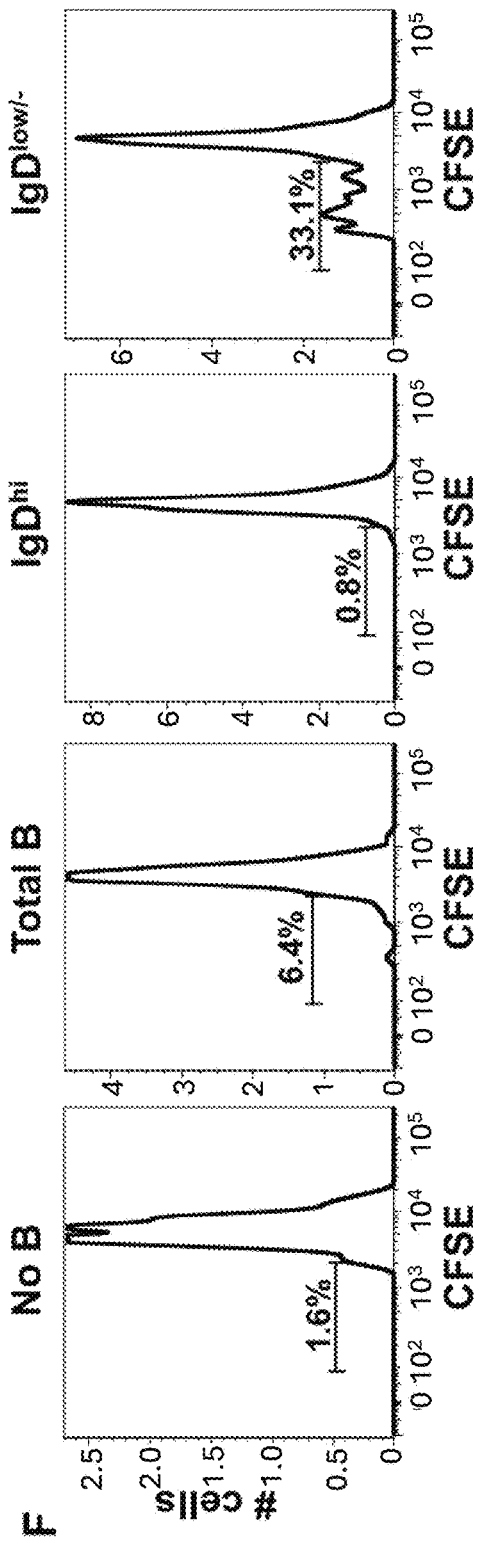

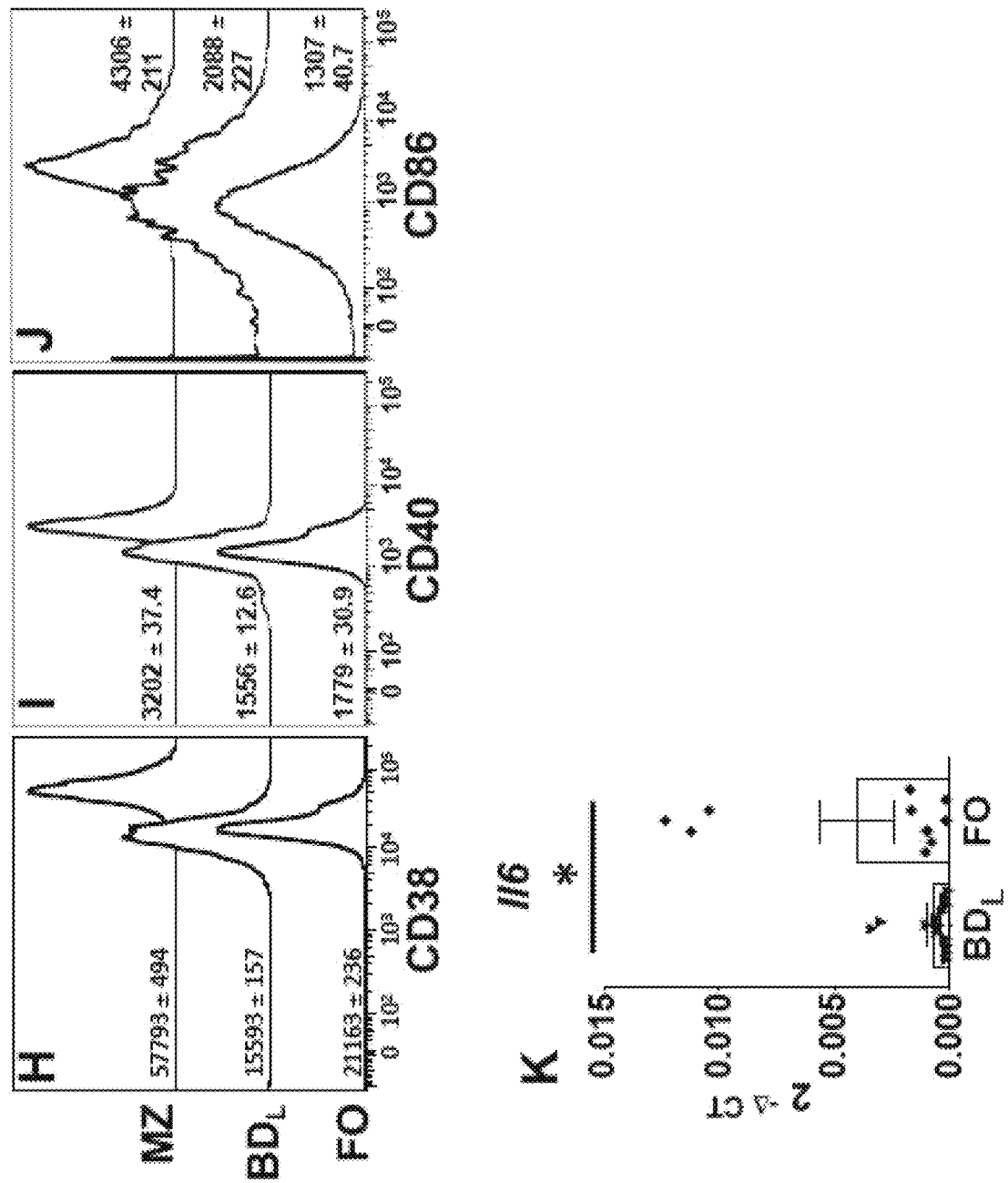

METHOD OF TREATING AUTOIMMUNE AND INFLAMMATORY DISEASES USING B CELLS

CROSS-REFERENCE TO RELATED APPLICATIONS

This application is the U.S. National Stage of PCT/US2019/065472 with international filing date of Dec. 10, 2019, and which published as WO 2020/123502. PCT/US2019/065472 claims priority to U.S. Provisional Patent Application No. 62/779,275, filed Dec. 13, 2018. Both applications are incorporated herein by reference in their entireties.

STATEMENT REGARDING FEDERALLY SPONSORED RESEARCH

This invention was made with government support under Grant No. R56AI106672, R56AI129348, and R56AI122655 awarded by the National Institute of Health. The U.S. Government has certain rights in this invention.

REFERENCE TO A SEQUENCE LISTING SUBMITTED VIA EFS-WEB

The content of the ASCII text file of the sequence listing named "160180_00138_ST25.txt" which is 1.26 kb in size was created on Dec. 10, 2019 and electronically submitted via EFS-Web herewith the application is incorporated herein by reference in its entirety.

BACKGROUND

A regulatory role for B cells in controlling the severity of autoimmunity was first described in the mouse model of multiple sclerosis (MS), experimental autoimmune encephalomyelitis (EAE)[1]. Specifically, B10.PL mice deficient in B cells (MT) immunized with the myelin basic protein (MBP) immunodominant peptide $Ac_{1-11}$ were unable to recover from the signs of EAE exhibiting a chronic disease course[1]. These findings were reproduced in mice on the B10.PL background using adoptive transfer EAE and in anti-CD20 depleted mice[2,3]. These findings were again replicated in C57BL/6 µMT mice immunized with the myelin oligodendrocyte glycoprotein 35-55 peptide[4]. The later study identified B cell production of IL-10 as the mechanism by which B cells regulate the severity of EAE[4]. However, numerous studies failed to identify a distinct B cell subset that regulates via IL-10[5]. In addition, it has become clear that other B cell regulatory mechanisms exist[6,7]. The existence of B cells with regulatory activity in humans has also been demonstrated, but as in mice, a definitive phenotype has remained elusive[8].

Additional studies demonstrated an IL-10-independent regulatory B cell mechanism operational in EAE[3]. µMT and CD20 B cell-depleted mice had a significant reduction in the absolute number of CD4+Foxp3+ T regulatory cells (Treg)[3]. B cell reconstitution of µMT mice induced Treg proliferation and maintenance resulting in resolution of EAE[3]. Treg are essential for the maintenance of tolerance against self-antigens and when absent or depleted humans and mice quickly succumb to autoimmune manifestations[9]. B cells have the ability to homeostatically expand Treg was glucocorticoid-induced tumor necrosis factor receptor (TNFR) ligand (GITRL)-dependent, but IL-10-indepenent[3]. GITR, the receptor for GITRL, is highly expressed by Treg and when engaged has been reported to induce Treg proliferation[10,11]. Given the importance of B cells in providing protection against pathogens, it is unlikely that all B cell subsets would have the capacity to homeostatically expand Treg, which would potentially be detrimental for pathogen clearance.

SUMMARY OF THE DISCLOSURE

In a first aspect, provided herein is a method for treating an autoimmune disease or an inflammatory condition in a subject in need thereof comprising: administering to the subject in need thereof a therapeutically effective amount of glucocorticoid-induced tumor necrosis factor receptor ligand positive (GITRL+), immunoglobulin D low ($IgD^{low}$) B cells. In some embodiments, administration of the GITRL+ $IgD^{low}$ B cells stimulates proliferation of CD4+ Foxp3+ T regulatory cells. In some embodiments, the B cells are GITRL+ $IgD^{low}$ CCR7+ CXCR5+ B cells. In some embodiments, the B cells are GITRL+ $IgD^{low}$ CCR7+ CXCR5+ CD23+ CD24+ B cells. In some embodiments, the B cells are administered using adoptive cell transfer. In some embodiments, the B cells are administered by infusion.

In some embodiments, the autoimmune disease or inflammatory condition is selected from the group consisting of multiple sclerosis, Guillain-Barry syndrome, autism, thyroiditis, Hashimoto's disease, Graves' disease, rheumatoid arthritis, ankylosing spondylitis, polymyalgia rheumatica, psoriasis, vitiligo, eczema, scleroderma, fibromyalgia, Wegener's granulomatosis, peripheral neuropathy, diabetic neuropathy, Celiac's disease, Crohn's disease, ulcerative colitis, type I diabetes, leukemia, lupus erythematosus, and hemolytic dysglycemia.

In some embodiments, the B cell is an engineered B cells that comprises a suicide gene selected from the group consisting of Herpes simplex virus thymidine kinase (HSV-TK), human inducible caspase 9 (iCasp9), mutant human thymidylate kinase (mTMPK), and human CD20. In some embodiments, the B cell is derived from a chronic lymphocytic leukemia cell line. In some embodiments, the B cell does not express β 2-microglobulin. In some embodiments, the B cell does not express class II major histocompatibility complex transactivator (CIITA).

In a second aspect, provided herein is an engineered B cell with increased GITRL expression and decreased IgD expression, the engineered B cell comprising a non-natural modification that increases expression of GITRL. In some embodiments, the engineered B cell additionally comprises a non-natural modification that decrease expression of or silences IgD. In some embodiments, the engineered B cell includes a suicide gene selected from the group consisting of Herpes simplex virus thymidine kinase (HSV-TK), human inducible caspase 9 (iCasp9), mutant human thymidylate kinase (mTMPK), and human CD20. In some embodiments, the engineered B cell is a GITRL+ $IgD^{10}$ w CCR7+ CXCR5+ B cell. In some embodiments, the engineered B cell is a GITRL+ $IgD^{10}$ w CCR7+ CXCR5+ CD23+ CD24+ B cell. In some embodiments, the engineered B cell does not expression $β_2$-microglobulin.

In a third aspect, provided herein is a composition comprising an engineered B cell as described herein and a pharmaceutically acceptable carrier.

In a forth aspect, provided herein is a method for treating an autoimmune disease or an inflammatory condition in a subject in need thereof comprising: administering to the subject in need thereof a therapeutically effective amount of a composition comprising an engineered B cell as described herein and a pharmaceutically acceptable carrier.

In a fifth aspect, provided herein is a method for making an engineered B cell of comprising: transfecting a B cell with an isolated nucleic acid that increases expression of GITRL. In some embodiments, the isolated nucleic acid is packaged in a viral vector selected from the group consisting of a lentiviral vector, a baculoviral vector, an adenoviral vector, and an adeno-associated viral vector.

INCORPORATION BY REFERENCE

Figures 1A, 1B, 1C, 1D, 1E, 1F, 1G:
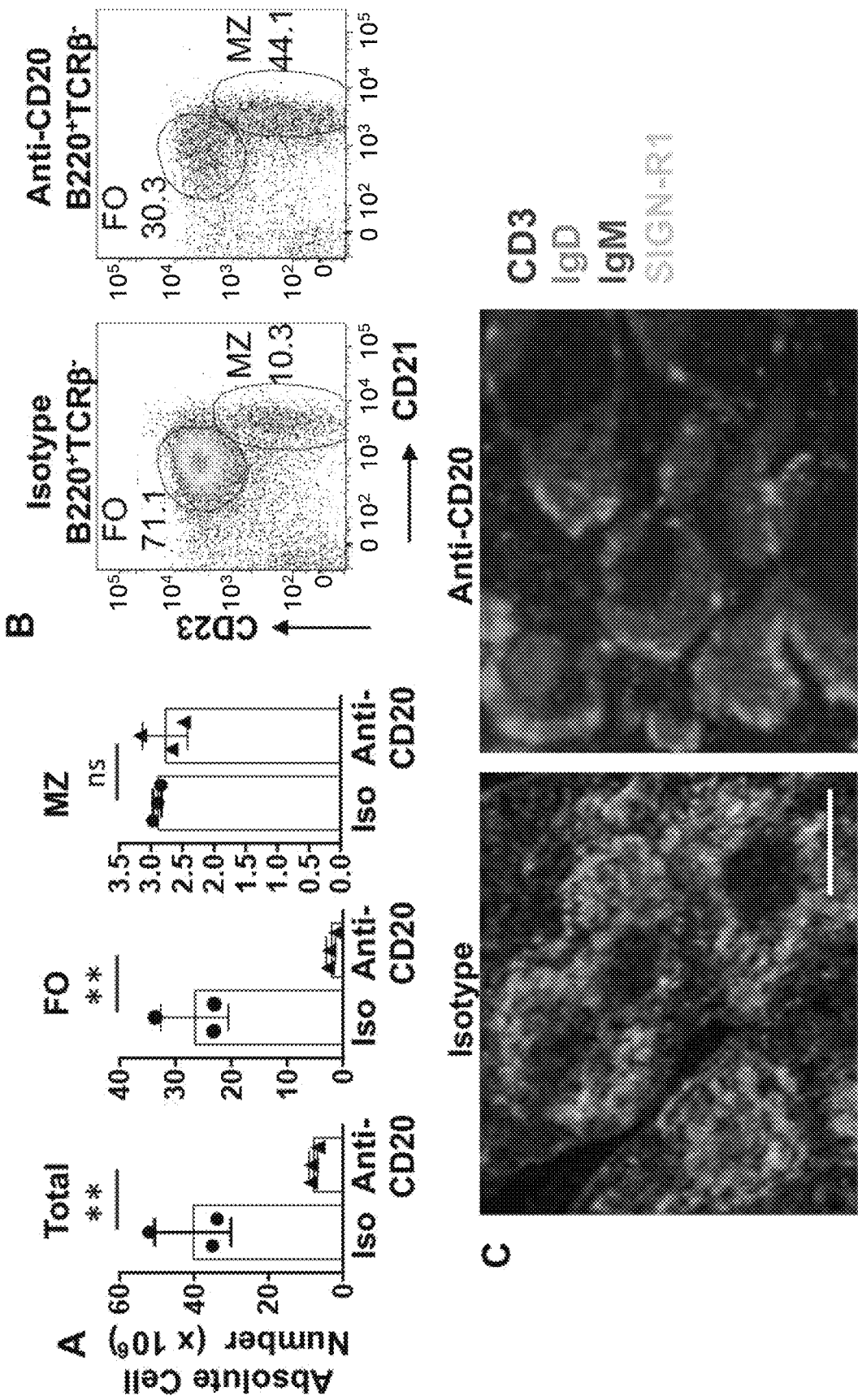
FIGS. 1A-1G show B cells after anti-CD20 (IgG$_1$) depletion exhibit regulatory activity. B10.PL mice were i.v. administered anti-CD20 (18B12IgG$_1$) or its isotype control (2B8msIgG1), once (FIG. 1A-D) or twice, 14 days apart (250 μg) (E (black arrows)). On day 14 the absolute number of total splenic B cells (B220$^+$) (A), FO B cells (B220$^+$IgM$^+$CD21$^{int}$CD23$^+$ CD93$^-$) (A), MZ B cells (B220$^+$IgM$^{hi}$CD21$^{hi}$CD23$^-$ CD93$^-$) (A) and CD4$^+$Foxp3$^+$ Treg (D) was determined by flow cytometry. A,D) Individual data points (mice) are shown superimposed upon the mean±SEM. p<0.01. ns=not significant. B) Representative flow cytometry dot plots with gating of splenic FO and MZ B cells shown for the isotype control (left panel) and anti-CD20 (right panel). C) Splenic frozen sections from B10.PL mice treated with isotype control (left panel) or anti-CD20 (right panel) (250 μg) were stained for CD3 (blue), IgD (green), IgM (purple) and SIGN-R1 (pink) 14 days-post antibody treatment. Scale bar 500 μM. E) EAE was induced three days after the first antibody treatment by adoptive transfer of 1×10$^6$ encephalitogenic T cells. Clinical signs of EAE were evaluated daily and the data shown is the mean±SEM daily disease score of 9-10 mice from two independent experiments. p<0.0001, MT versus WT, isotype or anti-CD20 for the day 30 time point. F,G) B10.PL mice were i.v. administered anti-CD20 (18B12IgG1) and 14 days after antibody administration total splenic B cells (B220$^+$) (F), FO B cells (G) and MZ (G) B cells were FACS purified and 20 (F) or 5×10$^6$ (G) cells were adoptively transferred into sublethally irradiated B10.PL MT mice and three days later EAE was induced as for FIG. 1E. WT and μMT control mice received PBS. The data shown is the mean daily disease score±SEM of 3-5 mice from one representative experiment of two. F) p<0.001, WT versus μMT and MT versus μMT+B cells for the day 28 time point. E) *p<0.05, MT versus FO; p<0.01, WT versus MZ; *p<0.001, WT versus μMT for the day 35 time point. Statistical significance was determined using the unpaired t-test.
Figures 1A, 1B, 1C, 1D, 1E, 1F, 1G:
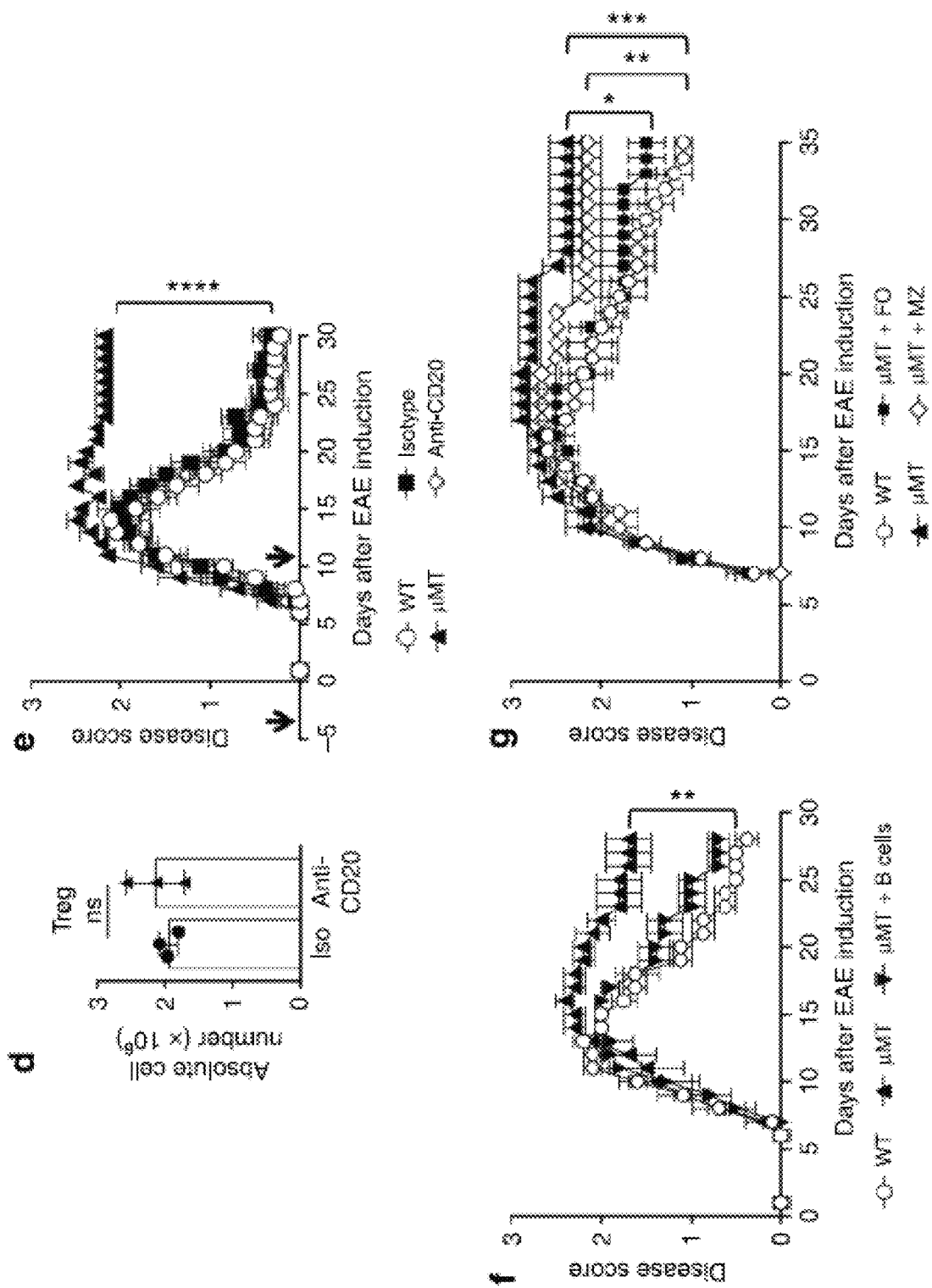

All publications, patents, and patent applications mentioned in this specification are herein incorporated by reference to the same extent as if each individual publication, patent, and patent application was specifically and individually indicated to be incorporated by reference.

DETAILED DESCRIPTION OF THE INVENTION

The present disclosure broadly relates to a GITRL positive B cell as well as methods for making and using such a B cell.

In some aspects, provided herein is an engineered GITRL positive, $IgD^{low/-}$ B cell. The B cell may be engineered to include a non-natural mutation that increases, decreases, or otherwise modulates expression of one or more markers or cytokines to provide a B cell with improved stimulation of homeostatic T regulator cell expansion as described herein. The B cell may also be engineered to decrease or eliminate in vivo reproduction, proliferation, and expansion of the B cells. In some aspects, provided herein is a GITRL+, $IgD^{low/-}$, $CCR7^+$ B cell that cannot reproduce, proliferate or expand in vivo following administration to a subject.

In some aspects, provided herein is a treatment for patients experiencing abnormally increased immune system reactivity or an autoimmune disease. The treatment includes administration of GITRL positive B cells to a subject in need thereof.

Certain embodiments of the disclosure are described in Ray et al. 2019 (Ray, A., Khalil, M., Pulakanti, K. L., Burns, R. T., Gurski, C. J., Basu, S., Wang, D., Rao, S. and Dittel, B. N. 2019. Mature $IgD^{low/-}$ B cells maintain tolerance by promoting regulatory T cell homeostasis. Nat. Commun. doi.org/10.1038/s41467-018-08122-9), which is incorporated herein in its entirety.

As used herein and in the appended claims, the singular forms "a", "an", and "the" include plural reference unless the context clearly dictates otherwise. As well, the terms "a" (or "an"), "one or more" and "at least one" can be used interchangeably herein. It is also to be noted that the terms "comprising", "including", and "having" can be used interchangeably.

As used herein, the terms "approximately" or "about" in reference to a number are generally taken to include numbers that fall within a range of 5% in either direction (greater than or less than) the number unless otherwise stated or otherwise evident from the context (except where such number would exceed 100% of a possible value). Where ranges are stated, the endpoints are included within the range unless otherwise stated or otherwise evident from the context.

Unless defined otherwise, all technical and scientific terms used herein have the same meanings as commonly understood by one of ordinary skill in the art to which this invention belongs. Although any methods and materials similar or equivalent to those described herein can be used in the practice or testing of the present invention, the preferred methods and materials are now described.

The practice of the present invention will employ, unless otherwise indicated, conventional techniques of molecular biology, microbiology, recombinant DNA, and immunology, which are within the skill of the art. Such techniques are explained fully in the literature. See, for example, Molecular Cloning A Laboratory Manual, 2nd Ed., ed. by Sambrook, Fritsch and Maniatis (Cold Spring Harbor Laboratory Press: 1989); DNA Cloning, Volumes I and II (D. N. Glover ed., 1985); Oligonucleotide Synthesis (M. J. Gait ed., 1984); Mullis et al. U.S. Pat. No. 4,683,195; Nucleic Acid Hybridization (B. D. Hames & S. J. Higgins eds. 1984); Transcription And Translation (B. D. Hames & S. J. Higgins eds. 1984); Culture Of Animal Cells (R. I. Freshney, Alan R. Liss, Inc., 1987); Immobilized Cells And Enzymes (IRL Press, 1986); B. Perbal, A Practical Guide To Molecular Cloning (1984); the treatise, Methods In Enzymology (Academic Press, Inc., N.Y.); Gene Transfer Vectors For Mammalian Cells (J. H. Miller and M. P. Calos eds., 1987, Cold Spring Harbor Laboratory); Methods In Enzymology, Vols. 154 and 155 (Wu et al. eds.), Immunochemical Methods In Cell And Molecular Biology (Mayer and Walker, eds., Academic Press, London, 1987); and Handbook Of Experimental Immunology, Volumes I-IV (D. M. Weir and C. C. Blackwell, eds., 1986).

By "modulation" of a target gene, we mean to include over-expression, increased function, reduced-expression, reduced function, or gene knockout. In some embodiments, the target gene is over-expressed. In some embodiments, expression of the target gene is reduced. In some embodiments, the target gene is knocked out. By "modulation of the gene," we also mean to include modification or manipulation of the regulatory regions of the target gene.

By "a non-natural modification," we mean to include all manner of recombinant and transgenic manipulation to the B cell. For example, a B cell comprising an extra copy of the target gene has a non-natural modification. A B cell comprising a vector containing the target gene and a promoter is a non-natural modification. A B cell comprising a vector expressing an miRNA, a dsRNA, an hpRNA, a siRNA, or other RNA associated with RNA interference to silence or down regulate gene expression is a non-natural modification. We also mean to include modification or manipulation of the regulatory regions of the target gene or of any region that is contiguous with the target gene up to 5 KB on either side of the target sequence. Non-natural modification also covers CRISP/Cas9 mediated gene editing of a target gene. Also included are modifications to the target gene such as, but not limited to, insertions, deletions, non-sense mutations, substitutions, etc., that may increase or decrease the expression of the target gene or gene product thereof.

By "engineered B cell" or "engineered $BD_L$", we mean a B cell or $BD_L$ that includes a non-natural modification as described herein. In some embodiments, the engineered B cell comprises an extra copy of the target gene. In some embodiments, the engineered B cell comprises a vector containing the target gene and a promoter. In some embodiments, the engineered B cell includes a non-natural modification or manipulation of the regulator region of the target gene or of any region that is contiguous with the target gene up to 5 KB on either side of the target gene sequence. In some embodiments, the engineered B cell comprises a vector expressing an RNA associated with RNA interference to silence or down regulate gene expression. In some embodiments, the engineered B cell comprises an RNA selected from the group consisting of miRNA, dsRNA, hpRNA, or siRNA specific to or complementary to the target gene, whereby said RNA downregulates or silences the gene. In some embodiments, a target gene of the engineered B cell has been modified using CRISPR/Cas9 mediated gene editing. In some embodiments, a target gene of the engineered B cell has been modified using lentiviral transduction mediated gene editing. In some embodiments, a target gene of the engineered B cell has been modified with an insertion, deletion, non-sense mutation, substitution, etc., that increases or decreases the expression of the target gene product thereof.

As used herein, "$BD_L$" refers to a B cell that is glucocorticoid-induced tumor necrosis factor receptor ligand (GITRL) positive ($GITRL^+$) and stimulates homeostatic expansion of CD4+Foxp3+T regulator cells (Tregs). In some embodiments, the $BD_L$ are also immunoglobulin D low or silent ($IgD^{low/-}$), $CD23^+$, $B220^+$, $CD21^+$, and/or $CD93^+$. In some embodiments, the $BD_L$ also express one or more markers selected from the group consisting of CCR7, CXCR5, CD24, and CD86.

As used herein, "high" means that the cells are characterized by higher expression of a particular gene compared to the average expression of said gene in well-defined B cell subsets with well-described expression levels as reporting in the art. See, for example, Allman et al. 2001 (Allman, D. et al. Resolution of three nonproliferative immature splenic B cell subsets reveals multiple selection points during peripheral B cell maturation. *J Immunol.* 167, 6834-6840 (2001)), Allman et al. 2008 (Allman, D. & Pillai, S. Peripheral B cell subsets. *Curr. Opin. Immunol.* 20, 149-157 (2008)), and Meyer-Bahlburg et al. 2008 (Meyer-Bahlburg, A., Andrews, S. F., Yu, K. O., Porcelli, S. A. & Rawlings, D. J. Characterization of a late transitional B cell population highly sensitive to BAFF-mediated homeostatic proliferation. *J Exp. Med.* 205, 155-168 (2008)). For example, "GITRL high" indicates that GITRL expression is higher than the average expression in a population of B cells. Similarly, "low" means that the cells are characterized by lower expression of a particular gene. For example, "IgD low" indicates that IgD expression is lower than the average expression in a population of B cells. "Low" can also mean that the expression levels are below the detection limit or that the cell is engineered to silence the particular gene of interest.

In some embodiments, the $BD_L$ are genetically engineered to increase, introduce, or modulate the expression of one or more target genes or expression products. In some embodiments, the $BD_L$ are genetically engineered to reduce, silence, or delete the expression of one or more target genes or expression products. Target genes and expression products of interest that may be modulated in the $BD_L$ include, but are not limited to GITRL, IgD, class II major histocompatibility complex transactivator (CIITA), β 2-microglobulin, CC-chemokine receptor 7 (CCR7), C-X-C motif chemokine receptor 5 (CXCR5), CD20, human leukocyte antigen G (HLA-G), human leukocyte antigen E (HLA-E), CD86, suicide genes, and a Cre recombinase.

In some embodiments, the engineered $BD_L$ include a non-natural mutation that increases GITRL expression.

In some embodiments, the engineered $BD_L$ include a non-natural mutation that silences, downregulates, or reduces expression of IgD. In some embodiments, the engineered $BD_L$ include a non-natural mutation that is a deletion of the IgD gene.

In some embodiments, the engineered $BD_L$ include a non-natural mutation that silences, downregulates, or reduces expression of CIITA. In some embodiments, the engineered $BD_L$ include a non-natural mutation that is a deletion of the CIITA gene. Without wishing to be bound by any particular theory embodiment, deletion, silencing, downregulation or reduction in CIITA will disrupt the ability of resulting B cells to express classical and nonclassical major histocompatibility complex (MHC) class I molecules on their cell surface. Resulting B cell lacking surface MHC expression will not be cleared by the immune system when administered to a subject in need thereof.

In some embodiments, the engineered $BD_L$ include a non-natural mutation that silences, downregulates, or reduces expression of 02-microglobulin. In some embodiments, the engineered $BD_L$ include a non-natural mutation that is a deletion of the $\beta_2$-microglobulin gene. Without wishing to be bound by any particular theory embodiment, deletion, silencing, downregulation or reduction in 02-microglobulin will disrupt the ability of resulting B cells to express classical and nonclassical major histocompatibility complex (MHC) class I molecules on their cell surface. Resulting B cell lacking surface MHC expression will not be cleared by the immune system when administered to a subject in need thereof.

In some embodiments, the engineered $BD_L$ include a non-natural mutation that modulates expression of CCR7. In some embodiments, the engineered $BD_L$ include a non-natural mutation that increases expression of CCR7.

In some embodiments, the engineered $BD_L$ include a non-natural mutation that modulates expression of CXCR5. In some embodiments, the engineered $BD_L$ include a non-natural mutation that increases expression of CXCR5.

In some embodiments, the engineered $BD_L$ include a non-natural mutation that silences, downregulates, or reduces expression of CD20. In some embodiments, the engineered $BD_L$ include a non-natural mutation that is a deletion of the CD20 gene.

In some embodiments, the engineered $BD_L$ include a non-natural mutation that introduces the HLA-G gene into the B cell. In some embodiments, the engineered $BD_L$ include a non-natural mutation that increases expression of HLA-G. In some embodiments, the engineered $BD_L$ include a non-natural mutation that introduces the HLA-E gene into the B cell. In some embodiments, the engineered $BD_L$ include a non-natural mutation that increases expression of HLA-E. Without wishing to be bound by any particular theory or embodiment, the resulting B cells that express HLA-G and/or HLA-E will be protected from immune system clearance by Natural Killer cells when administered to a subject in need thereof.

In some embodiments, the engineered $BD_L$ include a non-natural mutation that increases CD86 expression.

In some embodiments, the engineered $BD_L$ include a non-natural mutation that increases CD24 expression.

In some embodiments, the engineered $BD_L$ include a non-natural mutation that introduces a Cre recombinase gene into the B cell. In some embodiments, the engineered $BD_L$ include a non-natural mutation that increases expression of a Cre recombinase gene.

In some embodiments, the $BD_L$ are derived from a B cell line such as a chronic lymphocytic leukemia line (CCL line) or other cancerous line of cells. Other suitable cell lines include, but are not limited to, Hs505.T, OSU CLL, or other lines created through Epstein-Barr virus transformation of patient tumors. There are several examples of commercially available cell lines or others described in the scientific literature. The cells would be grown in culture and cells expressing high levels of GITRL and low levels of IgD would be selected. In some embodiments, the cells are genetically engineered to overexpress GITRL and to lower or silence IgD expression.

In some embodiments, engineered $BD_L$ as described herein are made by transfecting a population of B cells with one or more nucleic acids to modulate a target gene of interest. The nucleic acid may be part of a viral or plasmid vector. Suitable vectors and transfection methods are known and used in the art. Suitable vectors include, but are not limited to, viral vectors, such as lentiviral, baculoviral, adenoviral, or adeno-associated viral vectors, yeast systems, microvesicles, gene guns, and gold nanoparticles. Suitable viral delivery vectors include, without limitation, adenoviral/adeno-associated viral (AAV) vectors, lentiviral vectors, and Herpes Simplex Virus 1 (HSV-1) vectors. In some embodiments, the nucleic acid or vector may be delivered to the cell via liposomes, nanoparticles, exosomes, microvesicles, or a gene gun.

Gene editing using the precise targeting process of Clustered, Regularly Interspaced Short Palindromic Repeats (CRISPR) combined with the Cas9 nuclease to make a double stranded break (collectively referred to as CRISPR/Cas9 or CRISPR/Cas9 system) may be used to modulate a target gene as described herein. The site of the break is targeted by short guide RNA (sgRNA or gRNA) often about 20 nucleotides in length. The break can be repaired by non-homologous end joining (NHEJ) or homology-directed recombination to make a desired mutation or modification at the cut site. Suitable CRISPR/Cas9 nucleases and vectors are known in the art. See for example US20180273961, U.S. Pat. No. 8,771,945, Reem et al. (Reem N. T., Van Eck J. (2019) Application of CRISPR/Cas9-Mediated Gene Editing in Tomato. In: Qi Y. (eds) Plant Genome Editing with CRISPR Systems. Methods in Molecular Biology, vol 1917. Humana Press, New York, NY), and Brooks et al. (Brooks C., Nekrasov V., Lippman Z. B., Van Eck J. (2014).

In some embodiments, the expression of the target gene is modulated by transformation of the B cell with multiple copies of the gene, use of modified or natural promoters designed to overexpress or downregulate the gene, use of constitutive or tissue-specific promoters designed to focus expression in specific tissues or in a non-specific manner, and use of vectors to carry a copy or copies of the gene. One may also wish to transform B cells with regulatory elements that will modify the native expression of the target gene or modify existing regulatory elements.

In some embodiments, prior to administration to a subject the engineered B cell is modified or "killed" so that it is unable to reproduce, proliferate, or expand in vivo causing toxicity to the subject, e.g., proliferation that would cause a malignancy. Suitable methods and reagents to reduce reproduction, proliferation, and expansion of B cells in vivo are known and used in the art. In some embodiments, the B cells are treated with radiation or chemicals to prevent them from further dividing once administered to a patient. In some embodiments, the B cells are engineered to include a suicide gene to kill the engineered B cell prior to or after administration to the subject. A skilled artisan will recognize that the strategy used to kill the B cells prior to infusion will be determined in conjunction with regulatory approving agencies for a therapeutic clinical trial.

In some embodiments, the B cells are treated with a chemical selected from the group consisting of doxorubicin, 5-Fluorouracil, paclitaxel, vinblastine, staurosporine, or combinations thereof. In some embodiments, the B cells are treated with about 0.1 to about 0.5 µg/ml doxorubicin. In some embodiments, the B cells are treated with about 100-200 nM paclitaxel. In some embodiments, the B cells are treated with about 50 to about 100 nM vinblastine. In some embodiments, the B cells are treated with about 0.5 to about 5 mM staurosporine.

In some embodiments, the B cells are treated with a total dose of radiation between about 30 and about 40 Gy. In some embodiments, the B cells are treated with a radiation dose between 0.2-0.3 Gy/h for about 7 days. In some embodiments, the B cells are treated with a radiation dose between 0.4-0.6 Gy/hr for about 3 days.

Suicide genes could also be employed to "kill" the $BD_L$ cell populations and several examples of this can be found in the literature. See, for example Marin et al. ("Comparison of Different Suicide-Gene Strategies for the Safety Improvement of Genetically Manipulated T Cells," Hum Gene Ther Methods, 2012, (6):276-286). Marin describes the use of 4 different strategies to incorporate suicide genes into immune cells. Any of these strategies could be employed to modify engineered B cells, including $BD_L$ cell populations, prior to infusion into patients to induce cell suicide prior to or after administration to the subject. Suitable suicide genes include, but are not limited to, Herpes simplex virus thymidine kinase (HSV-TK), human inducible caspase 9 (iCasp9), mutant human thymidylate kinase (mTMPK), and human CD20. In some embodiments, the suicide genes are codon-optimized prior to introduction into the engineered B cell. In some embodiments, the suicide genes are cloned in from with 2A-truncated and codon optimized CD34 and transduced into the B cell with a retroviral vector.

Treatment

According to the methods of the present invention, $BD_L$ are administered to a subject in need of thereof. Subjects in need of treatment include those already having or diagnosed with a disease as described herein or those who are at risk of developing a disease as described herein.

A disease or injury of the present invention may include, but is not limited to, conditions associated with aberrant, uncontrolled, or inappropriate inflammation, and autoimmune diseases.

Autoimmune disease may refer to, but is not limited to, multiple sclerosis, Guillain-Barry syndrome, autism, thyroiditis, Hashimoto's disease, Graves' disease, rheumatoid arthritis, ankylosing spondylitis, polymyalgia rheumatica, psoriasis, vitiligo, ecxema, scleroderma, fibromyalgia, Wegener's granulomatosis, peripheral neuropathy, diabetic neuropathy, Celiac's disease, Crohn's disease, ulcerative colitis, type I diabetes, leukemia, lupus erythematosus, and hemolytic dysglycemia.

As used herein, the terms "treat" and "treating" refers to therapeutic measures, wherein the object is to slow down (lessen) an undesired physiological change or pathological disorder resulting from a disease or injury as described herein. For purposes of this invention, treating the disease or injury includes, without limitation, alleviating one or more clinical indications, decreasing inflammation, reducing the severity of one or more clinical indications of the disease or injury, diminishing the extent of the condition, stabilizing the subject's disease or injury (i.e., not worsening), delay or slowing, halting, or reversing the disease or injury and bringing about partial or complete remission of the disease or injury. Treating the disease or injury also includes prolonging survival by days, weeks, months, or years as compared to prognosis if treated according to standard medical practice not incorporating treatment with $BD_L$.

Subjects in need of treatment can include those already having or diagnosed with a disease or injury as described herein as well as those prone to, likely to develop, or suspected of having a disease or injury as described herein. Pre-treating or preventing a disease or injury according to a method of the present invention includes initiating the administration of a therapeutic (e.g., $BD_L$) at a time prior to the appearance or existence of the disease or injury, or prior to the exposure of a subject to factors known to induce the disease or injury. Pre-treating the disorder is particularly applicable to subjects at risk of having or acquiring the disease injury. As used herein, the terms "prevent" and "preventing" refer to prophylactic or preventive measures intended to inhibit undesirable physiological changes or the development of a disorder or condition resulting in the disease or injury. In exemplary embodiments, preventing the disease or injury comprises initiating the administration of a therapeutic (e.g., $BD_L$) at a time prior to the appearance or existence of the disease or injury such that the disease or injury, or its symptoms, pathological features, consequences, or adverse effects do not occur. In such cases, a method of the invention for preventing the disease or injury comprises administering $BD_L$ to a subject in need thereof prior to exposure of the subject to factors that influence the development of the disease or injury.

As used herein, the terms "subject" or "patient" are used interchangeably and can encompass any vertebrate including, without limitation, humans, mammals, reptiles, amphibians, and fish. However, advantageously, the subject or patient is a mammal such as a human, or a mammal such as a domesticated mammal, e.g., dog, cat, horse, and the like, or livestock, e.g., cow, sheep, pig, and the like. In exemplary embodiments, the subject is a human. As used herein, the phrase "in need thereof" indicates the state of the subject, wherein therapeutic or preventative measures are desirable. Such a state can include, but is not limited to, subjects having a disease or injury as described herein or a pathological symptom or feature associated with a disease or injury as described herein.

In some cases, a method of treating or preventing a disease or injury as described herein comprises administering a pharmaceutical composition comprising a therapeutically effective amount of $BD_L$ as a therapeutic agent (i.e., for therapeutic applications). As used herein, the term "pharmaceutical composition" refers to a chemical or biological composition suitable for administration to a mammal. Examples of compositions appropriate for such therapeutic applications include preparations for parenteral, subcutaneous, transdermal, intradermal, intramuscular, intracoronarial, intramyocardial, intrapericardial, intraperitoneal, intravenous (e.g., injectable), intraparenchymal, intrathecal, or intratracheal administration, such as sterile suspensions, emulsions, and aerosols. Intratracheal administration can involve contacting or exposing lung tissue, e.g., pulmonary alveoli, to a pharmaceutical composition comprising a therapeutically effective amount of $BD_L$. In some cases, pharmaceutical compositions appropriate for therapeutic applications may be in admixture with one or more pharmaceutically-acceptable excipients, diluents, or carriers such as sterile water, physiological saline, glucose or the like. For example, $BD_L$ described herein can be administered to a subject as a pharmaceutical composition comprising a carrier solution.

Formulations may be designed or intended for oral, rectal, nasal, topical or transmucosal (including buccal, sublingual, ocular, vaginal and rectal) and parenteral (including subcutaneous, intramuscular, intravenous, intradermal, intraperitoneal, intrathecal, intraocular intraparenchymal, intrathecal and epidural) administration. In general, aqueous and non-aqueous liquid or cream formulations are delivered by a parenteral, oral or topical route. In other embodiments, the compositions may be present as an aqueous or a non-aqueous liquid formulation or a solid formulation suitable for administration by any route, e.g., oral, topical, buccal, sublingual, parenteral, aerosol, a depot such as a subcutaneous depot or an intraperitoneal, intraparenchymal or intramuscular depot. In some cases, pharmaceutical compositions are lyophilized. In other cases, pharmaceutical compositions as provided herein contain auxiliary substances such as wetting or emulsifying agents, pH buffering agents, gelling or viscosity enhancing additives, preservatives, flavoring agents, colors, and the like, depending upon the route of administration and the preparation desired. The pharmaceutical compositions may be formulated according to conventional pharmaceutical practice (see, e.g., *Remington: The Science and Practice of Pharmacy,* 20th edition, 2000, ed. A. R. Gennaro, Lippincott Williams & Wilkins, Philadelphia, and *Encyclopedia of Pharmaceutical Technology,* eds. J. Swarbrick and J. C. Boylan, 1988-1999, Marcel Dekker, New York).

The preferred route may vary with, for example, the subject's pathological condition or weight or the subject's response to therapy or that is appropriate to the circumstances. The formulations can also be administered by two or more routes, where the delivery methods are essentially simultaneous or they may be essentially sequential with little or no temporal overlap in the times at which the composition is administered to the subject.

Suitable regimes for initial administration and further doses or for sequential administrations also are variable, may include an initial administration followed by subsequent administrations, but nonetheless, may be ascertained by the skilled artisan from this disclosure, the documents cited herein, and the knowledge in the art.

In some cases, $BD_L$ may be optionally administered in combination with one or more additional active agents. Such active agents include anti-inflammatory, anti-cytokine, analgesic, antipyretic, antibiotic, and antiviral agents, as well as growth factors and agonists, antagonists, and modulators of immunoregulatory agents (e.g., TNF-α, IL-2, IL-4, IL-6, IL-10, IL-12, IL-13, IL-18, IFN-α, IFN-γ, BAFF, CXCL13, IP-10, VEGF, EPO, EGF, HRG, Hepatocyte Growth Factor (HGF), Hepcidin, including antibodies reactive against any of the foregoing, and antibodies reactive against any of their receptors). Any suitable combination of such active agents is also contemplated. When administered in combination with one or more active agents, $BD_L$ can be administered either simultaneously or sequentially with other active agents. For example, a subject with multiple sclerosis may simultaneously receive $BD_L$ and anti-CD20 depletion therapy for a length of time or according to a dosage regimen sufficient to support recovery and to treat, alleviate, or slow multiple sclerosis disease progression. In some embodiments, the $BD_L$ are administered prior to, simultaneously with, or following the administration of a second cell therapy such as to improve or enhance delivery, survival or function of the administered cells.

In some embodiments, $BD_L$ is administered with a preconditioning therapy. Preconditioning therapies are known and used in the art. For example, preconditioning therapies are used with cell transplantation and chimeric antigen receptor T cell (CAR-T) therapies. See, for example, Almasbak et al. (CAR T Cell Therapy: A game changer in cancer treatment, Journal of Immunology Research, 2016) and Lo et al. (Preconditioning therapy in ABO-incompatible living kidney transplantation, Transplantation, 2016, 100(4):933-942). Preconditioning may include administration of a chemotherapeutic agent. Without wishing to be bound by any particular theory or embodiment, preconditioning treatment creates space for the engraftment of $BD_L$ and homeostatic expansion of CD4+ Foxp3+ T regulator cells.

In some embodiment, $BD_L$ is administered with an anti-CD20 antibody therapy. Anti-CD20 therapy is known and used to typically to treat a variety of autoimmune disorders. Anti-CD20 therapy is also a known treatment for multiple sclerosis. Suitable anti-CD20 antibodies and treatment methods are known in the art. See, for example, Du et al. (Next-generation anti-CD20 monoclonal antibodies in autoimmune disease treatment, Auto Immun Highlights, 2017, 8(1):12). Suitable anti-CD20 therapies include, but are not limited to, rituximab, ocrelizumab, veltuzumab, obinutuzuman, and ofatumumab.

In some embodiments, $BD_L$ are administered to a subject in need thereof using an infusion, topical application, surgical transplantation, or implantation. In an exemplary embodiment, administration is systemic. In such cases, $BD_L$ can be provided to a subject in need thereof in a pharmaceutical composition adapted for intravenous administration to subjects. Typically, compositions for intravenous administration are solutions in sterile isotonic aqueous buffer. The use of such buffers and diluents is well known in the art. Where necessary, the composition may also include a local anesthetic to ameliorate any pain at the site of the injection. Generally, the ingredients are supplied either separately or mixed together in unit dosage form, for example, as a cryopreserved concentrate in a hermetically sealed container such as an ampoule indicating the quantity of active agent. Where the composition is to be administered by infusion, it can be dispensed with an infusion bottle containing sterile pharmaceutical grade water or saline. Where the composition is administered by injection, an ampoule of sterile water for injection or saline can be provided so that the ingredients may be mixed prior to administration. In some cases, compositions comprising $BD_L$ are cryopreserved prior to administration.

Therapeutically effective amounts of $BD_L$ are administered to a subject in need thereof. An effective dose or amount is an amount sufficient to effect a beneficial or desired clinical result. With regard to methods of the present invention, the effective dose or amount, which can be administered in one or more administrations, is the amount of $BD_L$ sufficient to elicit a therapeutic effect in a subject to whom the cells are administered. In some cases, an effective dose of $BD_L$ is about $1\times10^5$ cells/kilogram to about $10\times10^9$ cells/kilogram of body weight of the recipient (e.g., $1\times10^5$ cells/kilogram, $5\times10^5$ cells/kilogram, $1\times10^6$ cells/kilogram, $5\times10^6$ cells/kilogram, $1\times10^7$ cells/kilogram, $5\times10^7$ cells/kilogram, $1\times10^8$ cells/kilogram, $5\times10^8$ cells/kilogram, or $1\times10^9$ cells/kilogram). In some embodiments, an effective dose of $BD_L$ is between about $2\times10^6$ cells/kilogram and $5\times10^6$ cells/kilogram of the body weight of the subject. Effective amounts will be affected by various factors that modify the action of the cells upon administration and the subject's biological response to the cells, e.g., severity of the autoimmune disease, the patient's age, sex, and diet, the severity of inflammation, time of administration, and other clinical factors.

Therapeutically effective amounts for administration to a human subject can be determined in animal tests and any art-accepted methods for scaling an amount determined to be effective for an animal for human administration. For example, an amount can be initially measured to be effective in an animal model (e.g., to achieve a beneficial or desired clinical result). The amount obtained from the animal model can be used in formulating an effective amount for humans by using conversion factors known in the art. The effective amount obtained in one animal model can also be converted for another animal by using suitable conversion factors such as, for example, body surface area factors.

It is to be understood that, for any particular subject, specific dosage regimes should be adjusted over time according to the individual need and the professional judgment of the person administering or supervising the administration of the $BD_L$. For example, a $BD_L$ dosage for a particular subject with an autoimmune disease can be increased if the lower dose does not elicit a detectable or sufficient improvement in one or more clinical indications of the autoimmune disease. Conversely, the dosage can be decreased if the autoimmune disease is treated or eliminated.

In some cases, therapeutically effective amounts of $BD_L$ can be determined by, for example, measuring the effects of a therapeutic in a subject by incrementally increasing the dosage until the desired symptomatic relief level is achieved. A continuing or repeated dose regimen can also be used to achieve or maintain the desired result. Any other techniques known in the art can be used as well in determining the effective amount range. Of course, the specific effective amount will vary with such factors as the particular disease state being treated, the physical condition of the subject, the type of animal being treated, the duration of the treatment, route of administration, and the nature of any concurrent therapy.

Following administration of $BD_L$ to an individual subject afflicted by, prone to, or likely to develop a disease or injury described herein, a clinical symptom or feature associated with the disease or injury is observed and assessed for a positive or negative change. For example, for methods of treating multiple sclerosis in a subject, positive or negative changes in the subject's disease progression during or following treatment may be determined by any measure known to those of skill in the art including, without limitation, MRI and Expanded Disability Status Scale (EDSS) scoring. EDSS scoring is a method of quantifying disability in multiple sclerosis and monitoring changes in the level of disability over time.

In some embodiments, $BD_L$ are administered to a subject in need thereof using adoptive cell transfer. As used herein "adoptive cell transfer" refers to treatment of a subject by first administering to a subject a lymphodepleting agent to reduce a subjects natural lymphocyte population followed by administration of the immunotherapeutic cells of interest. Suitable lymphodepleting agents are known in the art and include, but are not limited to, cyclophosphamide and fludarabine.

In any of the methods of the present invention, the donor and the recipient of the $BD_L$ can be a single individual or different individuals, for example, allogeneic or xenogeneic individuals. As used herein, the term "allogeneic" refers to something that is genetically different although belonging to or obtained from the same species (e.g., allogeneic tissue grafts or organ transplants). "Xenogeneic" means the cells could be derived from a different species.

The present invention has been described in terms of one or more preferred embodiments, and it should be appreciated that many equivalents, alternatives, variations, and modifications, aside from those expressly stated, are possible and within the scope of the invention.

The invention will be more fully understood upon consideration of the following non-limiting Examples.

EXAMPLES

Our published studies suggest that a specific subset of B cells of unknown phenotype play a critical role in immune tolerance. Using a partial B cell depletion strategy to enrich for B cells with regulatory activity, we found that B cells exhibiting an IgD low (L) ($BD_L$) phenotype induce Treg expansion and promote recovery from EAE, an experimental autoimmune disorder. Both genetic and developmental studies led us to conclude that $BD_L$ are a new subset of mature B cells. Importantly, human B cells with an $IgD^{low/-}$ phenotype exhibit $BD_L$ regulatory activity by the induction of Treg proliferation. The ability to modulate Treg numbers to either suppress or enhance immune responses is a goal for the treatment of disease. Thus the ability to harness the regulatory function of $BD_L$ is of therapeutic interest.

Figures 11A, 11B, 11C:
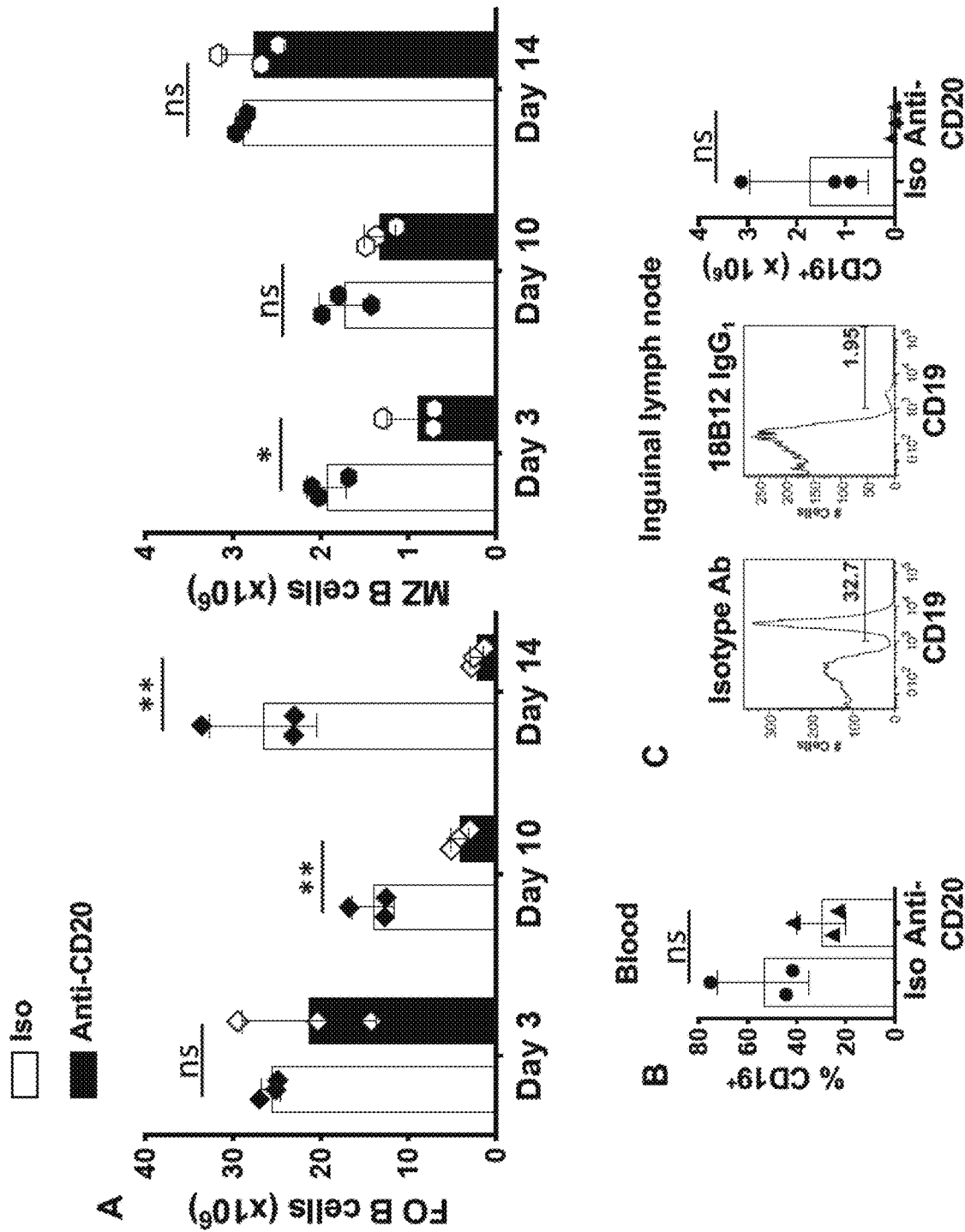
FIGS. 11A-11C show B cell depletion in the spleen, blood and inguinal lymph nodes with anti-CD20 IgG1. B10.PL mice were i.v. administered anti-CD20 (18B12IgG1) or its isotype control (2B8msIgG1) (250 mg). Three (A), 10 (A) or 14 (A-C) days later the absolute number of total B cells (CD19+) in the spleen (A), peripheral blood (B) and inguinal lymph nodes (C) was determined by flow cytometry. Individual data points (mice) are shown superimposed upon the mean±SEM. C) The left two histograms show representative flow cytometry gating. *p<0.05; **p<0.01; ns=not significant.

Anti-CD20 $IgG_1$ B cell depletion retains regulatory activity—In our previous studies, total B cell depletion with anti-CD20 IgG2a prior to EAE induction led to significantly reduced Treg numbers and the inability to recover from EAE[3], indicating that the protective B cell population was depleted. These data suggested that a specific B cell population that facilitates Treg homeostasis and EAE resolution could be identified[3]. To that end, the strategy we chose was to partially deplete B cells with anti-CD20 that contains the same antigen recognition domain, but with the $IgG_{2a}$ Fc region swapped for $IgG_1$[12]. Administration of anti-CD20 $IgG_1$ lead to a significant reduction in the total number of splenic B cells that was due to 85% loss of FO B cells, while sparing the MZ subset (FIG. 1A). Representative flow cytometry plots are shown in FIG. 1B. The kinetics of anti-CD20 $IgG_1$ B cell depletion are shown in FIG. 11A. We developed a 4-color immunofluorescence strategy to visualize B cell depletion by staining for the T cell zone (CD3), B cell follicle ($IgD^+IgM^+$) and the MZ (SIGN-R1). In isotype control mice splenic architecture is shown as a distinct T cell zone surrounded by B cell follicles encircled by the MZ (FIG. 1C, left panel).

Following anti-CD20 $IgG_1$ administration, interestingly, IgD expression was lost while IgM expression remained (FIG. 1C, right panel). The MZ remained intact and there was no impact on the T cell zone (FIG. 1C, right panel). In addition, there was ~30% reduction in peripheral blood B cells (FIG. 11B) and ~95% reduction in lymph node B cells (FIG. 11C). We also found that Treg numbers were not altered (FIG. 1D).

Figure 12:
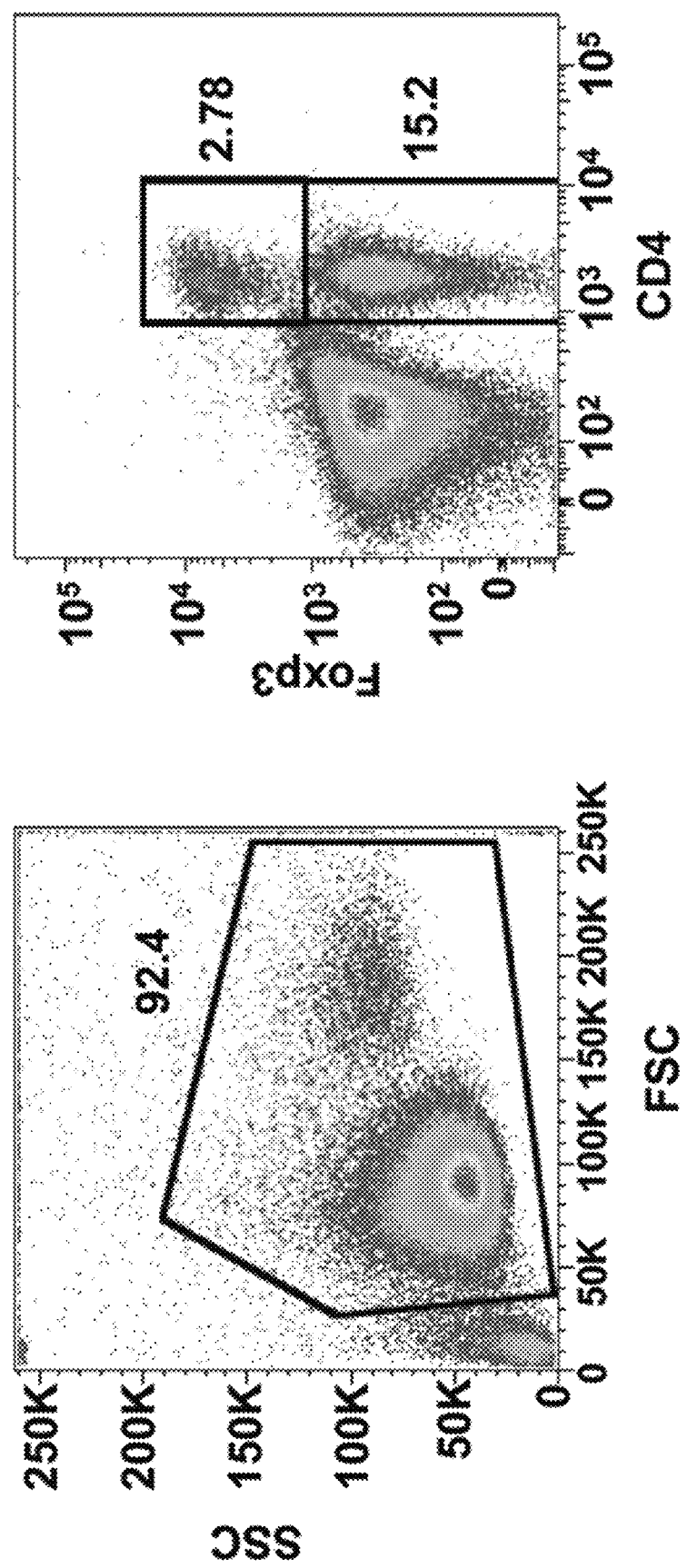
FIG. 12 shows a representative gating strategy for mouse CD4+ T cells and Treg. Single cell suspensions from the spleen were stained for CD4 and Foxp3. The cells were gated for lymphocytes (left panel) and subsequently analyzed for CD4 and Foxp3 expression (right panel). CD4+ Foxp3+ Treg are located in the upper right gate. This gating strategy is for FIGS. 1D, 3A, 3B, 3D, 3E, 3G and 5B-D.

Representative $CD4^+$ T cell and Treg flow cytometry is shown in FIG. 12. When we induced EAE in the anti-CD20 treated mice they recovered similarly to WT and isotype control treated mice, as compared to chronic disease in MT mice (FIG. 1E). We next determined whether B cells refractory to anti-CD20 $IgG_1$ depletion retained regulatory activity. Mice receiving anti-CD20 $IgG_1$-depleted B cells recovered in a similar manner as the WT controls (FIG. 1F). Subsequently, we found that the FO, but not MZ, B cell subset was responsible for recovery from EAE (FIG. 1G).

Figures 2A, 2B, 2C, 2D, 2E, 2F, 2G, 2H, 2I:
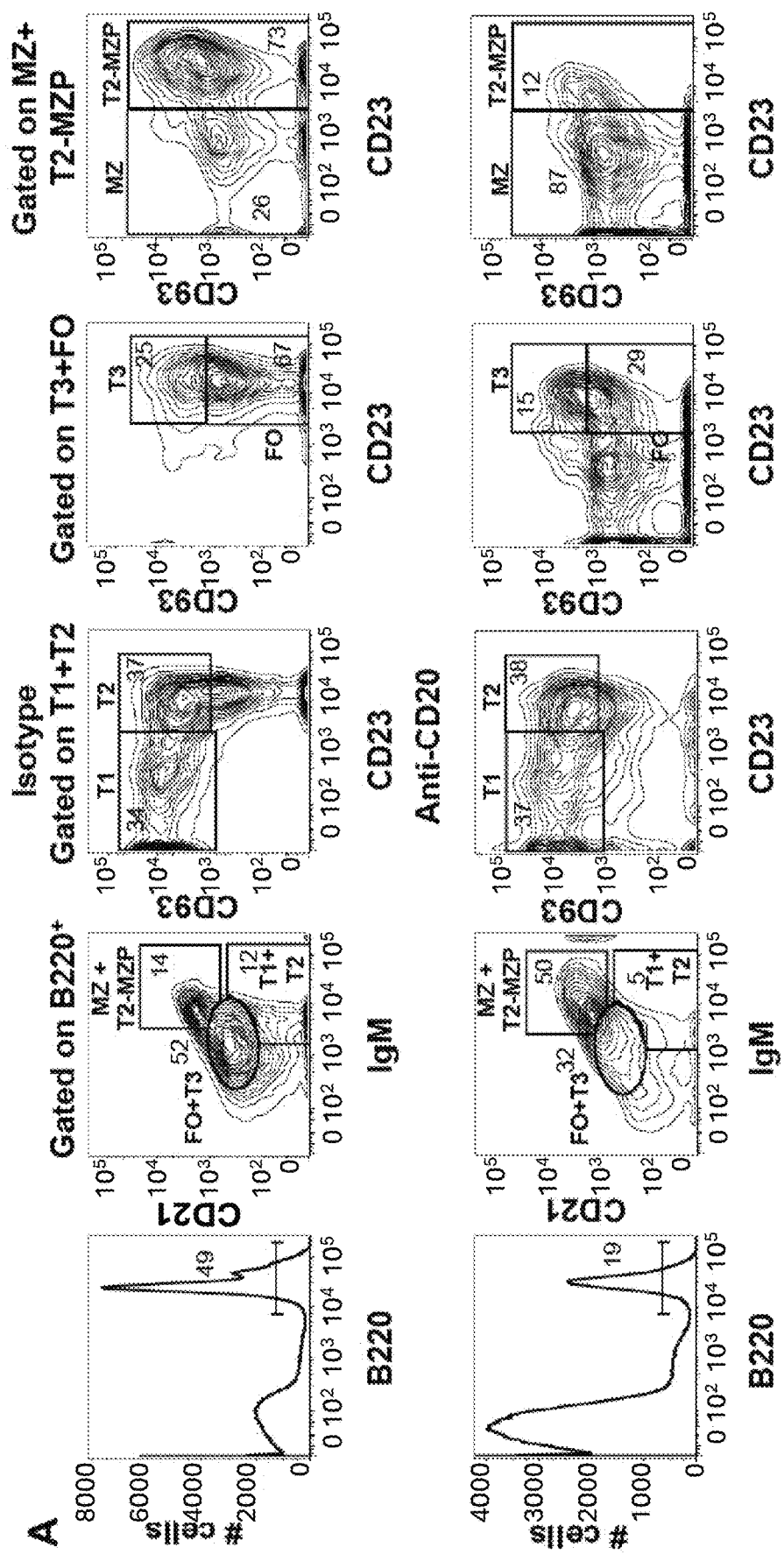
FIGS. 2A-2I show retained B cells after anti-CD20 IgG$_1$ depletion are enriched for IgD$^{low/-}$ expression. A) Representative flow cytometry gating strategies in B10.PL mice are shown for splenic B220+B cells differentiating T1, T2, T3, T2-MZP, FO and MZ B cells utilizing differential expression of IgM, CD21, CD23 and CD93 14 days after administration of isotype (top row) or anti-CD20 IgG$_1$ (bottom row). B) IgD expression was assessed on the FO B cell subset from A. C-I) WT C57BL/6 mice were used to assess expression levels of IgD (C), IgM (D), B220 (E), CD20 (F), CD23 (G), CD21 (H) and CD93 (I) on MZ, BD$_L$ and FO B cells by flow cytometry. The mean fluorescence intensity±SEM is shown from 9 mice.
Figures 2A, 2B, 2C, 2D, 2E, 2F, 2G, 2H, 2I:
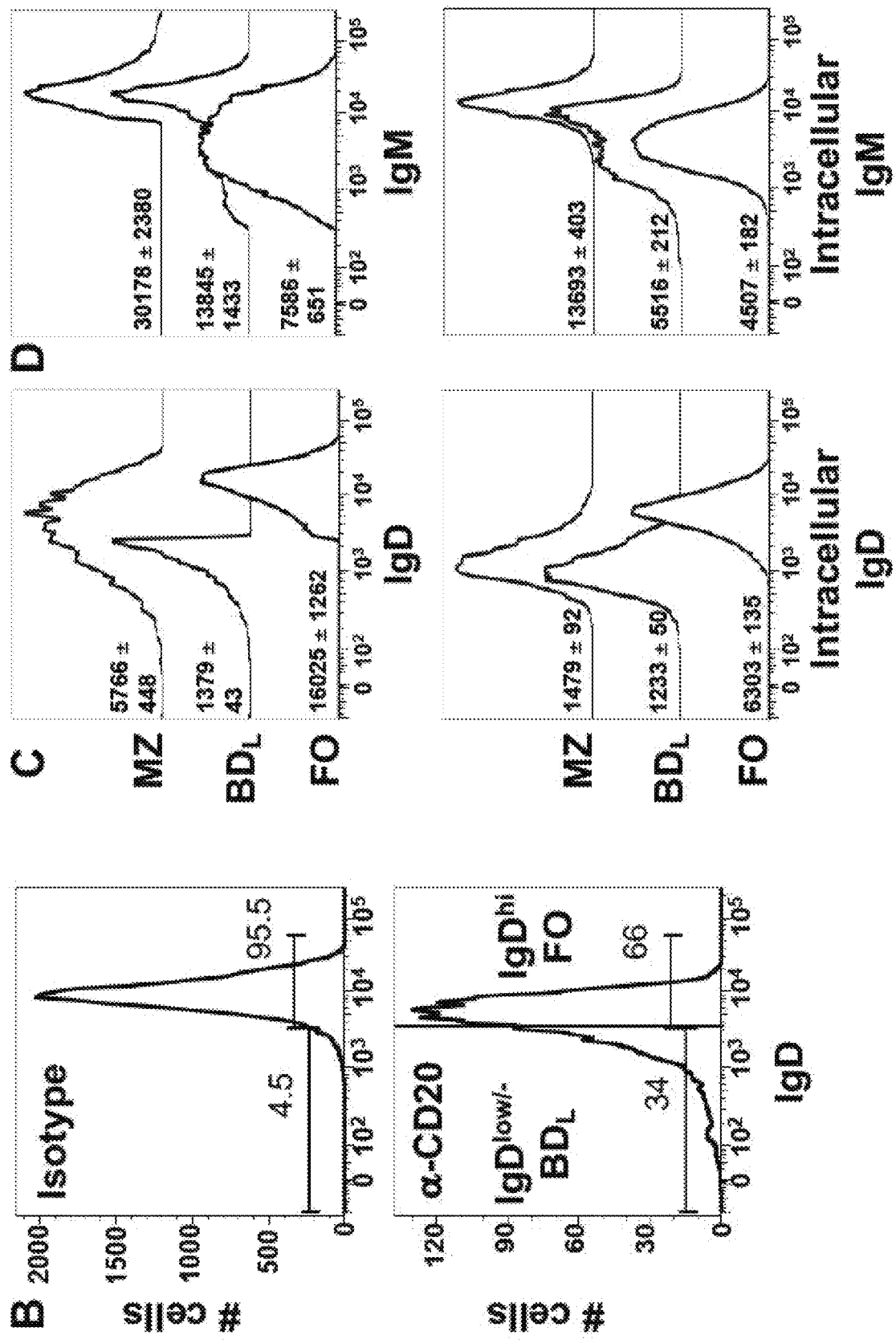
Figures 2A, 2B, 2C, 2D, 2E, 2F, 2G, 2H, 2I:
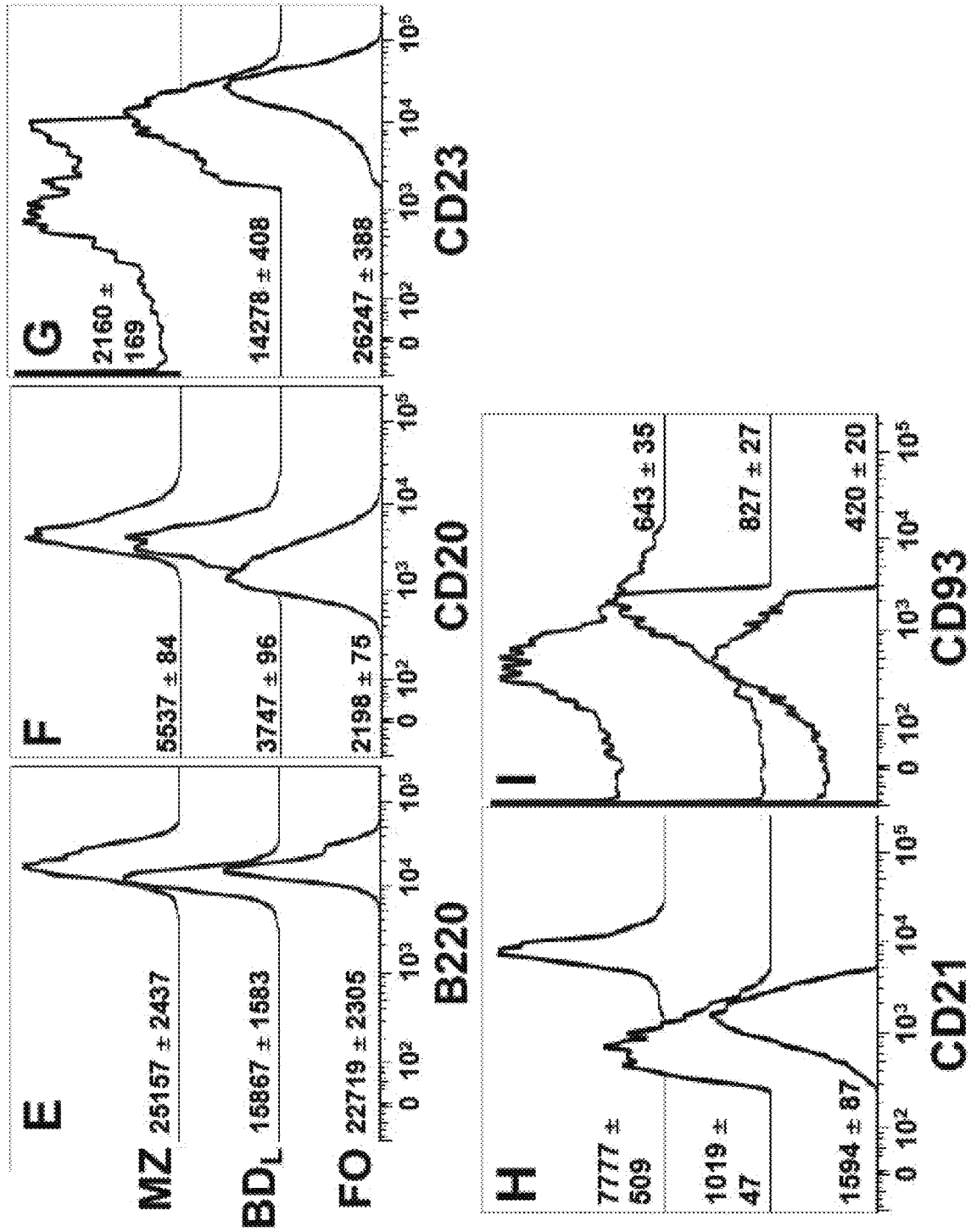

Anti-CD20 IgG$_1$ depleted B cells are enriched for IgD$^{low/-}$ Given that B cell regulatory activity resided within the retained FO B cell subset they were further analyzed by flow cytometry to uncover an enriched phenotype. This was accomplished by utilizing a B cell gating strategy utilizing differential expression of IgM, CD21 and CD23[13,14]. First, B220$^+$ B cells and differential IgM and CD21 expression was used to define three groups: IgM$^{hi}$CD21$^{hi}$ containing T2-MZP and MZ B cells, IgM$^{int}$CD21$^{int}$ containing T3 and FO B cells and IgM$^{hi}$CD21$^{low/-}$ containing T1 and T2 B cells (FIG. 2A). We then used CD93 and CD23 expression to further delineate each of the three groups. Because B cell depletion with anti-CD20 IgG$_1$ resulted in a loss of IgD expressing cells in the B cell follicle (FIG. 1C), we measured IgD expression on the retained FO subset and found an eight-fold enrichment in IgD$^{low/-}$ B cells or BD$_L$ (FIG. 2B). The FO IgD$^{hi}$ subset will henceforth will be referred to as FO B cells (FIG. 2B). Because B cell depletion with anti-CD20 IgG$_1$ may impact the phenotype of the remaining B cells, we repeated our staining strategy using naive mice and included additional B cell markers. First, we determined whether the reduction in cell surface expression of IgD by BD$_L$ was due to lack of protein expression. As shown in FIG. 2C, the reduced level of cell surface IgD expression by BD$_L$, as compared to FO B cells, was paralleled by a similar reduction in intracellular IgD (FIG. 2C). MZ B cells, the control for IgD$^{low}$ expression, also had reduced intracellular IgD (FIG. 2C). For IgM, BD$_L$ expressed higher levels of cell surface IgM (FIG. 2D, top histogram), but similar levels of intracellular IgM, as compared to FO B cells (FIG. 2D). MZ B cells expressed the highest levels of both cell surface and intracellular IgM (FIG. 2D).

We then further refined the expression pattern of BD$_L$ in naïve mice and found that they expressed slightly lower levels of the B cell marker B220, as compared to FO and MZ B cells (FIG. 2E). Their expression of CD20 was intermediate between FO and MZ B cells indicating that reduced CD20 expression was not likely why they were retained (FIG. 2F). BD$_L$ expressed an intermediate level of CD23 (FIG. 2G) and expressed the lowest levels of CD21 (FIG. 2H). BD$_L$ express the highest levels of CD93 of the three subsets (FIG. 2I). These data suggest that BD$_L$ are a splenic B cell subset that to the best of our knowledge has not been previously described. These results indicate that the refined BD$_L$ phenotype is B220$^+$ IgD$^{low/-}$ CD21$^{int}$CD23$^+$ CD93$^{int}$.

Figures 3A, 3B, 3C, 3D, 3E, 3F, 3G:
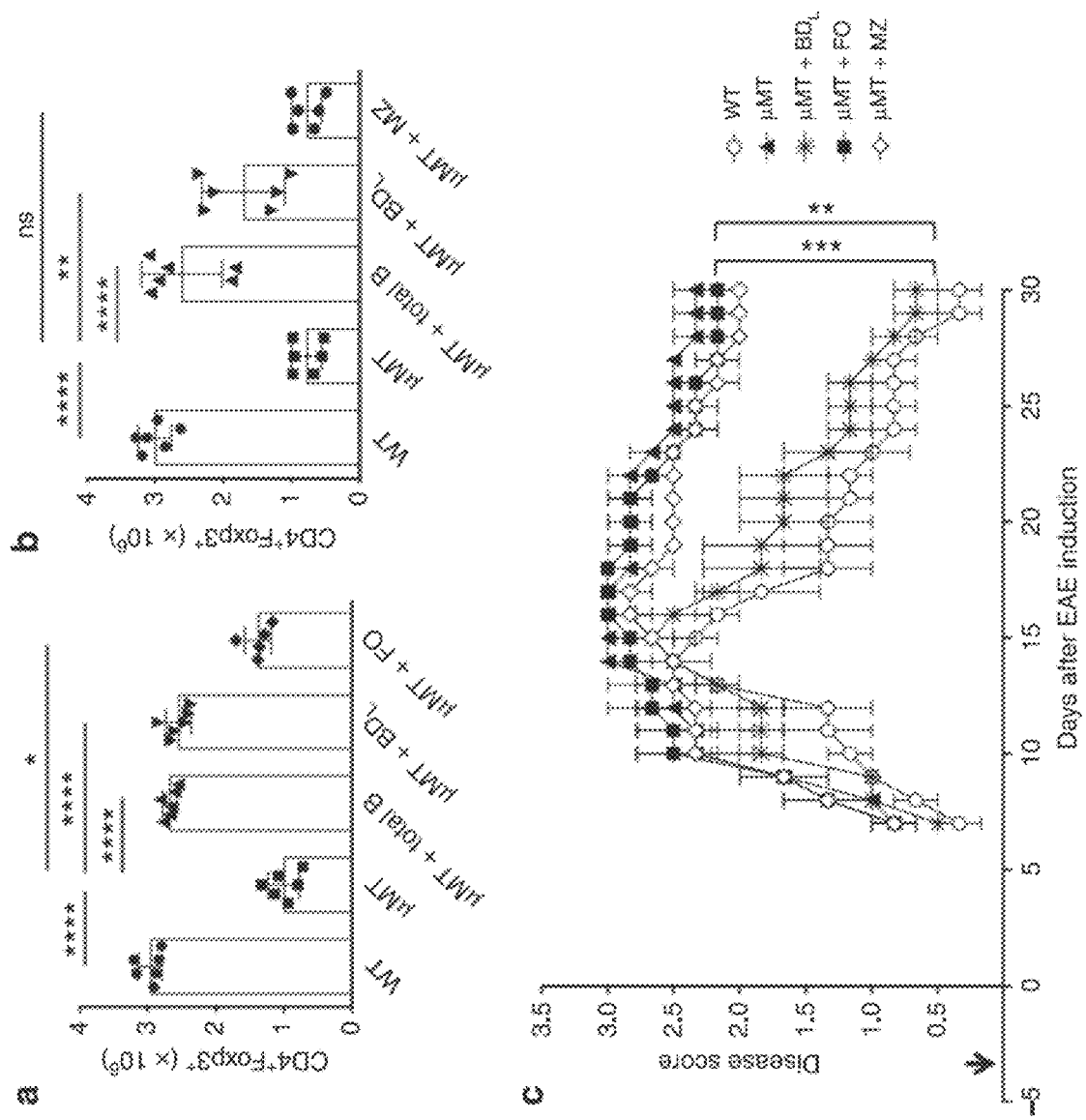
FIGS. 3A-3G show splenic BD$_L$ exhibit regulatory activity while FO and MZ B cells do not. A,B) B10.PLμMT (μMT) mice were treated with PBS or reconstituted with 5×10$^6$ FACS purified splenic total (B220$^+$), BD$_L$ (A,B), FO (A) or MZ (B) B cells from anti-CD20 IgG$_1$ treated mice and the absolute number of splenic Treg was determined by flow cytometry 10 days later. B10.PL (WT) and B10.PLμMT control mice received PBS. Pooled data from two independent experiments is shown. Individual data points (mice) are shown superimposed upon the mean±SEM. A) *p<0.05, MT versus FO; **p<0.0001, WT versus μMT, μMT versus Total B and μMT versus BD$_L$. B) p<0.01, μMT versus BD$_L$; **p<0.0001, WT versus μMT and μMT versus Total B. ns=not significant. C-E) B10.PL (WT) or B10.PLμMT (μMT) mice were sublethally irradiated and 5×10$^6$ BD$_L$, FO or MZ B cells were adoptively transferred into B10.PLμMT mice (arrow) and three days later EAE was induced as for FIG. 1E. C) EAE scores were assessed daily. The data shown is the mean±SEM daily disease score of three mice from one representative experiment of three. p<0.01, WT versus μMT, WT versus FO, MT versus BD$_L$ and μMT versus Total B; ***p<0.001, WT versus MZ for the day 30 time point. D,E) The absolute number of Treg (CD4$^+$Foxp3$^+$, D) and conventional CD4 T cells (CD4$^+$Foxp3$^-$, E) was determined in the spleen by flow cytometry on days 7, 18 and 30 following EAE induction. N=2-4. *p<0.05. F,G) CHS was induced in C57BL/6 WT or μMT mice treated with PBS or μMT mice that had received 5×10$^6$ BD$_L$, FO or MZ B cells by painting one ear with 3% oxazolone on days 0 and 6. F) Ear thickness was measured every 24 hr for 6 days. Data shown are the mean change in ear thickness±SEM from time 0 measured just prior to the second treatment. N=6. **p<0.0001, WT versus μMT, MZ and FO WT and μMT versus μMT+BD$_L$ for the 120 hr timepoint. G) CD4$^+$Foxp3$^+$ Treg were quantitated in the spleen at 120 hr. p<0.01, MT versus μMT+BD$_L$; ***p<0.0001, WT versus μMT for the 120 hr timepoint. N=3 mice. ns=not significant. Statistical significance was determined using the unpaired t-test.
Figures 13A, 13B, 13C, 13D, 13E:
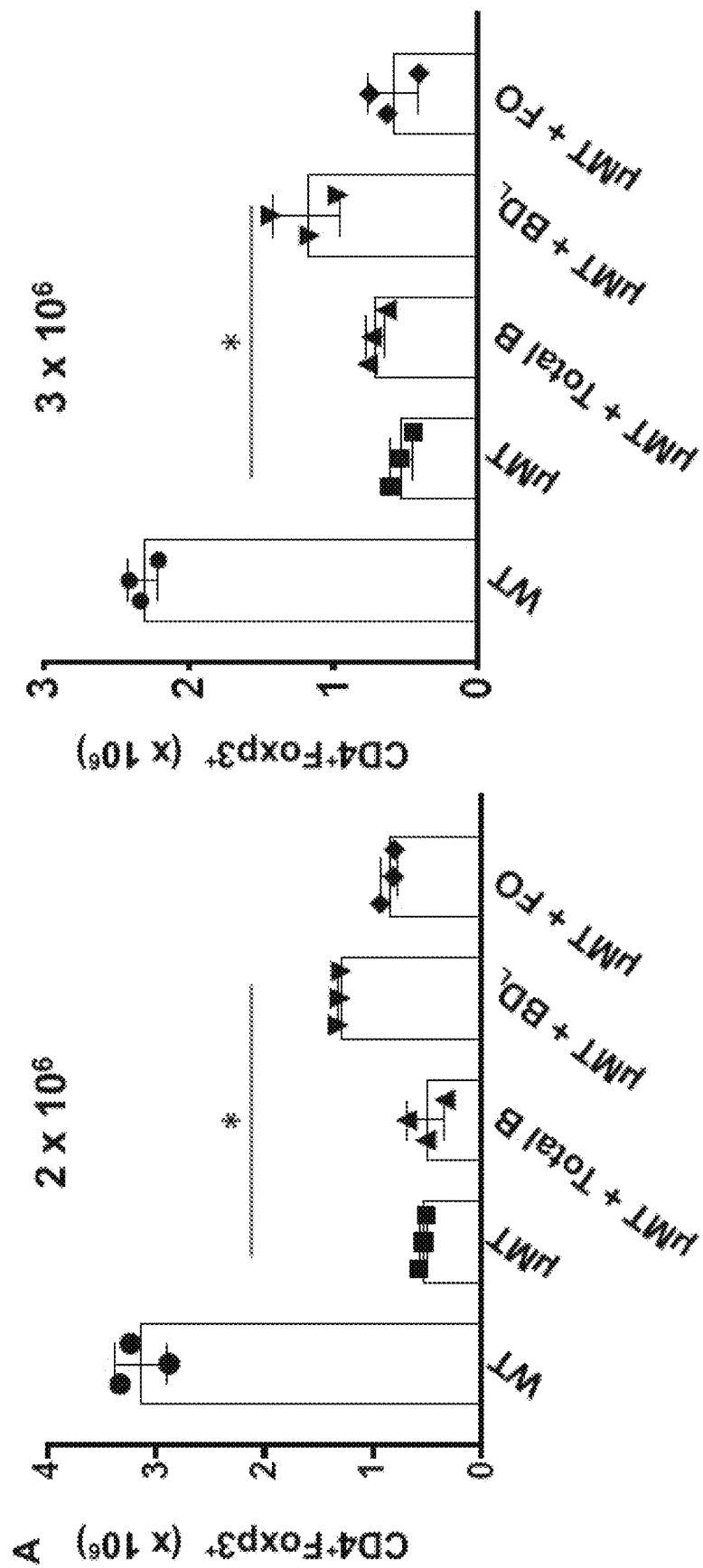
FIGS. 13A-13E show BD$_L$ induce Treg proliferation in a dose-responsive manner independent of IL-10. B10.PL μMT mice were reconstituted with 2×10$^6$ (A, left panel) or 3×10$^6$ (B, right panel) FACS purified total, BD$_L$ or FO B cells and the absolute number of splenic Treg was determined by flow cytometry 10 days later. WT and μMT mice received PBS. Individual data points (mice) are shown superimposed upon the mean±SEM. *p<0.05. B) Splenic Treg (CD4+ Foxp3EGFP) were sorted and labeled with cell proliferation dye and were i.v. transferred (0.2×10$^6$) into μMT mice with WT or Il10-/- FACS purified BD$_L$ (5×10$^6$) or alone. Seven days later proliferation of the labeled EGFP+ Treg in the spleen was determined by flow cytometry. WT C57BL/6 mice were used to assess expression levels of CD5 (C), CD1d (D) and Tim1 (E) on BD$_L$ by flow cytometry.
Figures 13A, 13B, 13C, 13D, 13E:
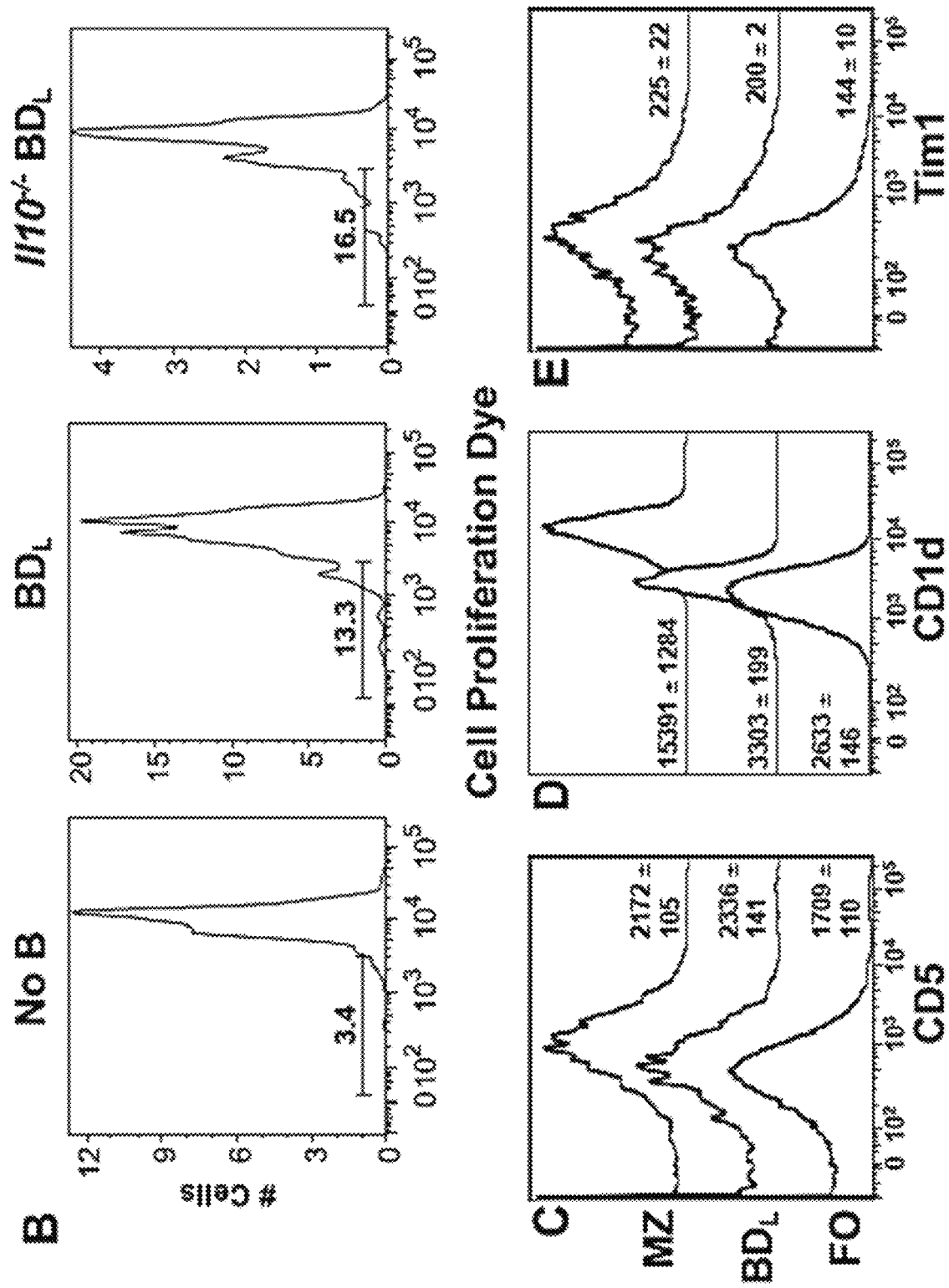

BD$_L$ regulatory activity is IL-10-independent We next demonstrated that BD$_L$ exhibit B cell regulatory activity by driving Treg expansion after transfer into µMT mice similarly to total B cells (FIG. 3A,B). In contrast, neither FO (FIG. 3A) nor MZ (FIG. 3B) B cell transfer led to a significant increase in Treg. To determine the lowest number of BD$_L$ required to induce maximal Treg proliferation, we performed a dose-response curve and found that 2×10$^6$ and 3×10$^6$ BD$_L$ induced similar levels of Treg expansion (FIG. 13A), but 5×10$^6$ BD$_L$ was required to completely restore Treg numbers (FIG. 3A,B). We confirmed that BD$_L$ induced Treg proliferation in an IL-10-independent manner (FIG. 13B). We also confirmed that BD$_L$ did not express high levels of CD5 (FIG. 13C), CD1d (FIG. 13D) or Tim1 (FIG. 13E), which are markers of IL-10 producing B cells[5].

We next tested the regulatory potential of BD$_L$ in EAE. To control for the possibility that IgG$_1$ anti-CD20 treatment modulated the function of the non-depleted cells, FACS purified splenic B cell subsets from naïve mice were utilized. Adoptive transfer of BD$_L$ into µMT mice prior to EAE induction resulted in complete recovery similar to WT (FIG. 3C). In contrast, µMT control mice and those that received FO or MZ B cells did not recover (FIG. 3C). We next determined the kinetics of Treg expansion during EAE and found that in WT mice Treg numbers that started at ~3×10$^6$ (FIG. 3A) were decreased in the spleen at the onset (day 7) and peak of disease (day 18) that then increased when the mice recovered from EAE (FIG. 3D). In MT mice, Treg numbers were similar on day 0 and 7, but were decreased on days 18 and 30 (FIG. 3A versus FIG. 3D). In MT mice that received BD$_L$, Treg numbers were similar to WT on day 7, which were reduced on days 18 and 30 (FIG. 3D). Importantly, in MT mice that received BD$_L$ Treg numbers were significantly elevated at every time point as compared to µMT mice (FIG. 3D). We also tracked the fate of conventional CD4 T cells and found in each of the experimental conditions their numbers increased at the peak of disease and then were reduced on day 30 (FIG. 3E). As with Treg, conventional CD4 T cell numbers were significantly higher in the BD$_L$ group as compared to µMT mice (FIG. 3E). These data indicate that BD$_L$ also likely promote CD4 T cell expansion. A reduction in Treg and conventional CD4 T cells on day 7 as compared to day 0 (FIG. 3A) is consistent with the mice being sublethally irradiated for EAE induction.

To demonstrate that BD$_L$ regulatory activity is not restricted to EAE, we performed the same experiment in a contact hypersensitivity (CHS) model that does not require B cells for induction[15]. As with EAE, MT mice exhibited a more severe disease course than WT mice that was normalized to WT levels in mice that received BD$_L$ (FIG. 3F). In contrast, when FO or MZ B cells were transferred ear swelling was similar to the MT control mice (FIG. 3F). Only mice that received BD$_L$ exhibited a significant increase in Treg numbers at 120 hours, albeit not to WT levels, which is consistent with slightly increased ear swelling as compared to WT mice (FIG. 3F,G).

Figures 4A, 4B, 4C, 4D, 4E, 4F:
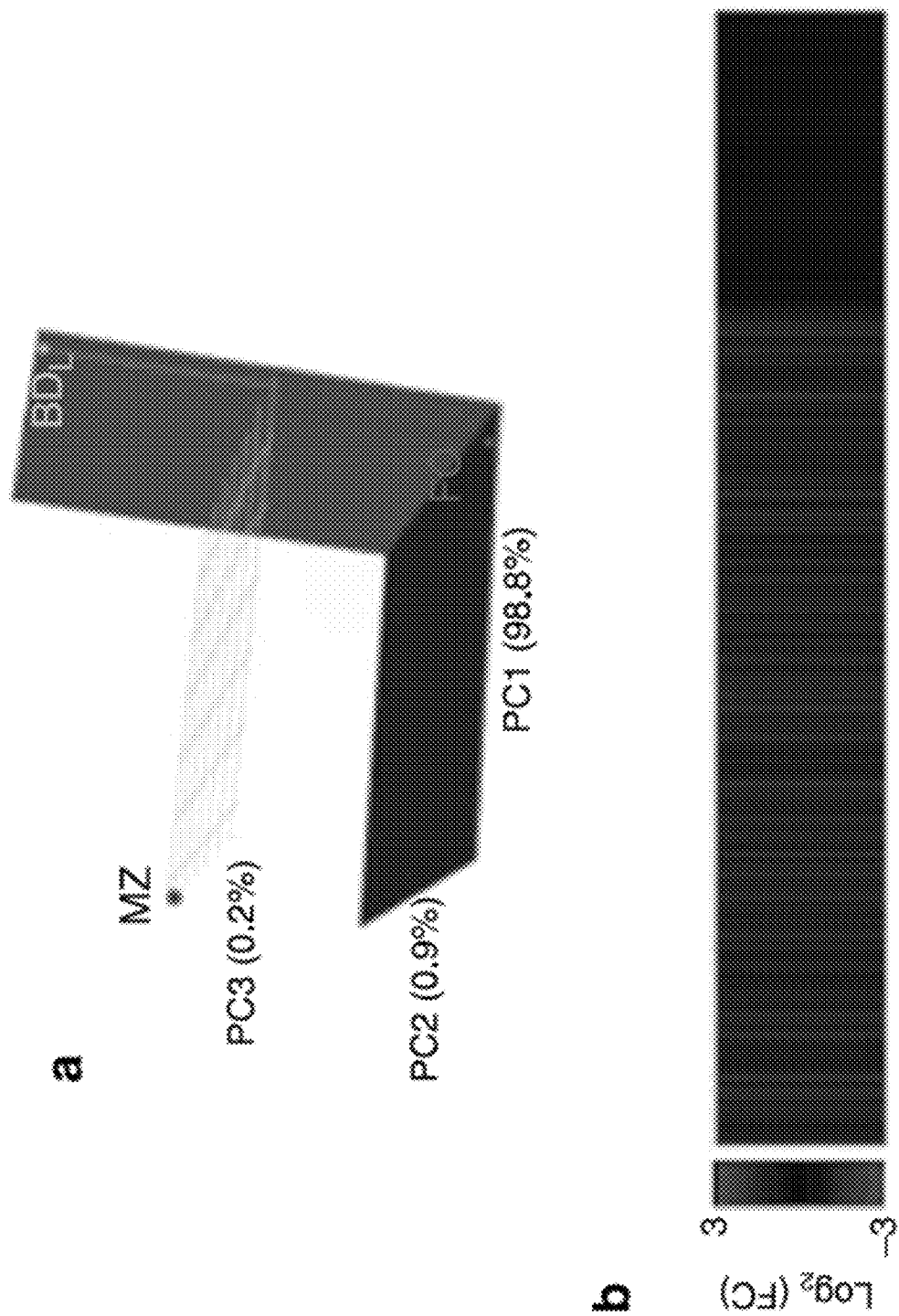
FIGS. 4A-4F show BD$_L$ undergo a high rate of proliferation. RNA-seq analysis was performed on FACS purified splenic BD$_L$, FO and MZ B cells from B10.PL mice. A) PC analysis was performed on the Log$_2$ transformed FPKM, with the % variance encompassed within each PC shown. The distribution of BD$_L$ (green), FO (red) and MZ (blue) B cells within the 3D plot are shown. B) A heat map displaying the Log$_2$ fold change for genes that showed a significant difference (Benjami-Hochberg adjusted p<0.05) between BD$_L$ and FO B cells are shown. Red bars show genes more highly expressed and blue reduced expression in BD$_L$ cells. N=3. C-E) Barplots of the most highly differentially expressed genes (Log$_2$ fold change>2) in BD$_L$ cells compared to FO cells within the select Gene Ontology terms cell cycle/proliferation (C), developmental process (D) and cell surface signaling pathway (E) are shown. F) The percentage of splenic T1 (B220$^+$IgM$^{hi}$CD21$^{low}$CD23$^-$ CD93$^+$), T2, T2-MZP (B220$^+$IgM$^{hi}$CD21$^{hi}$CD23$^+$), MZ, BD$_L$ and FO B cells from C57BL/6J mice expressing Ki-67 was determined by flow cytometry. F) Individual data points (mice) are shown superimposed upon the mean±SEM from one independent experiment of two. ****p<0.0001. Statistical significance was determined using the unpaired t-test.
Figures 4A, 4B, 4C, 4D, 4E, 4F:
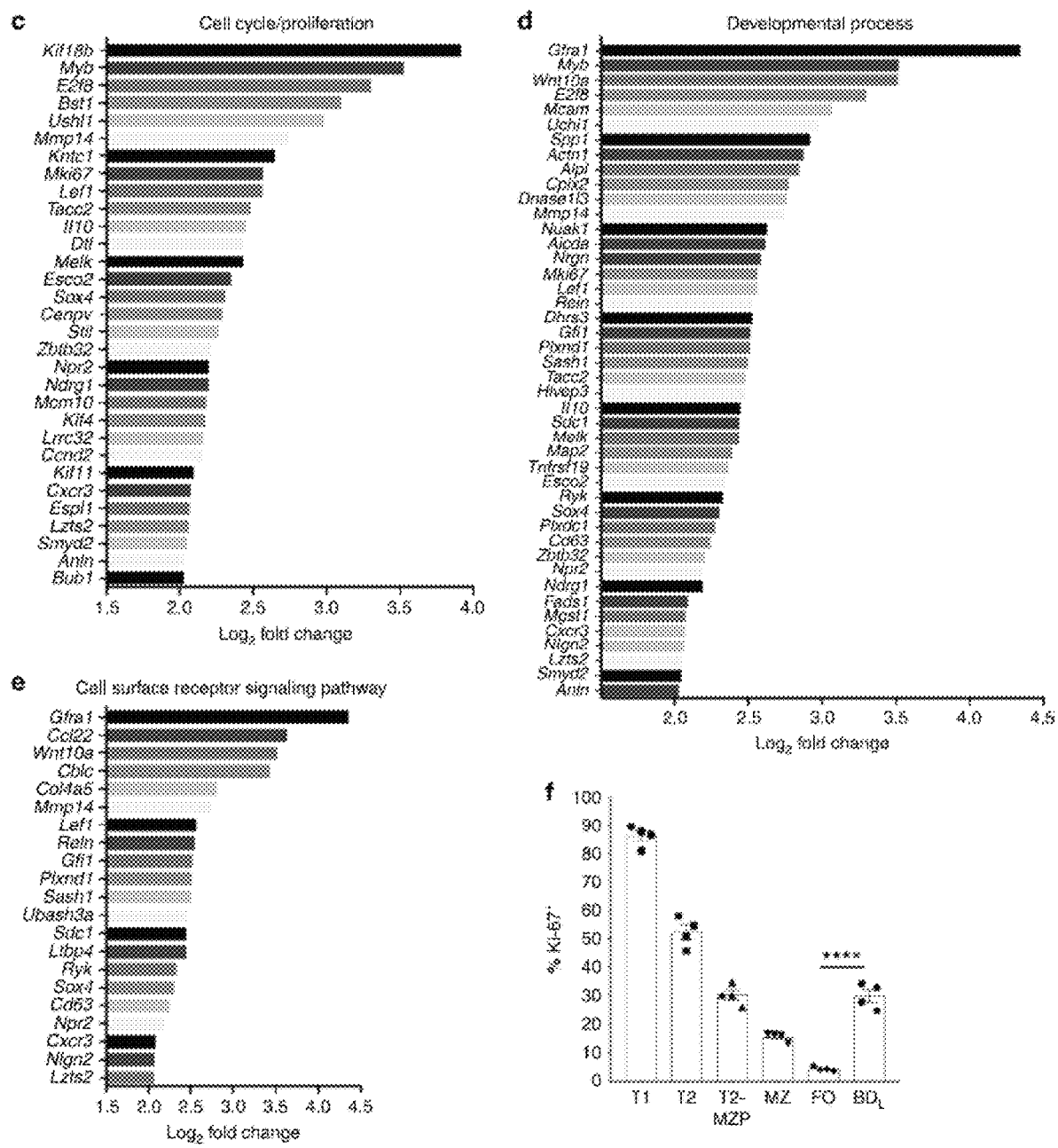
Figures 14A, 14B:
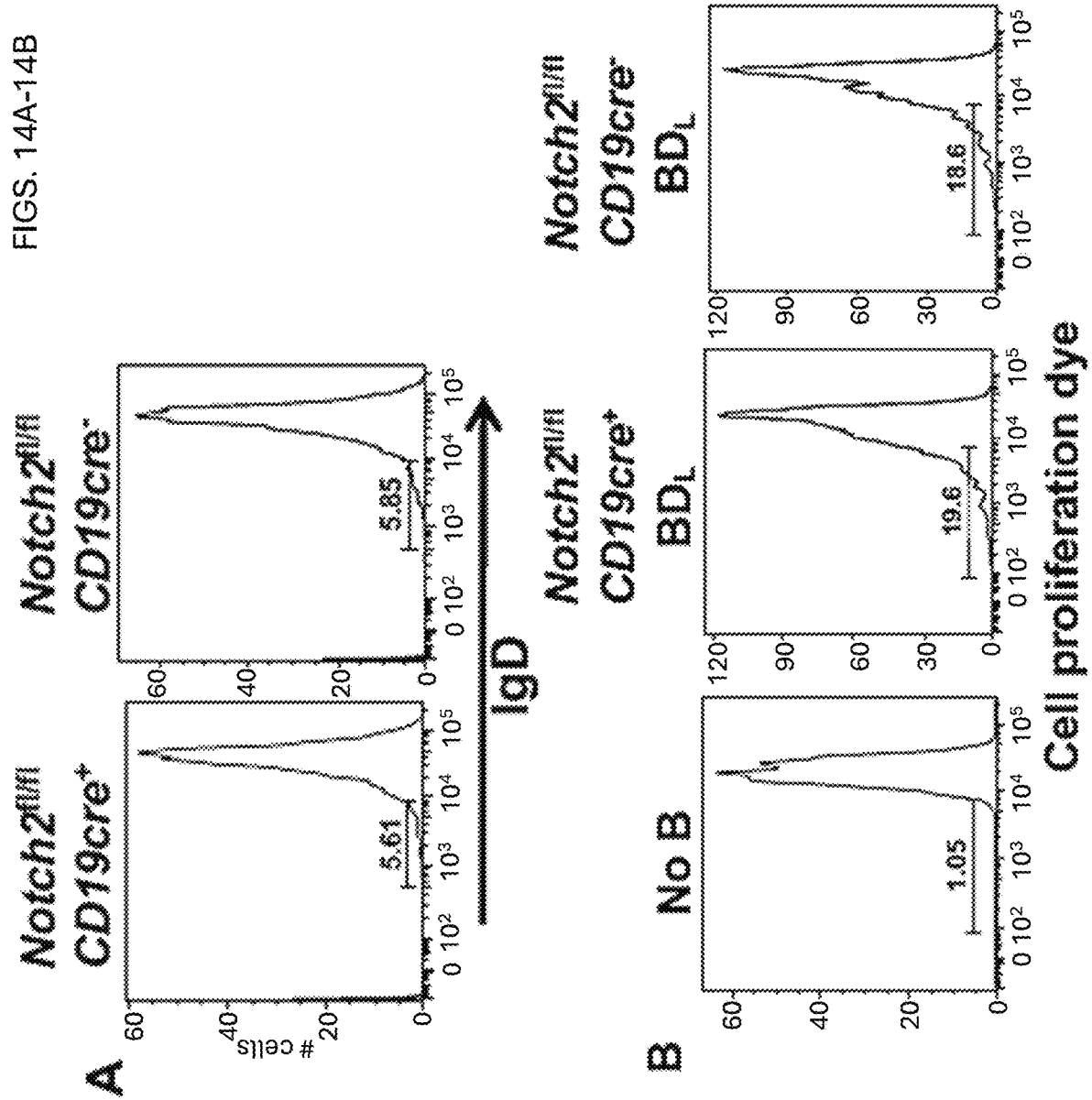
FIGS. 14A-14B show BD$_L$ are not from the MZ B cell lineage. A) The presence of BD$_L$ was determined in the spleen of Notch2fl/flCD19cre+ and Notch2fl/flCD19cre– mice by flow cytometry. Splenic Treg (CD4+Foxp3EGFP) were FACS purified and labeled with cell proliferation dye and were i.v. transferred (0.2×106) into μMT mice with WT, Notch2fl/flCD19cre+ or Notch2fl/flCD19cre– FACS purified BD$_L$ (5×106) or alone. Seven days later proliferation of the labeled EGFP+ Treg in the spleen was determined by flow cytometry.

BD$_L$ are a new B cell subset separate from FO and MZ B cells To determine whether BD$_L$ could be differentiated from FO and MZ B cells, we performed RNA-seq comparing splenic BD$_L$ to FO and MZ B cells. Using principle component (PC) analysis plotted in 3D, we obtained the expected result that FO and MZ B cells cluster differentially in all three dimensions (FIG. 4A). A similar result was obtained when BD$_L$ and MZ B cells were compared (FIG. 4A). To further confirm that BD$_L$ are distinct from the MZ B cell lineage, we utilized mice with a conditional deletion in Notch2 in B cells that lack MZ B cells[16]. We found that the percentage of BD$_L$ within the FO B cell subset (FIG. 14A) and their regulatory function were identical in Notch2$^{fl/fl}$ CD19Cre$^+$ and the control Notch2$^{fl/fl}$ CD19Cre$^-$ mice (FIG. 14B). These cumulative data provide evidence that BD$_L$ are unrelated to MZ B cells.

Figure 15:
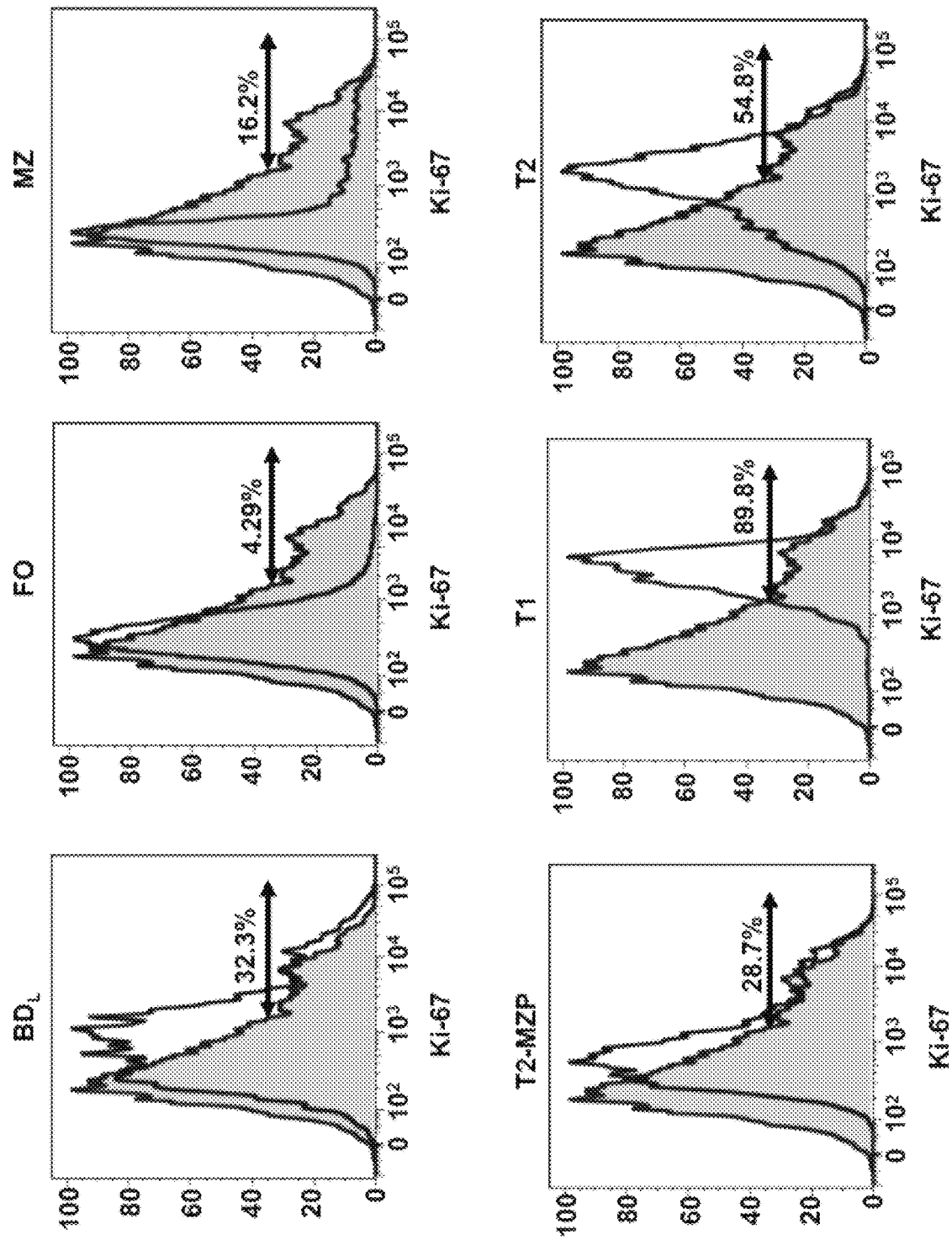
FIG. 15 shows representative gating strategy for Ki-67 analysis. Single cell suspensions from the spleen were stained for B cell markers and gated as for FIG. 2A for BD$_L$, FO, MZ, T2-MZP, T1 and T2 subsets. The gating control is a single color Ki-67 stain of total splenocytes in which the negative and positive populations are discernable. The positive control gating is shown by the arrow. This gating strategy is for FIG. 4F.

When we compared BD$_L$ and FO B cells, the subsets clustered similarly in PC1 and PC2 (FIG. 4A). However, in PC3 the two B cell subsets clustered separately. When we compared BD$_L$ and FO B cells, we found that 343 transcripts were significantly more highly expressed (red) in BD$_L$ and 121 transcripts were significantly less expressed (blue) (FIG. 4B). These data demonstrate that BD$_L$ express a unique transcriptome that can be used to distinguish them from FO B cells. Using gene set overrepresentation analysis, we found increased expression of genes involved in cell cycle/proliferation in BD$_L$ (FIG. 4C). Forty-four genes involved in developmental processes (FIG. 4D) and 21 genes involved in cell surface receptor signaling (FIG. 4E) were increased. Because an increase in genes regulating cell cycle/division were increased in BD$_L$ (FIG. 4C), we then measured the steady state proliferation of splenic B cell subsets. Using Ki-67 staining proliferation was highest in the T1 and then T2 stages (FIG. 4F)[13,17,18]. As B cells matured into T2-MZP and MZ B cells proliferation decreased with the lowest level found in FO B cells (FIG. 4F). $BD_L$ exhibited identical levels of proliferation as T2-MZP (~30%) (FIG. 4F), which was significantly lower than FO B cells. Representative Ki-67 flow cytometry is shown in FIG. 15.

Figures 16A, 16B, 16C, 16D, 16E, 16F, 16G, 16H, 16I, 16J, 16K:
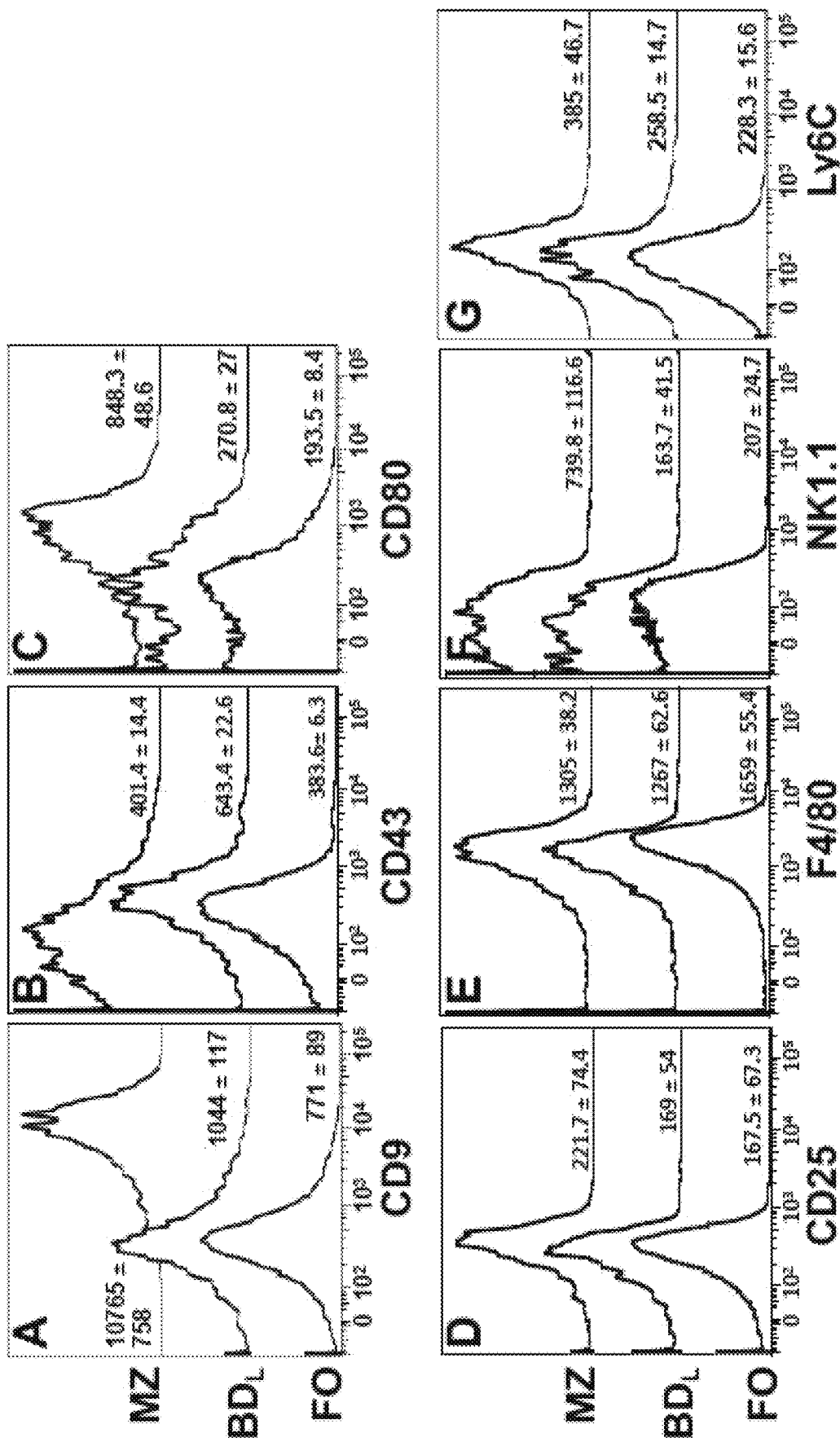
FIGS. 16A-16K show phenotypic comparisons of FO, $BD_L$ and MZ B cells. A-J) WT C57BL/6 mice were used to assess cell surface expression levels of the indicated proteins on FO, $BD_L$ and MZ B cells by flow cytometry. The mean fluorescence intensity SEM is shown from 4-9 mice. K) $BD_L$ and FO B cells were FACS purified and following cDNA generation qPCR was utilized to assess relative levels of Il16 mRNA expression. The Il6 primers used are: Forward-5'-TAGTCCTTCCTACCCCAATTTCC-3' (SEQ ID NO:1); Reverse-5'-TTGGTCCTTAGCCACTCCTTC-3' (SEQ ID NO:2). Individual data points are shown superimposed upon the mean±SEM. *p<0.05.

We then utilized flow cytometry to validate increased cell surface expression of proteins indicated in the RNA-seq. Cell surface proteins validated are CD93 (FIG. 2I), CD5 (FIG. 13C), CD9 (FIG. 16A), CD43 (FIG. 16B) and CD80 (FIG. 16C), albeit the increased expression was marginal. Cell surface proteins not validated include CD25 (FIG. 16D), F4/80 (FIG. 16E), NK1.1 (FIG. 16F) and Ly6C (FIG. 16G). We also examined additional B cell surface proteins not indicated by the RNA-seq analysis and found that $BD_L$ expressed slightly lower levels of CD38 (FIG. 16H) and CD40 (FIG. 16I) and higher levels of CD86 (FIG. 16J) as compared to FO B cells. MZ B cells were included in the analysis to further demonstrate that $BD_L$ do not share their partially activated phenotype (FIG. 16). Although both CD80 and CD86 levels were increased on $BD_L$, we previously demonstrated that neither was essential for B cells to induce Treg proliferation[3]. Although not indicated in the RNA-seq data (FIG. 4B), we showed that $BD_L$ expressed lower levels of the proinflammatory cytokine IL-6 by qRT-PCR (FIG. 16K), which has been shown to be a B cell effector cytokine in EAE[19].

Figures 5A, 5B, 5C, 5D:
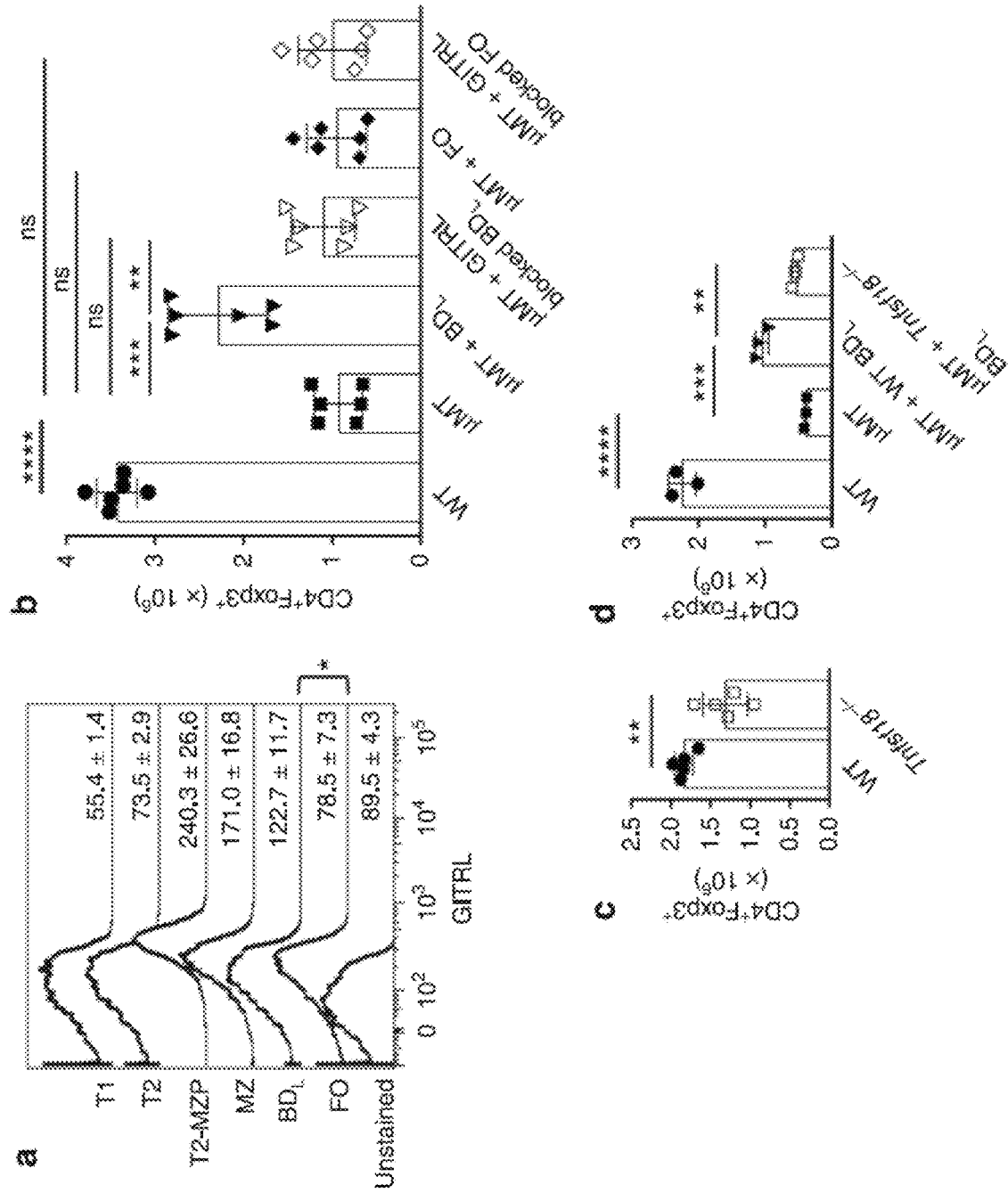
FIGS. 5A-5D show BD$_L$ regulatory activity is GITRL-dependent. A) The percentage of splenic T1, T2, T2-MZP, MZ, BD$_L$ and FO B cells from B10.PL mice expressing GITRL was determined by flow cytometry. The data shown is the mean±SEM of three mice from one of four independent experiments. *p<0.05, BD$_L$ versus FO B cells. B-D) C57BL/6 μMT mice were reconstituted with 5×10$^6$ FACS purified WT BD$_L$ (B,D), WT FO (B,D), Tnfsf18$^{-/-}$ (GITRL$^{-/-}$) BD$_L$ (D) cells from C57BL/6 mice with (B) or without (D) GITRL antibody blocking and the absolute number of splenic Treg was determined by flow cytometry 10 days later. C) Treg were quantitated in the spleen of WT and Tnfsf18$^{-/-}$ mice by flow cytometry. B) Individual data points (mice) are shown superimposed upon the mean±SEM from two independent experiments. p<0.01, MT+WT BD$_L$ versus μMT+GITRL blocked WT BD$_L$; *p<0.001, MT versus μMT+WT BD$_L$; **p<0.0001, WT versus μMT. C) Individual data points (mice) are shown superimposed upon the mean±SEM of 5 mice. p<0.01, N=5. D) p<0.01, MT+WT BD$_L$ versus μMT+Tnfsf18$^{-/-}$ BD$_L$; *p<0.001, MT versus μMT+WT BD$_L$; ****p<0.0001, WT versus μMT. Statistical significance was determined using the unpaired t-test.

$BD_L$ regulatory function is GITRL-dependent—In our previous studies using total splenic B cells, we found that their regulatory activity was GITRL-dependent[3]. Consistent with this finding, we found that Tnfs18 (GITRL) message was upregulated 2.5 fold (p=0.001) in $BD_L$ in the RNA-seq analysis. When we examined the cell surface expression of GITRL, we found that all splenic B cell subsets expressed low levels of GITRL (FIG. 5A). As with the RNA-seq analysis, $BD_L$ expressed significantly higher levels of GITRL than FO B cells (FIG. 5A). Reconstitution of MT mice with $BD_L$, but not FO B cells, resulted in a significant increase in Treg numbers (FIG. 5B). Antibody blocking of GITRL on $BD_L$ prior to transfer completely abrogated their ability to promote Treg expansion, while it had no effect on FO B cells (FIG. 5B). These findings were confirmed using Tnfsf18$^{-/-}$ mice, which had a significant reduction in the absolute number of Treg (FIG. 5C). In addition, Tnfsf18$^{-/-}$ $BD_L$ upon adoptive transfer into μMT mice were unable to induce Treg proliferation, as compared to WT $BD_L$ (FIG. 5D). These data indicate that GITRL is the primary mechanism by which $BD_L$ promote Treg proliferation.

Figure 6A:
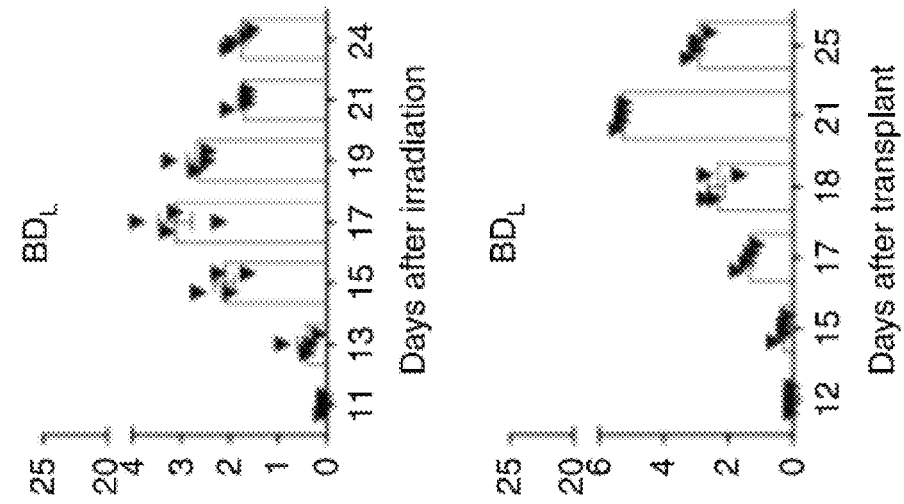
FIGS. 6A-6D show BD$_L$ are mature and emerge from the T2 stage. A) C57BL/6J mice were sublethally irradiated (500 rad) and the emergence of T2, FO and BD$_L$ was tracked in the spleen on the days indicated by flow cytometry and the absolute number of cells was calculated. B) C57BL/6J mice were lethally irradiated (950 rads) and transplanted with syngeneic BM and the emergence of T2, FO and BD$_L$ was tracked in the spleen on the days indicated by flow cytometry and the absolute number of cells was calculated. A,B) Individual data points (mice) are shown superimposed upon the mean±SEM. C,D) C57BL/6J CD45.1 mice were sublethally irradiated (500 rad) and 15 days later T2 cells were FACS purified, labeled with CFSE and 1.25×10$^6$ cells/recipient were adoptively transferred to C57BL/6J CD45.2 mice and 24 and 48 hr later the percentage (C) and absolute number (D) of T2, FO and BD$_L$ was determined in the spleen by flow cytometry. T2, FO and BD$_L$ B cell subsets were gated as for FIG. 2A,B. C) Data shown are one representative experiment of three. D) Individual data points (mice) are shown superimposed upon the mean±SEM from one representative experiment of three. Statistical significance was determined using the unpaired t-test.
Figure 6B:
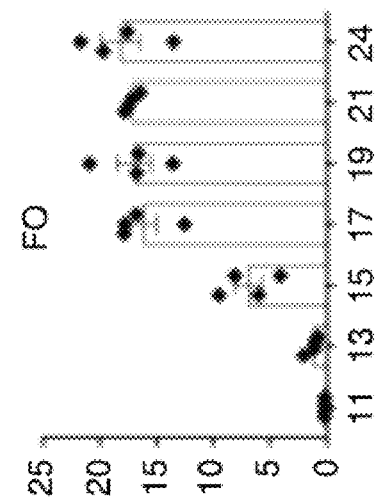
Figure 6C:
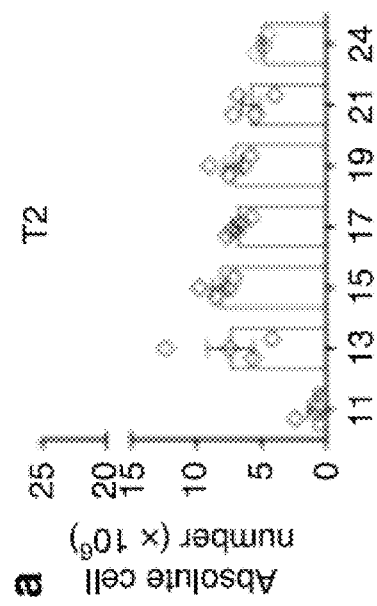
Figure 6D:
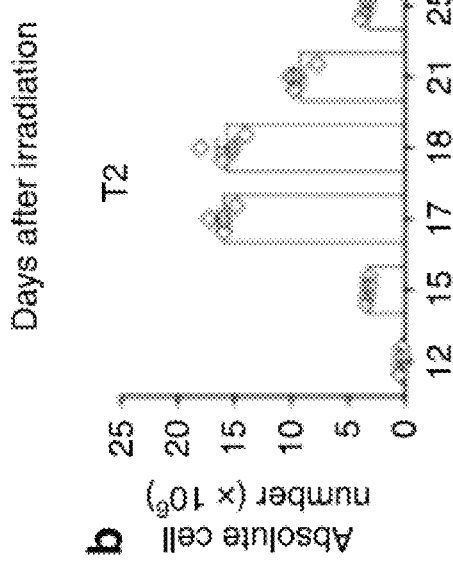
Figures 6A, 6B, 6C, 6D:
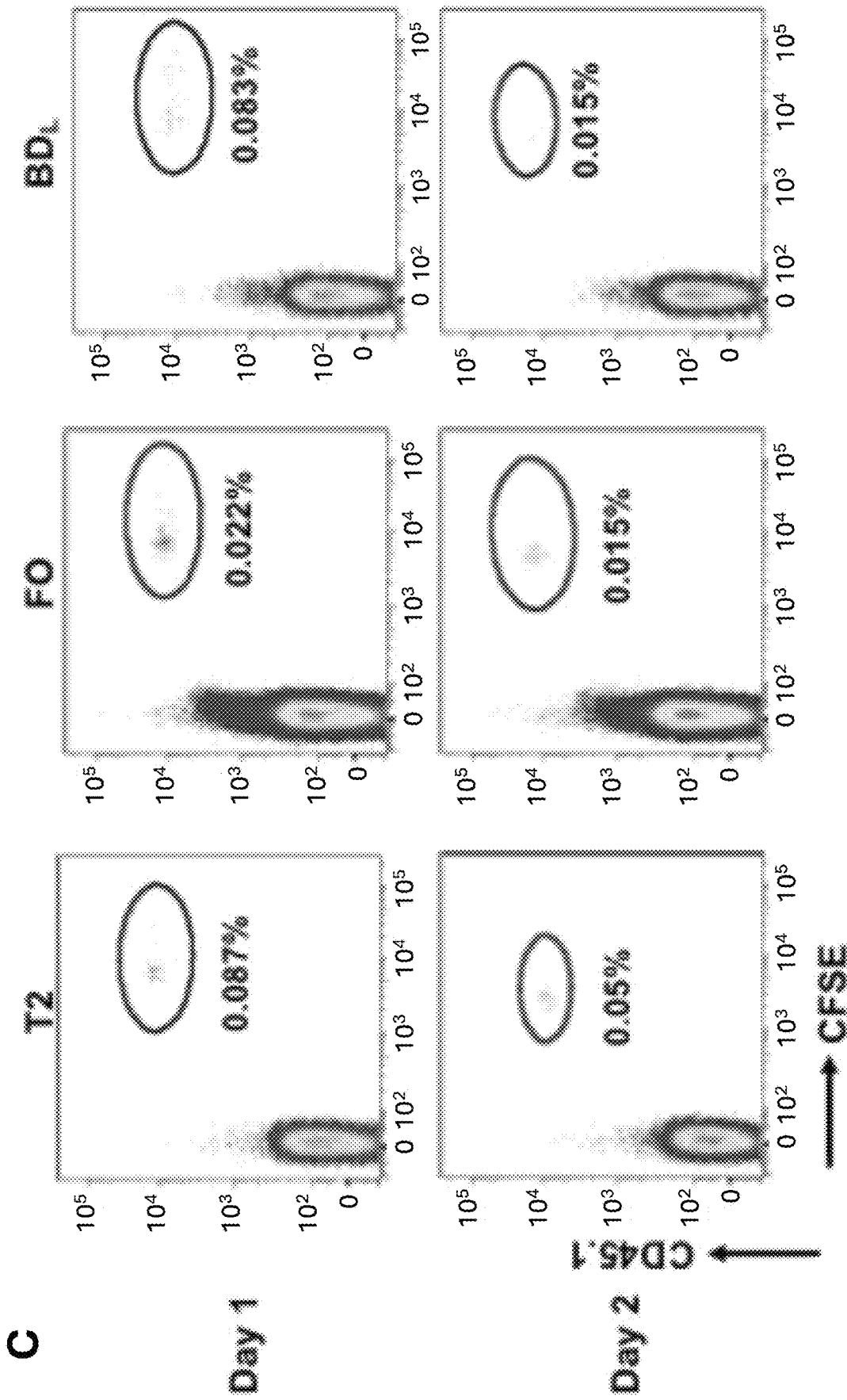
Figures 6A, 6B, 6C, 6D:
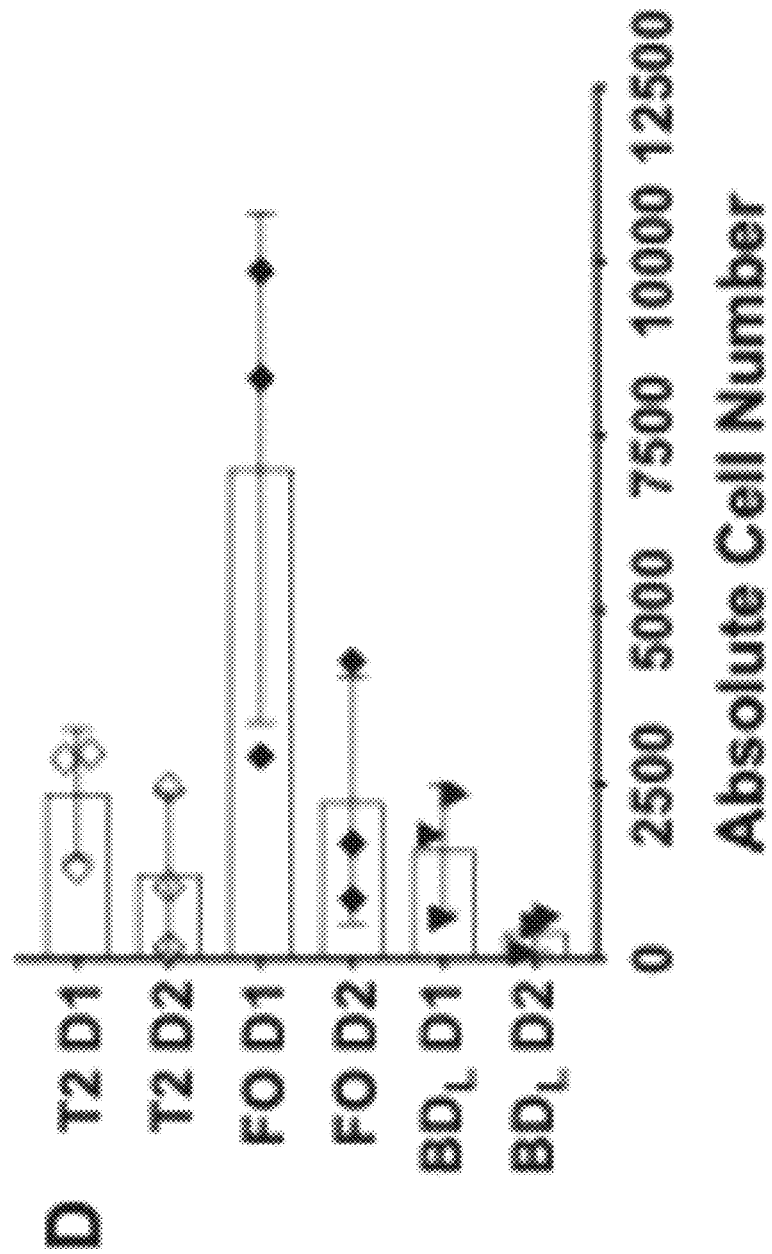

The $BD_L$ subset develops in parallel with FO B cells in the spleen—We next determined whether $BD_L$ develop independently from FO B cells. This was accomplished by determining the timing of $BD_L$ emergence as compared to FO B cells following sublethal irradiation[18]. As shown in FIG. 6A, B cells in the T2 stage peaked on day 13 post-irradiation. The finding that FO B cells peaked later on day 17 is indicates that they developed from the T2 stage (FIG. 6A)[17]. The kinetics of $BD_L$ emergence and peaking was identical to FO B cells indicating that they develop independently and not directly along the FO pathway (FIG. 6A). These results were confirmed using a BM transplantation approach (FIG. 6B)[20,21]. In a third confirmatory approach, we adoptively transferred FACS purified CD45.1$^+$ T2 B cells into CD45.2$^+$ WT mice and determined their maturation into $BD_L$ and FO B cells[18]. One and two days after transfer T2 cells were detectable in the spleen and they had matured into both $BD_L$ and FO subsets at a similar level (FIG. 6C). The absolute cell number of T2, FO and $BD_L$ recovered are shown in FIG. 6Dm which is consistent with published studies[18].

Figures 7A, 7B, 7C, 7D:
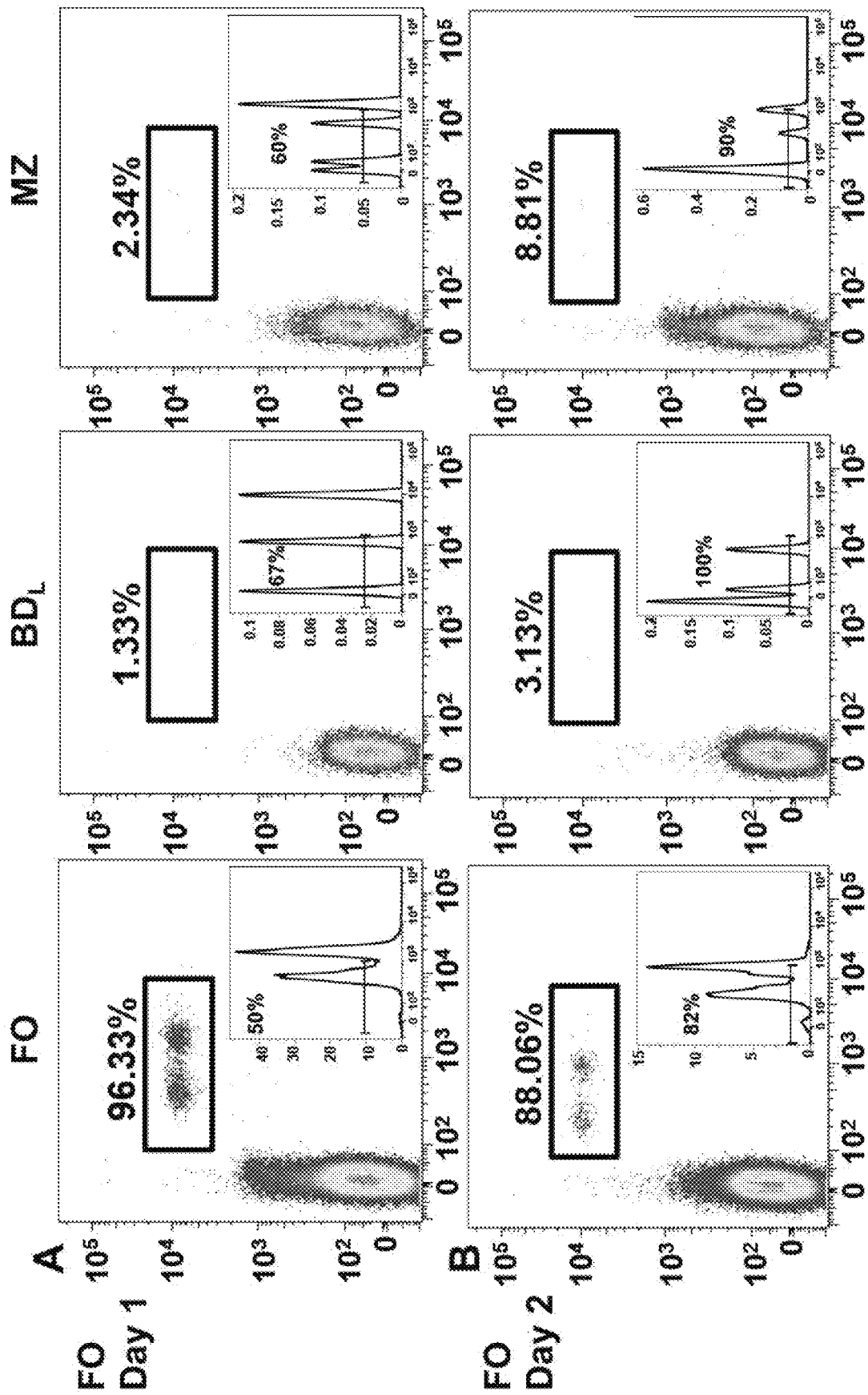
FIGS. 7A-7D show that following adoptive transfer a subset of BD$_L$ are stable phenotypically. C57BL/6 CD45.1 FO (A,B) or BD$_L$ (C,E) were FACS purified, CFSE labeled and adoptively transferred (1.5×10$^6$) into C57BL/6J CD45.2 mice that were sublethally irradiated (500 rad) 11 days prior. On days 1 and 2 the presence of FO, BD$_L$ and MZ B cells was assessed in the spleen. The transferred cells were gated as CD45.1$^+$ and the percentage of each B cell subset within the gate is provided and shown as dot plots with CFSE. The inset is a histogram of the CFSE data with the percentage of cells having undergone proliferation indicated. Data shown are one representative experiment of four.

$BD_L$ are a stable mature B cell subset We next examined the stability of $BD_L$ upon adoptive transfer by repeating the sublethal irradiation experiment (FIG. 6A) and on day 11 just prior to the emergence of $BD_L$ and FO B cells, FACS purified CD45.1 $BD_L$ or CD45.1 FO B cells were adoptively transferred into CD45.2 recipient mice. This timepoint was chosen because the splenic microenvironment would support B cell development. The transferred B cells were identified as CD45.1$^+$ and CFSE was used to determine whether the cells had proliferated. FO B cells upon transfer were stable with 96% of the cells the retaining their phenotype one day later (FIG. 7A) and 88% on day 2 (FIG. 7B). The increase in MZ B cells on day 2 was likely due to shedding of CD23 and not differentiation of FO B cells into the MZ lineage (FIG. 7A,B)[22]. Even though in the steady state only ~5% of FO B cells undergo cell proliferation (FIG. 4F) ~50% of FO B cells underwent proliferation after transfer on day 1 (FIG. 7A, inset), which increased to ~82% on day 2 (FIG. 7B, inset). The induction of FO B cell proliferation was likely due to the lymphopenic environment[23]. When $BD_L$ were adoptively transferred on day 1 ~97% of the cells had undergone proliferation (FIG. 7C, inset) and 86% of the cells exhibited a FO phenotype (FIG. 7C). On day 2, as with the FO B cell subset, the decrease in the number of FO B cells was offset by an increase in MZ B cells (FIG. 7D). Interestingly, the percentage of $BD_L$ remained stable at 12% from day one (FIG. 7C) to day two (FIG. 7D).

Figures 8A, 8B, 8C:
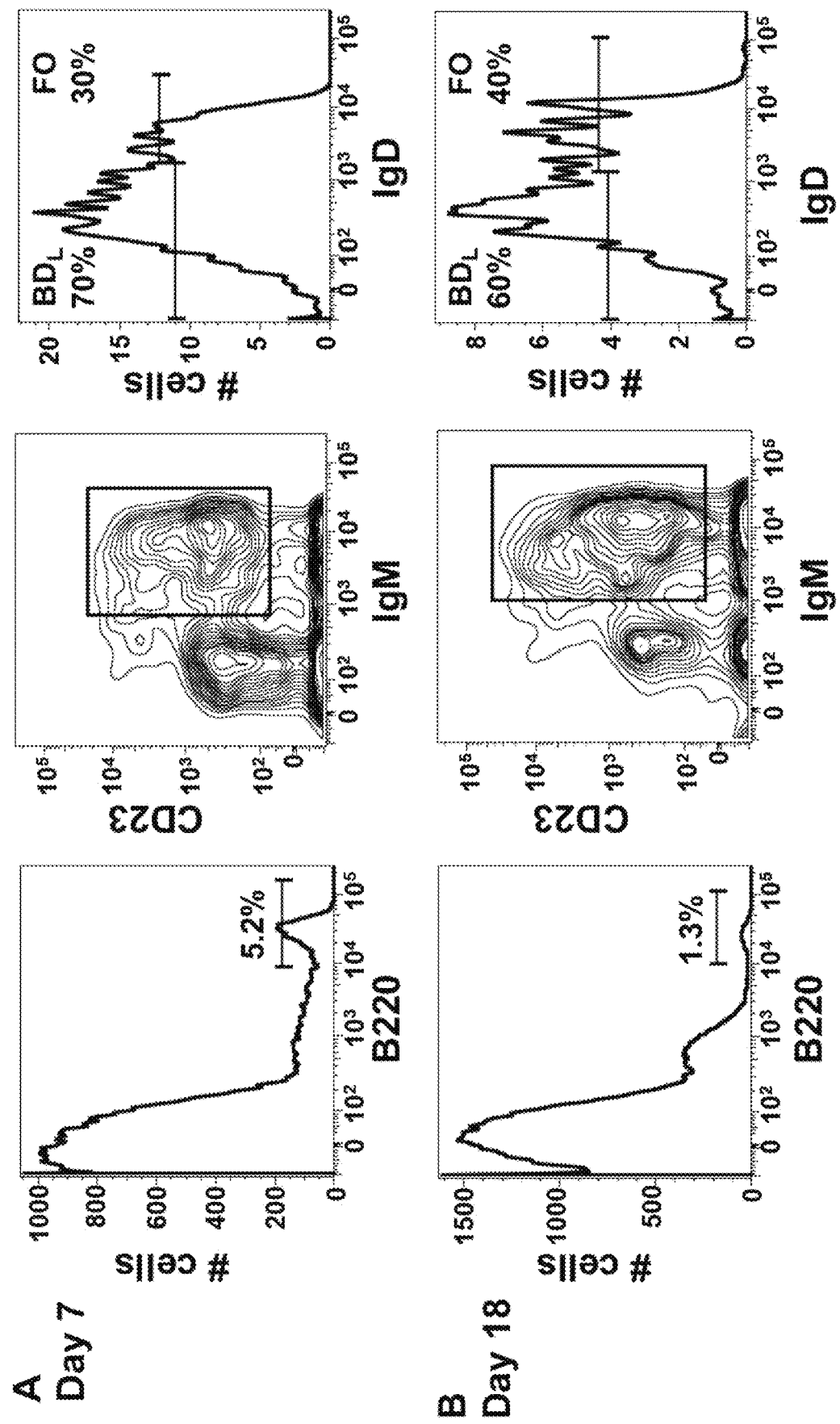
FIGS. 8A-8C show that following adoptive transfer and EAE induction BD$_L$ are stable up to 30 days. BD$_L$ adoptive transfer and EAE was performed as for FIG. 3C and the data are from the same mice used for FIG. 3D,E. On days 7 (A), 18 (B) and 30 (C) of EAE, B220$^+$ lymphocytes were gated for IgM$^+$ CD23$^+$ and analyzed for IgD expression by flow cytometry. The percentage of BD$_L$ and FO B cells is provided. Data shown is one representative mouse of two.

To determine whether the $BD_L$ phenotype is stable long-term, we tracked their presence in EAE following adoptive transfer. On EAE day seven, ~five % of spleenocytes were B220 (FIG. 8A). We then gated on IgM$^+$ CD23$^+$ cells to exclude CD4$^+$ B220 T cells, isotype class switched B cells and plasmablast/plasma cells and found that ~70% of the cells retained the $BD_L$ IgD$^{low/-}$ phenotype (FIG. 8A). Similar results were obtained at the peak of disease on day 18 (FIG. 8B). On day 30, $BD_L$ were still present (FIG. 8C), which is consistent with Treg levels that were statistically higher in the mice that had received $BD_L$, as compared to μMT mice (FIG. 3D). These cumulative data indicate that the IgD$^{low/-}$ $BD_L$ phenotype is stable upon adoptive transfer.

Figures 9A, 9B, 9C, 9D, 9E, 9F:
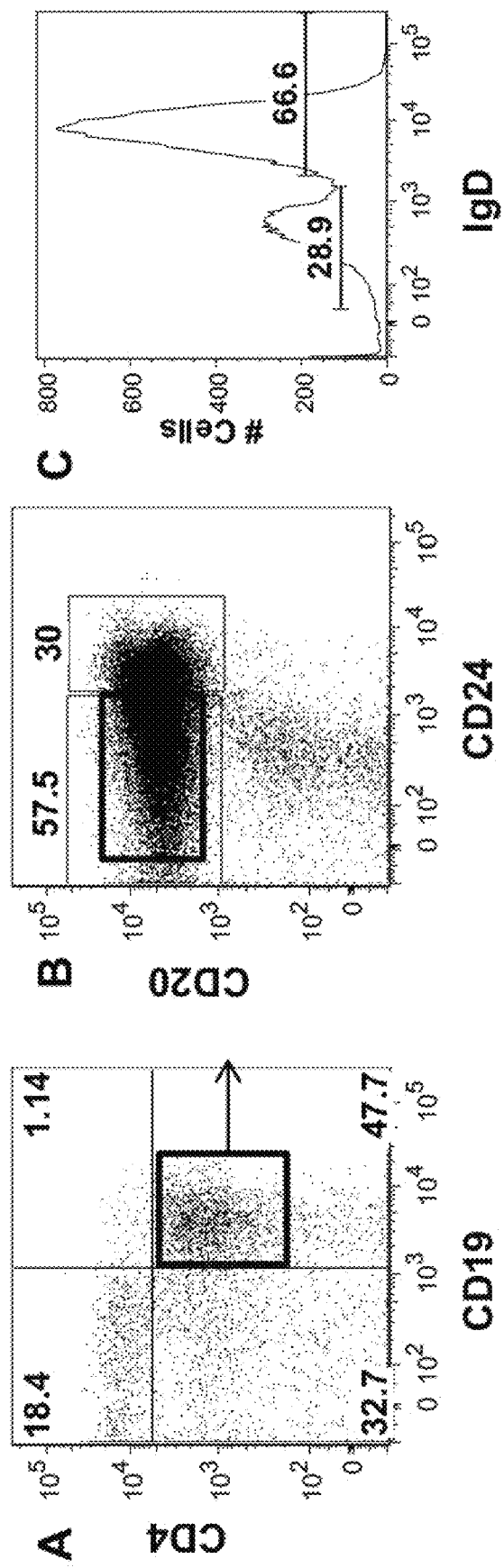
FIGS. 9A-9F show Human IgD$^{low/-}$ B cells induce the proliferation of human Treg in vitro. Human splenic B cells (CD19$^+$) (A) and IgD$^{low/-}$ (CD19$^+$ CD20$^+$ CD24$^-$ IgD$^{low/-}$) B cells (A-C) and Treg (CD4$^+$ CD25$^{hi}$) were FACS purified and the Treg were labeled with CFSE. D) Treg (0.5×10$^5$) were cultured alone or with splenic B cells (1×10$^5$) in the presence of anti-CD3 (2 mg/ml) and irradiated APC (CD4$^-$ CD8$^-$ CD19$^-$) for 96 hr. Each symbol represents a single human sample. **p<0.01, no B cells versus IgD$^{low/-}$. E) Representative flow cytometry histograms with gating of proliferating cells is shown from one experiment of four from D. F) Human peripheral blood B cells (CD19$^+$), IgD$^{hi}$ (CD19$^+$ CD20$^+$ CD24-IgD$^{hi}$) B cells, IgD$^{low}$ (CD19$^+$ CD20$^+$ CD24$^-$ IgD$^{low/-}$) B cells and Treg (CD4$^+$ CD25$^{hi}$) were FACS purified. CFSE labeled Treg (0.5×10$^5$) were cultured alone or with 1×10$^5$ total B cells, IgD$^{hi}$ or IgD$^{low/-}$ in the presence of anti-CD3 (10 mg/ml) and anti-CD28 (10 mg/ml). After culture, the cells were stained with CD4 and the percentage of proliferating Treg cells was determined by flow cytometry. Data shown are one representative experiment of two. Statistical significance was determined using the unpaired t-test.
Figures 17A, 17B:
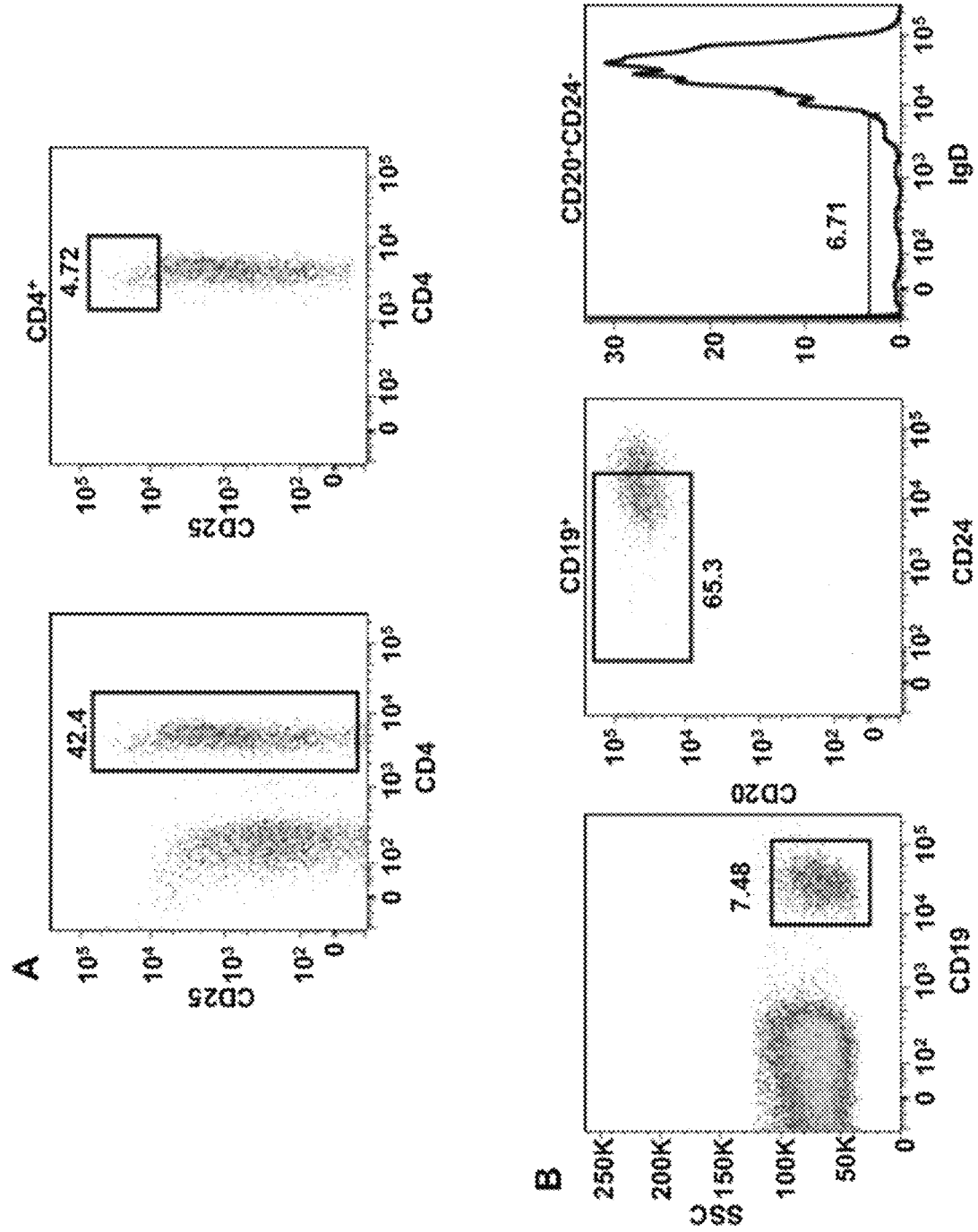
FIGS. 17A-17B show Representative gating strategy for human Treg and $IgD^{low/-}$ and $IgD^{hi}$ B cells. A) Single cell suspensions from human spleen were stained for CD4 and CD25. $CD4^+$ T cells were gated for $CD25^{hi}$ Treg. This gating strategy is for FIG. 9D,F. B) Human peripheral blood was stained for CD19, CD20, CD24 and IgD. CD19+ B cells were analyzed for expression of CD20 and CD24. CD20+ CD24- mature B cells were analyzed for expression of IgD. The percentage of cells in the indicated gates is provided.
Figures 18A, 18B:
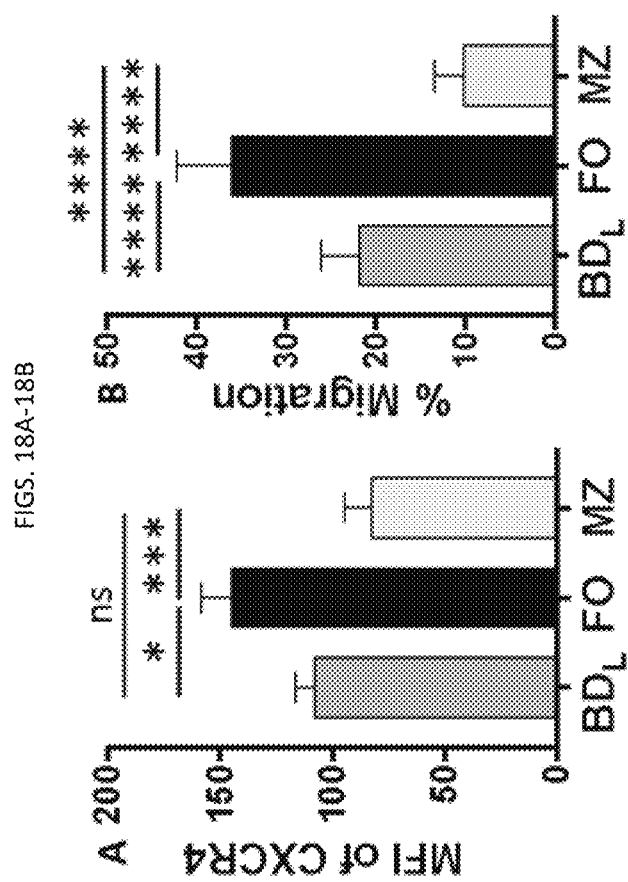
FIGS. 18A-18B show $BD_L$ have reduced CXCR4 expression and migration toward CXCL12 as compared to FO B cells. A) $BD_L$, FO and MZ B cell expression of CXCR4 was determined by flow cytometry. N=5. B) FACS purified splenic $BD_L$, FO and MZ B cells were placed in the upper chamber of a 5 mm transwell and allowed to migrate toward medium plus cXCL12 (500 ng/ml) for 3 h. Migrated cells were collected from the lower chamber and the percent migrated cells was determined by flow cytometry. N=9. *p<0.05; *p<0.01; **p<0.0001.
Figure 19:
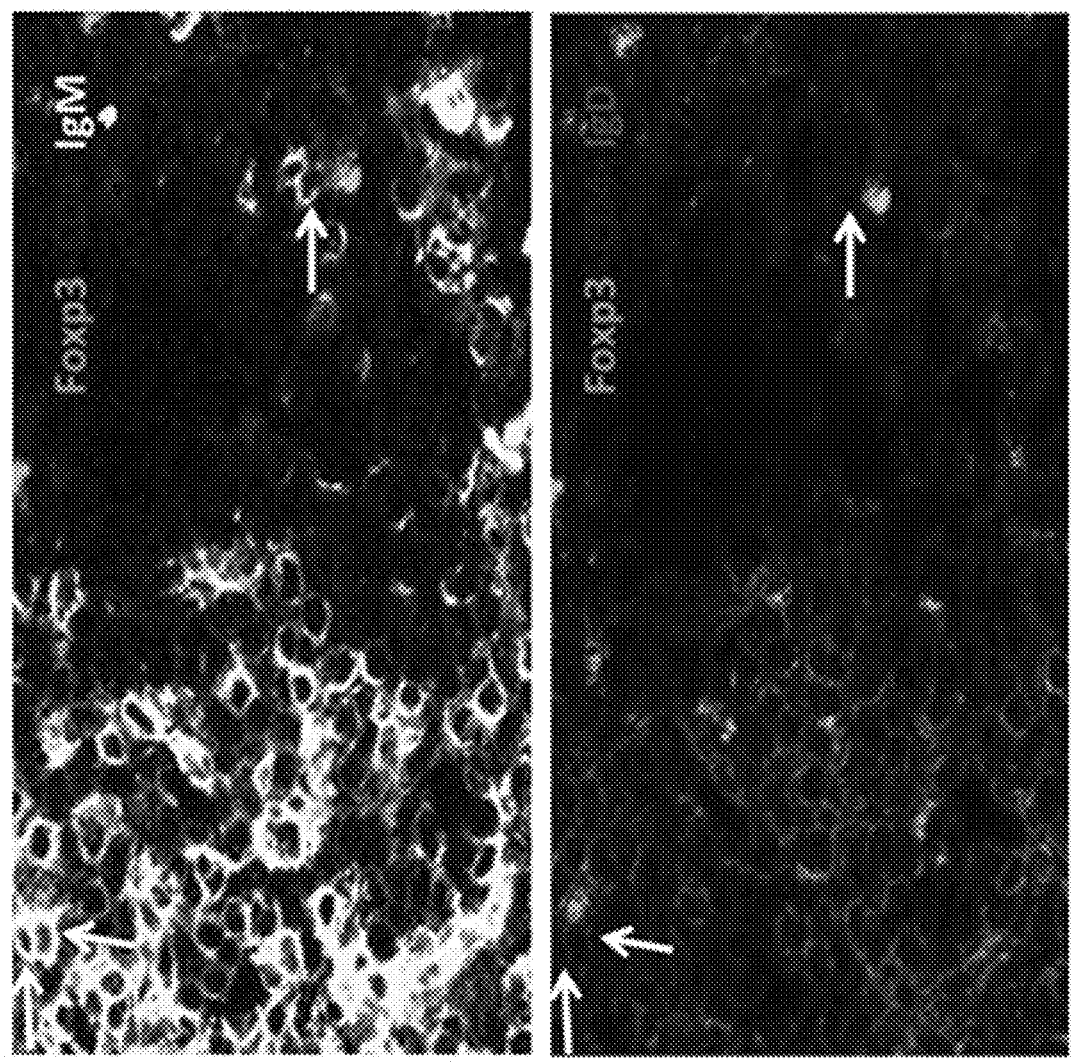
FIG. 19 shows $BD_L$ co-localized with Treg at the border of the T and B cell zones in the spleen. Splenic frozen sections from C57BL/6 mice were stained with the antibodies Foxp3 AF4888 (green), CD4 BV421 (blue), IgM AF647 (yellow) and IgD AF594 (red) and imaged for 4-color immunofluorescence. The top and bottom panels are the same image with both showing Foxp3 and CD4 staining and the top panel IgM and the bottom panel IgD. The arrows indicate $BD_L$:Treg interactions. The image is 60×.
Figures 20A, 20B, 20C, 20D, 20E:
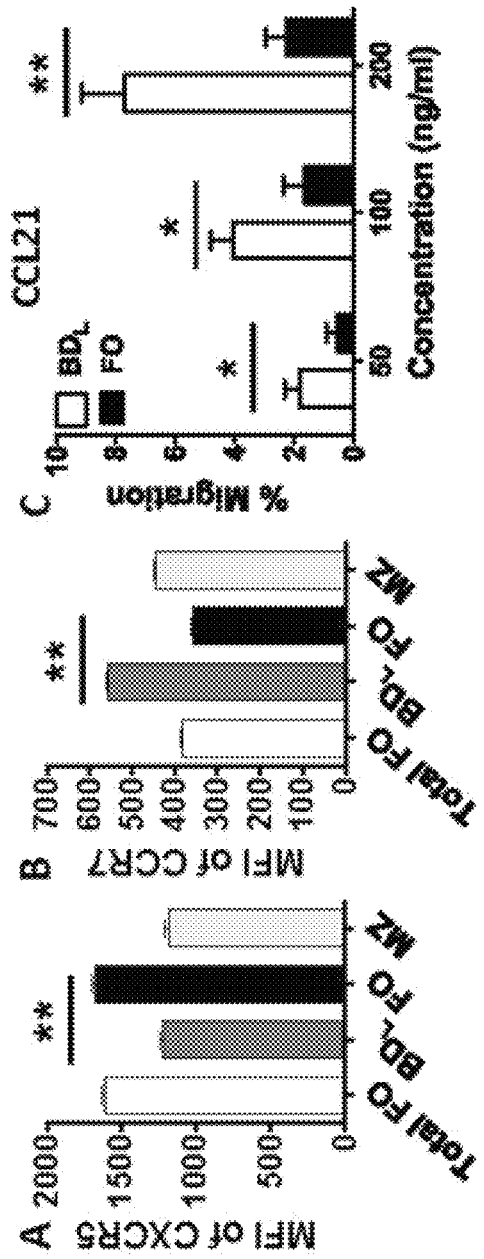
FIGS. 20A-20E show $BD_L$ exhibit a distinct chemokine receptor expression and migration pattern from FO B cells and require CCR7 expression for Breg activity. A,B) Splenic Total FO, $BD_L$, FO ($IgD^{hi}$) and MZB cells were phenotyped for expression of CXCR5 (A) and CCR7 (B) by flow cytometry. Data shown are the mean MFI±SE of 5 mice from 2 experiments. C,D) FACS purified splenic $BD_L$ and FO cells were placed in the upper chamber of a 5 mm Transwell and allowed to migrate toward medium plus CCL21 (C) or CXCL13 (D) at the indicated concentrations for 3 h. Migrated cells were collected from the lower chamber and the percent migrated cells was determined by flow cytometry. Data shown are mean±SE of 6 mice from 2 experiments. E) $BD_L$ or $BD_L$ $CCR7^{-/-}$ B cells (5×10$^6$) were adoptively transferred into µMT mice and the absolute number of Treg was determined 10 days later. *p<0.05; p<0.01; *p<0.001.
Figures 21A, 21B, 21C, 21D:
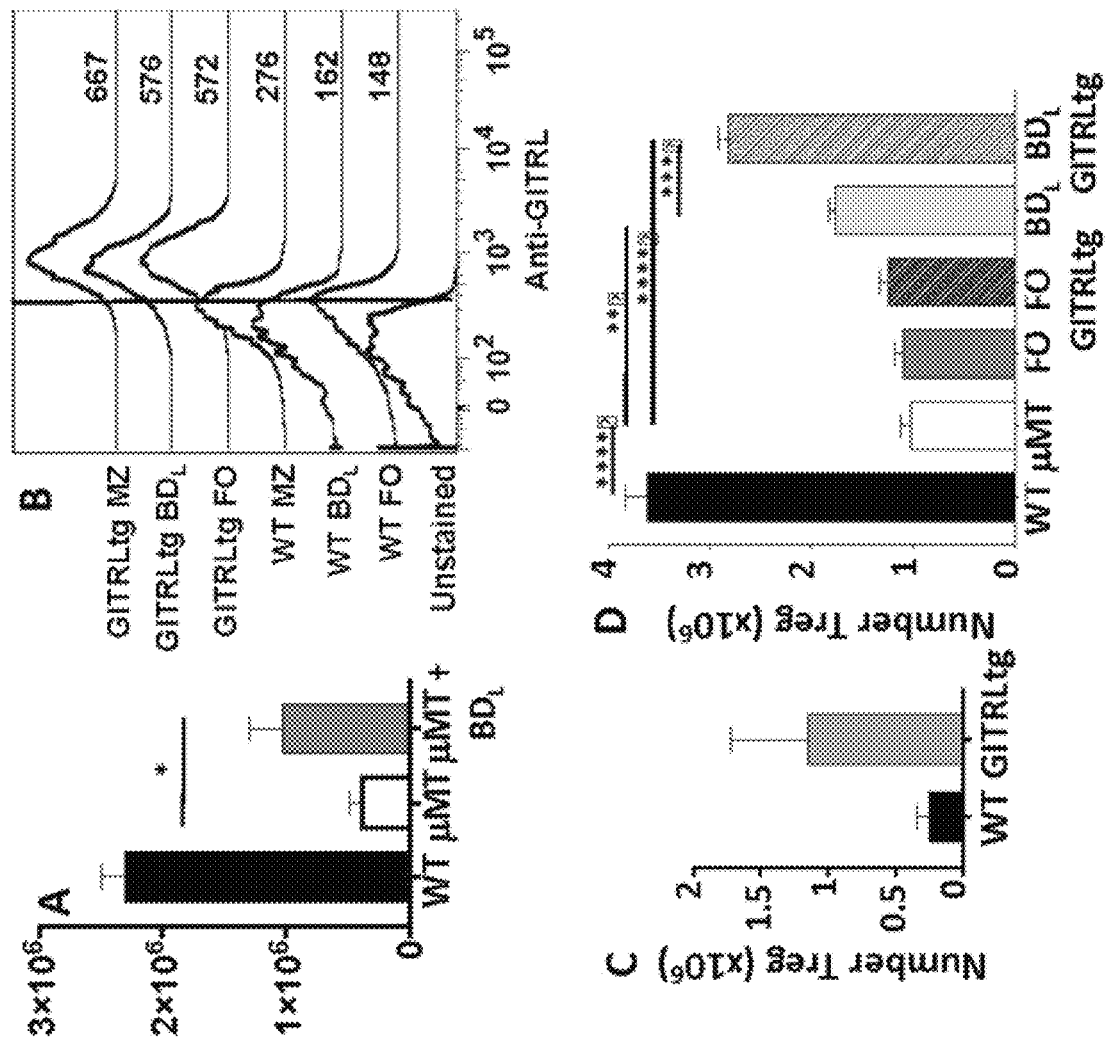
FIGS. 21A-21D show only $BD_L$ induced Treg expansion in a GITRL-dependent manner. $BD_L$ (A,D) or FO (D) B cells from WT (A,D) or GITRLtg mice (D) (5×10$^6$) were adoptively transferred into µMT mice and EAE was induced as for Fig. E. The absolute number of Treg was determined on day 30 (A) or 10 (D). GITRL expression (B) and Treg numbers (C) were determined by flow cytometry in WT and GITRLtg mice by flow cytometry. The MFI is given and the vertical line indicates negative control staining (B). *p<0.05; p<0.01, *p<0.001, ****p<0.001.
Figure 22:
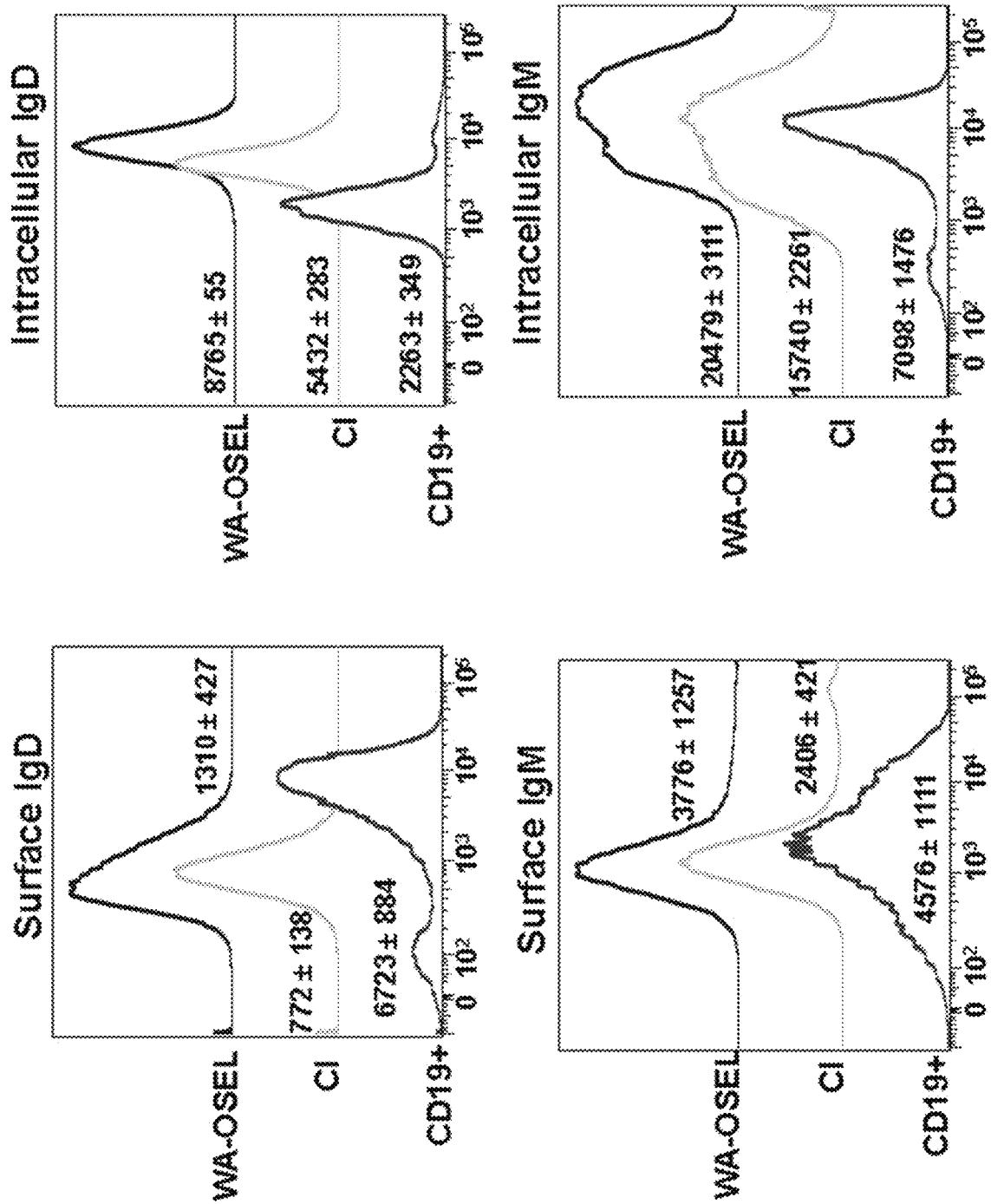
FIG. 22 shows surface and intracellular IgM and IgD expression in control $CD19^+$ B cells isolated from the human peripheral blood and two human CLL cell lines CI and WA-OSEL determined by flow cytometry analysis.
Figure 23:
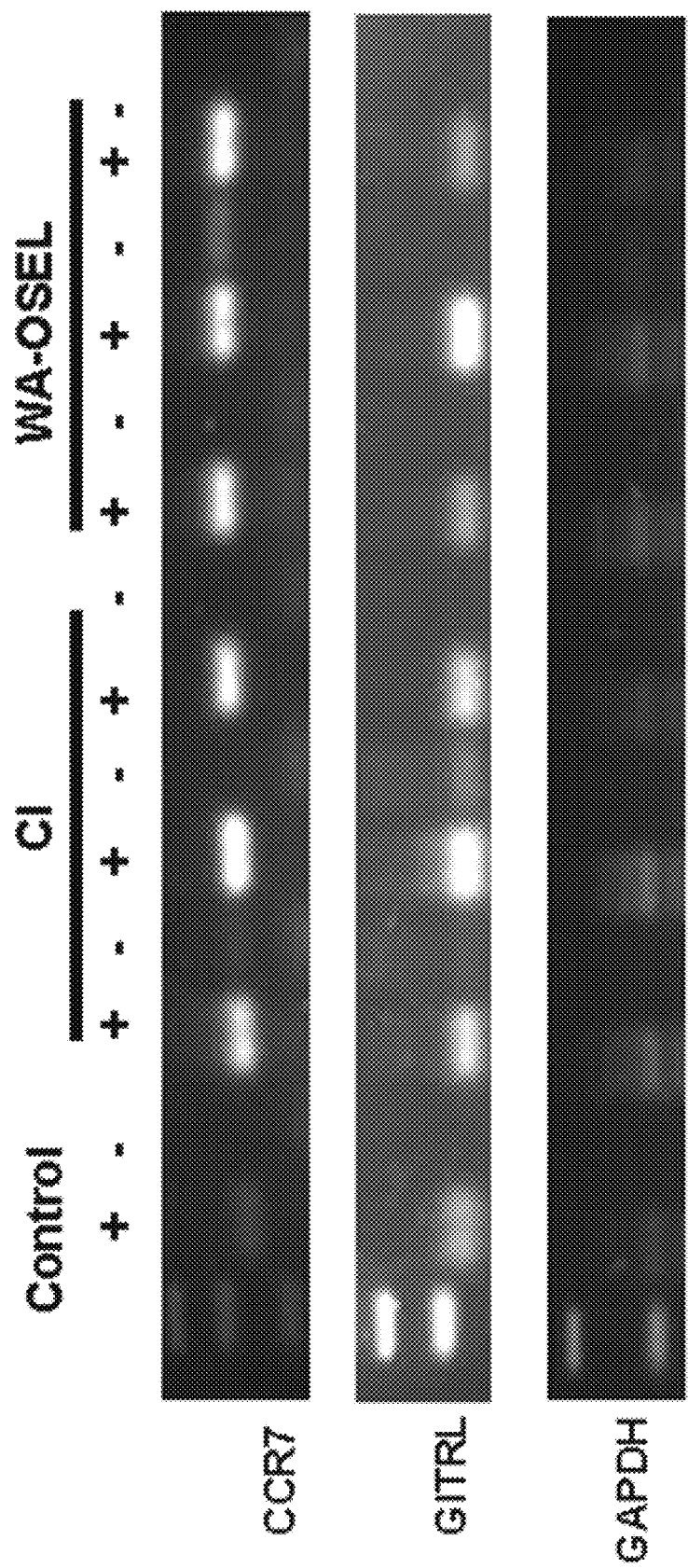
FIG. 23 shows human CLL lines express CCR7 and GITRL. Reverse transcription PCT (RT-PCR) analysis of the CCR7 and GITRL transcript level in the control $CD19^+$ cells isolated from the human peripheral blood and two human CLL cell lines CI and WA-OSEL. The RT-PCR indicated that CCR7 and GITRL were expressed in the two human CLL cell lines. Control RT-PCR for GAPDH transcript indicated equivalent loading in each lane.

Human $BD_L$ cells are present in spleen and peripheral blood—We next determined whether a similar population of $BD_L$ human B cells exist that also promote Treg proliferation. To accomplish this splenic human B cells were FACS purified by gating on total B cells (CD4$^-$CD19$^+$) (FIG. 9A) and then subsequently on CD20$^+$ CD24$^-$ mature B cells (FIG. 9B), from which IgD$^{low/-}$ B cells were obtained (FIG. 9C). We included CD20 in the gating strategy to remove plasma cells. Total B cells and IgD$^{low/-}$ B cells were co-cultured with FACS purified Treg (CD4$^+$ CD25$^{hi}$) from the same donor in the presence of anti-CD3 and irradiated antigen presenting cells (APC). We found that Treg proliferation was similar in the presence or absence of total B cells (FIG. 9D). In contrast, in the presence of IgD$^{low/-}$ B cells Treg proliferation was significantly increased by 50% as compared to Treg alone (FIG. 9D). FIG. 9E shows representative CSFE flow cytometry data. We next determined whether we could identify $BD_L$ in the peripheral blood using a modified strategy. By substituting anti-CD28 for the APC, we largely eliminated Treg background proliferation in the absence of B cells (FIG. 9F). As with the spleen, inclusion of total B cells slightly increased Treg proliferation and as observed in the mouse, IgD$^{low/-}$ B cells, but not IgD$^{hi}$ B cells supported Treg proliferation (FIG. 9F). Representative gating for Treg and peripheral blood B cells is shown in FIG. 17. These data demonstrate that human $BD_L$ cells are present in both spleen and peripheral blood that importantly can be identified by an $IgD^{low/-}$ phenotype and induce Treg proliferation.

Discussion In this study, we sought to identify a definitive cell surface phenotype that could be used to identify B cells with the capacity to promote Treg proliferation that we have named $BD_L$. Extensive cell surface phenotyping and functional assays revealed that $BD_L$ are $IgD^{low/-}$. These cumulative data led to the conclusion that $BD_L$ are a B cell subset that plays an essential role in immune tolerance by regulating the homeostatic expansion of Treg.

The ability of B cells to regulate inflammation was indicated as early as 1974 in models of delayed-type hypersensitivity, sarcoma and autoimmunity[24-26]. These studies fell short of definitively demonstrating a regulatory role for B cells. When µMT mice became available, we demonstrated that B cells were required for EAE recovery[1]. Subsequently, a regulatory role for B cells in a model of inflammatory bowel disease was demonstrated[27], which were shown to regulate via IL-10[28]. B cells were also shown to regulate EAE severity via IL-10[4]. These studies were impactful on the field and led to a plethora of papers demonstrating B cell regulation via IL-10 in a variety of disease models and in humans[29,30]. Given the capacity for all B cell subsets to produce IL-10, in retrospect, it is not surprising that a number of B cell phenotypes were described that regulate via IL-10 production[29-32]. Recently, the phenotype of B cells that regulate via IL-10 was identified as a population of LAG-3+ regulatory plasma cells that develop from numerous B cell subsets in a BCR-dependent manner[33]. In humans, the most definitive IL-10 producing B cell phenotype was reported as $CD19^+$ $CD24^{hi}CD38^{hi}$, which includes both immature and $CD5\pm CD1d^{hi}$ B cells[34]. Thus B cells that regulate via IL-10 are not a unique B cell subset.

To define IL-10-independent B regulatory mechanisms, we utilized an adoptive transfer model of EAE that is does not require B cell effector functions[2,3,35]. This approach allowed us to discover that B cells induce the proliferation of Treg in a GITRL-dependent manner[3]. Our development of in vivo B cell regulatory assays allowed us to track the ability of purified B cell subsets to induce Treg proliferation[3]. This afforded us the opportunity to identify a definitive B cell regulatory phenotype. It is well known that the various IgG isotypes exhibit differential cell depletion. The effector function of the IgG subclass is determined by the Fc domain. The primary difference between the mouse $IgG_1$ and $IgG_{2a}$ subclasses is that the later binds with high affinity to both FcγRI and FcγRIV, which are activating receptors that facilitate antibody-dependent cell clearance[36-39]. In mice, anti-CD20 $IgG_{2a}$ efficiently depletes all B cells in the spleen, while the $IgG_1$ depletes the majority of FO B cells, but not the MZ subset (FIG. 1A)[12]. Using the partial depleting strategy, we determined that $BD_L$ activity resided within the undepleted FO subset (FIG. 1G). This result surprised us because at the time B cell regulatory activity had not been described for the FO subset. By performing extensive B cell phenotyping on the non-depleted FO B cells, we found that they were enriched for cells expressing $IgD^{low/-}$ (FIG. 2B). Retained IgM expression (FIG. 2A,D) indicated that they had not undergone isotype class switching leading to loss of $IgD^{40}$.

Figures 3A, 3B, 3C, 3D, 3E, 3F, 3G:
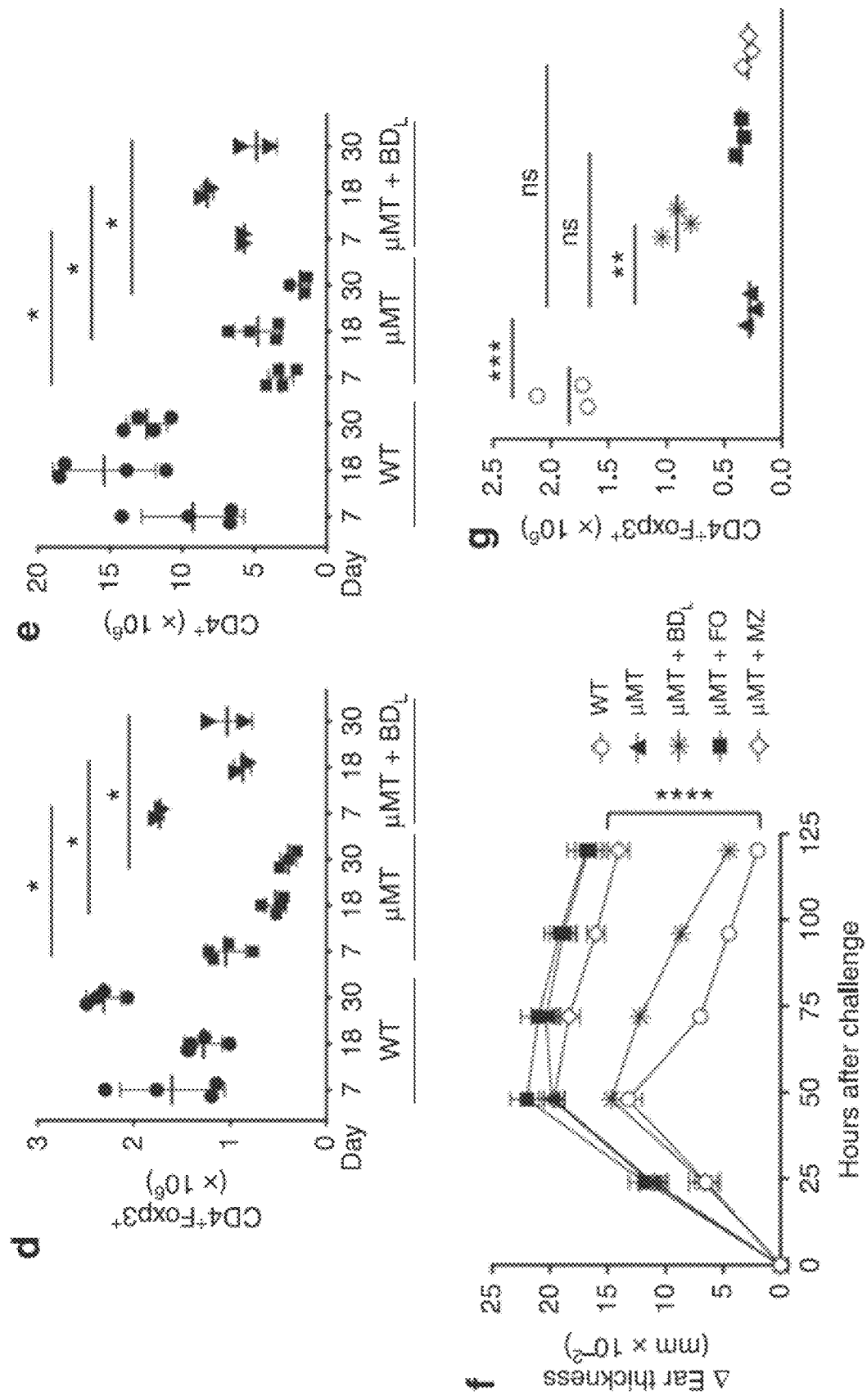

To the best of our knowledge, a subset of FO B cells expressing $IgD^{low/-}$ has not been previously described. Using functional assays, EAE and CHS disease models (FIG. 3), we concluded that $BD_L$ are unique in their ability to induce Treg expansion. As for total B cells[3], $BD_L$ also require GITRL expression to induce Treg expansion (FIG. 5B-D). While GITRL expression is low on all B cell subsets, $BD_L$ expressed significantly higher levels as compared to FO B cells (FIG. 5A). We found that upon adoptive transfer of $BD_L$ ~13-20% of the Treg population underwent cell proliferation. Although Treg numbers increased 2-3 fold (FIG. 3A,5B), we do not know whether the increase is due to a high proliferation of a small subpopulation of Treg or induction of Treg proliferation on larger scale. However, because the majority of the Treg underwent 1-2 cell divisions (FIG. 3B,4B), we favor the later explanation. We tracked the fate of CD4 T cells during EAE and found both Treg and CD4 T cells were increased in MT mice that received $BD_L$ (FIG. 3D, E). These data are consistent with a report demonstrating that chronic B cell depletion during acute viral infection in mice disrupted the homeostasis of both Treg and conventional CD4 T cells[41].

Figures 8A, 8B, 8C:
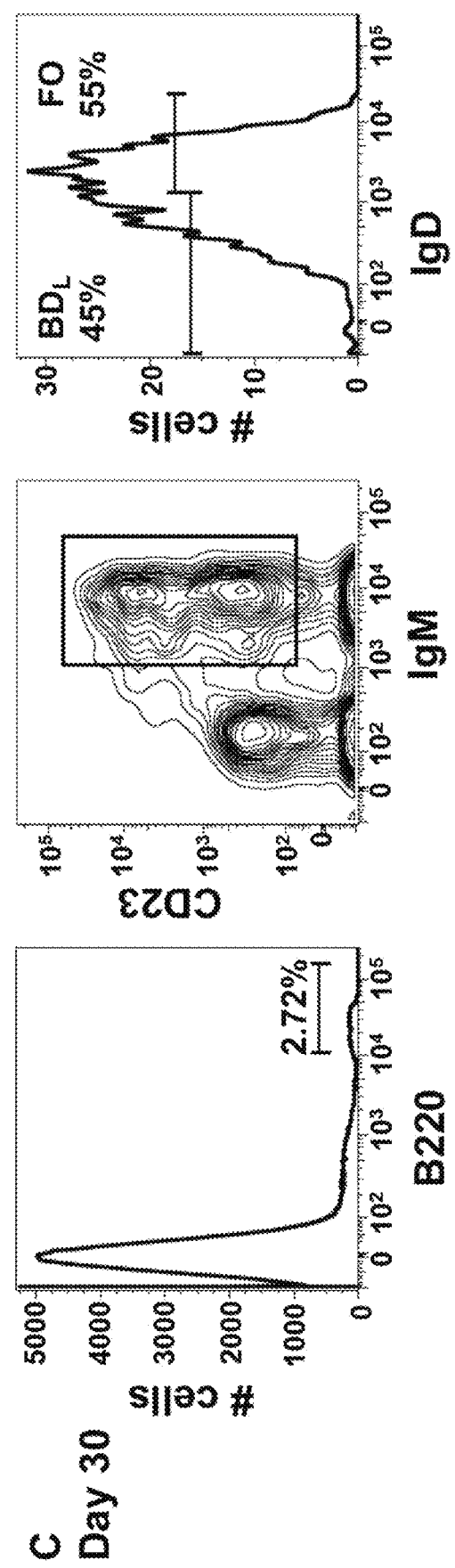

Currently, there are four major populations of mature B cells including B1a that arise from the fetal liver and BM-derived Bib, MZ and FO subsets[42,43]. $CD5^+$ B1a cells are the major producers of natural IgM and IgG3, aid in the control of infections, play a prominent role in autoimmunity and produce high levels of $IL-10^{44,45}$. $CD5^-CD11b^+$ B1b have the natural tendency to recognize protective antigens in bacteria[46]. MZ B cells are the first line of defense against blood-borne pathogens particularly those with repeating polysaccharides[47]. FO B cells produce the majority of high affinity isotype class switched antibodies in a T cell-dependent manner[48]. Here, we now provide evidence for the existence of $BD_L$ as a fifth mature B2 cell population that develops in the spleen from the T2 stage (FIG. 6). When $BD_L$ were adoptively transferred into an environment that would support their short-term survival and expansion, we found that 12% of the transferred cells remained stable for two days (FIG. 7C,D). The remaining cells upregulated IgD and thus fell into the FO phenotyping gate. When we tracked $BD_L$ following adoptive transfer in EAE just prior to EAE onset, 70% of B cells were $BD_L$ (FIG. 8A). At the peak of disease this level remained high at 60% (FIG. 8B). As EAE progressed the separation between the $IgD^{low/-}$ and $IgD^{hi}$ B cells became more evident and resembled what was observed in human spleen (FIG. 8). On day 30 the separation between $IgD^{low/-}$ and $IgD^{hi}$ B cells became less demarcated more closely resembling naïve mice (FIG. 8C). These data suggest that immune responses induce $BD_L$ expansion in parallel with the need for Treg to dampen inflammation.

Figures 7A, 7B, 7C, 7D:
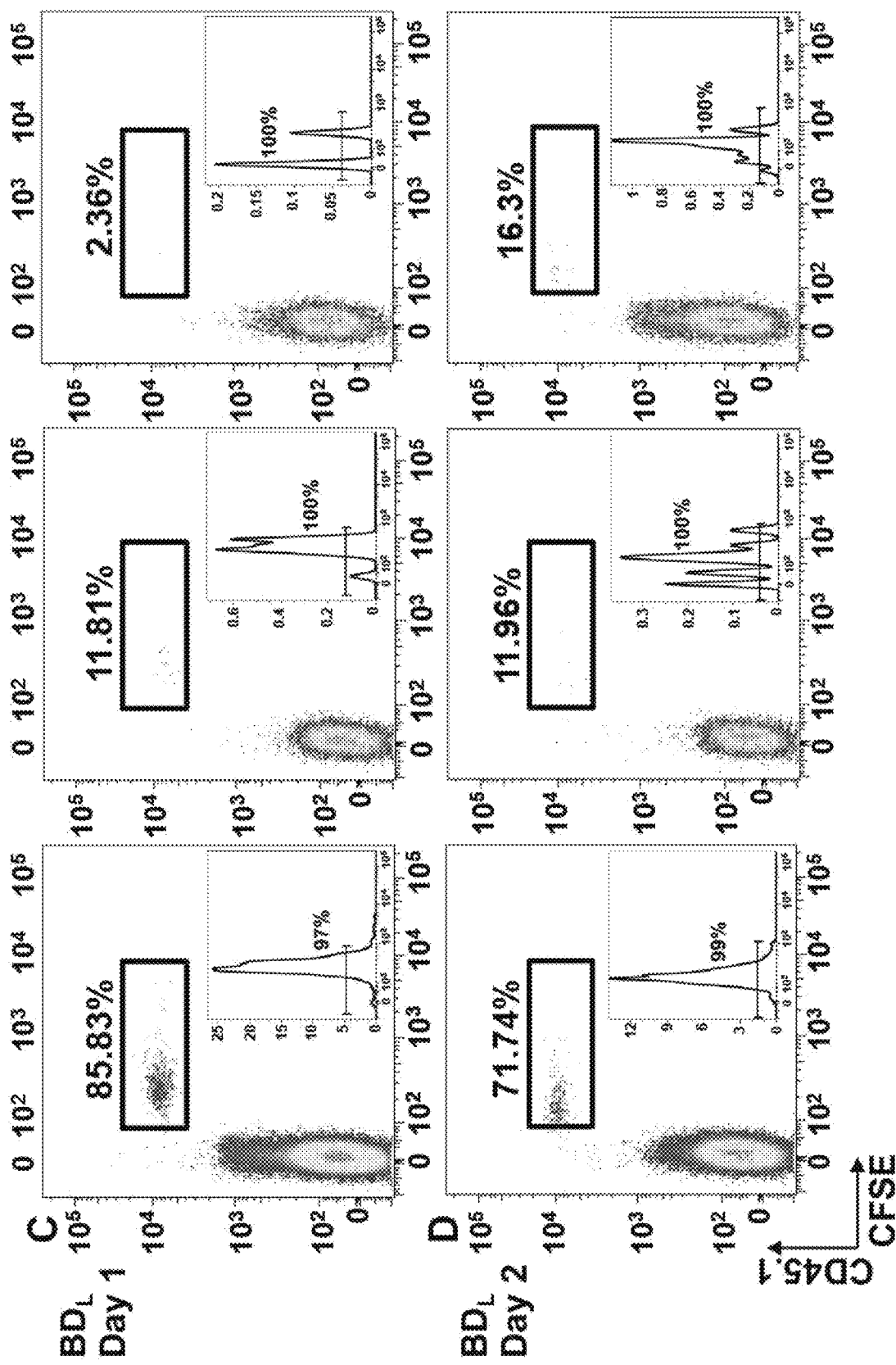
Figure 10:
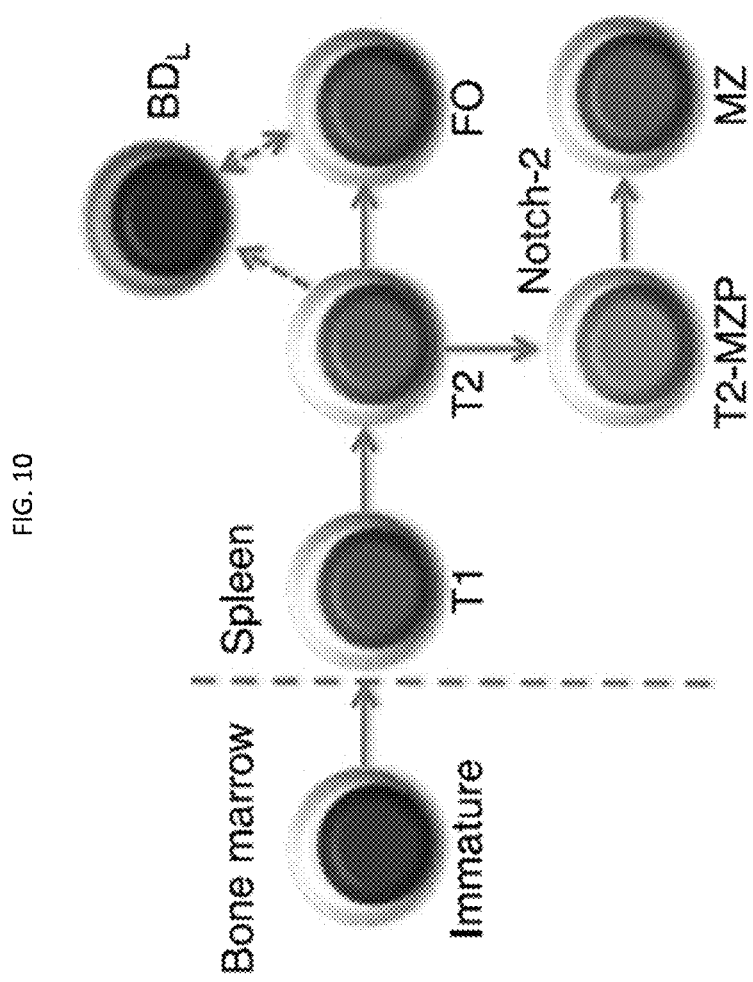
FIG. 10 shows a revised model of B cell differentiation in the spleen including the BD$_L$ subset. Currently, it is thought that immature B cells exit the BM and enter the spleen where they undergo sequential differentiation into T1 then T2, which differentiate into either FO B cells or T2-MZP that upon Notch-2 signaling further differentiate into MZ B cells. BD$_L$ are a new mature B cell subset that differentiates directly from the T2 stage. Alternatively, BD$_L$ could be a subset of FO B cells or differentiate from the FO stage.

Adoptive transfer studies demonstrate that a stable $BD_L$ phenotype does exist (FIG. 6-8). However, their relationship to FO B cells is not clear. $BD_L$ could directly differentiate into FO B cells, but we do not favor that hypothesis because the kinetics of the developmental studies show that both subsets emerge simultaneously (FIG. 6A,B). In addition, $BD_L$ may be a subset of FO B cells, but because we have never found a situation in which FO B cells induce Treg proliferation they are a functionally distinct subset. FIG. 10 depicts a revised model of B cell development including $BD_L$. As with other mature B cells, $BD_L$ are endowed with a unique function whereby they play an essential role in tolerance. To that end, we previously showed that total B cell depletion led to a break in tolerance as indicated by reduced numbers of Treg and the onset of spontaneous EAE in MBP-TCR transgenic mice and acceleration of colitis onset in $Il10^{-/-}$ mice[3]. Here, we demonstrate that $BD_L$ induction of Treg expansion is also important for the resolution of CHS (FIG. 3F). Further support for a role for $BD_L$ in regulating disease severity is a recent paper demonstrating that B cells via a GITRL-dependent manner induced Treg expansion that suppressed Friend's virus-specific antibody responses in turn attenuating the magnitude of the germinal center response[49]. These cumulative results provide support for $BD_L$ maintenance of Treg homeostasis being a broadly utilized mechanism in disease.

Because $BD_L$ play an essential role in the maintenance of immunological tolerance they are clinically relevant. In autoimmunity, they could be potentially harnessed to increase Treg numbers[50]. Conversely, a reduction in $BD_L$ thereby decreasing Treg numbers could promote immune responses to clear cancer[51]. Using $IgD^{low/-}$ as the marker of $BD_L$, we have been able to demonstrate the presence of $BD_L$ in humans (FIG. 9). The ability to identify $BD_L$ in the peripheral blood will allow their tracking in disease. The importance of B cells in a variety of diseases has become evident with antibody-based therapeutics to deplete B cells. In MS, B cell depletion with rituximab, an anti-CD20 mAb, has demonstrated efficacy[52,53]. As with mouse, human IgG subclasses also exhibit differential cell depleting activity and are organized into two groups. Type I lead to CD20 redistribution into lipid rafts triggering complement-dependent cytotoxicity[54,55]. Type II trigger homotypic adhesion and lysosomal nonapoptotic cell death[56-58]. Rituximab is a type I antibody and thus would be predicted to spare some populations of B cells[56]. New generation type II anti-CD20 antibodies with increased cytotoxicity have been developed thereby enhancing B cell depletion[59,60]. It is not known whether $BD_L$ are refractory to depletion by anti-CD20 type I and/or II mAb. If $BD_L$ are differentially depleted by anti-CD20 therapeutics, an intriguing concept would be to tailor their use such that Treg numbers are either maintained or reduced depending on the specific disease.

In this study, we provide evidence for the existence of $BD_L$ whose unique effector function is the maintenance of immune tolerance by promoting the homeostatic expansion of Treg in a GITRL-dependent manner. Our findings are an important first step in determining the therapeutic potential of $BD_L$.

Methods

Mice. B10.PL, C57BL/6J (CD45.2), B6.129S2-Ighm$^{tm1Cgn}$/J (C57BL/6μMT), B6N(Cg)-Tnfsf18$^{tm1.1(KOMP)Vlcg}$/J (GITRL$^{-/-}$) and B6.SJL-Ptprc$^a$ Pep$^b$/BoyJ (CD45.1) mice were purchased from The Jackson Laboratory (Bar Harbor, ME). MBP-TCR transgenic mice and generation of Foxp3$^{EGFP}$, μMT and Il10$^{-/-}$ mice on the B10.PL (H-2$^u$) background was previously described[1,3,61]. MBP-TCR transgenic mice were genotyped by PCR using the following primers: Forward-5'-TGC AGT ATC CCG GAG AAG GG-3' (SEQ ID NO:3); Reverse-5'-TTC TCA TTT CCA TAG TTC TCA C-3' (SEQ ID NO:4). Notch2$^{fl/fl}$CD19cre$^-$ and Notch2$^{fl/fl}$CD19cre$^+$ mice were kindly provided by Dr. Shigeru Chiba, Tokyo University, Japan and Dr. Maeda Takahiro, Beckman Research of the City of Hope, CA[16]. Mice were housed and bred at the animal facility of the Medical College of Wisconsin (MCW) and animal protocols using all relevant ethical regulations were approved by the MCW Institutional Animal Care and Use Committee. All experiments were carried out with mice that were age- and sex-matched utilizing both genders.

B cell depletion in vivo. Anti-mouse-CD20 mAb (18B12IgG1) and its corresponding isotype control (2B8 msIgG1) were provided by Biogen Inc. 250 g of antibody was i.v. injected into mice, once, or twice, 14 days apart.

Peptide and antibodies. MBP Ac$_{1-11}$ peptide (Ac-ASQKRPSQRSK (SEQ ID NO:5)) was generated by the Protein Core Laboratory of the Blood Research Institute, Versiti Wisconsin. The 2.4G2 hybridoma was obtained from American Tissue Culture Collection. Commercial antibodies utilized in this study are described in Table 1.

TABLE 1

Commercial Antibodies Utilized

| Antibody[1] | Specificity[2] | Source[3] | Catalog[4] | Dilution[5] |
|---|---|---|---|---|
| B220-PE/CF594 | Mouse | BD Biosciences | 562290 | 1:100 |
| GITRL-Alexa Fluor 647 | Mouse | BD Biosciences | 563542 | 1:100 |
| GITRL-Purified | Mouse | Biolegend | 120302 | 1:100 |
| B220-Alexa Fluor 700 | Mouse/Human | Biolegend | 103232 | 1:100 |
| IgM-PE Dazzle 594 | Mouse | Biolegend | 406529 | 1:100 |
| IgD-PE | Mouse | Biolegend | 405705 | 1:100 |
| IgD-Alexa Fluor 488 | Mouse | Biolegend | 405717 | 1:100 |
| CD45.1-Alexa Fluor 647 | Mouse | Biolegend | 110720 | 1:100 |
| Ki-67-APC | Mouse | Biolegend | 652405 | 1:200 |
| CD36-APC | Mouse | Biolegend | 102611 | 1:100 |
| CD5-PE/Cy5 | Mouse | Biolegend | 100609 | 1:100 |
| CD20-APC | Mouse | Biolegend | 150411 | 1:100 |
| CD365 (Tim-1)-PE | Mouse | Biolegend | 119505 | 1:100 |
| CD1d-APC | Mouse | Biolegend | 123521 | 1:100 |
| CD9-Alexa Fluor 647 | Mouse | Biolegend | 124809 | 1:100 |
| CD3-Brilliant Violet 421 | Mouse | Biolegend | 100228 | 1:100 |
| CD43-PE | Mouse | Biolegend | 121207 | 1:100 |
| CD38-AF647 | Mouse | Biolegend | 102716 | 1:100 |
| F4/80-PE/Cy5 | Mouse | Biolegend | 123112 | 1:100 |
| NK1.1-APC | Mouse | Biolegend | 108709 | 1:100 |
| CD40-PE | Mouse | Biolegend | 102805 | 1:100 |
| CD86-PE | Mouse | Biolegend | 105007 | 1:100 |
| Ly6C-APC | Mouse | Biolegend | 105007 | 1:100 |
| TCR-β-FITC | Mouse | eBioscience | 11-5961-82 | 1:100 |
| CD21-eFluor 450 | Mouse | eBioscience | 48-0212-82 | 1:100 |
| CD23-PE/Cy7 | Mouse | eBioscience | 25-0232-82 | 1:100 |
| CD93-PE | Mouse | eBioscience | 12-5892-82 | 1:100 |
| CD80-PE/Cy5 | Mouse | eBioscience | 15-0801-82 | 1:100 |
| IgD-FITC | Mouse | eBioscience | 11-5993-85 | 1:100 |
| IgM-APC | Mouse | eBioscience | 17-5790-82 | 1:100 |

TABLE 1-continued

Commercial Antibodies Utilized

| Antibody[1] | Specificity[2] | Source[3] | Catalog[4] | Dilution[5] |
|---|---|---|---|---|
| CD4-FITC | Mouse | eBioscience | 11-0041-85 | 1:100 |
| Foxp3-PE | Mouse | eBioscience | 12-5773-80 | 1:100 |
| CD209b (SIGN-R1)-APC | Mouse | eBioscience | 17-2093-80 | 1:100 |
| CD25-APC | Mouse | Caltag | RM6005 | 1:100 |
| CD4-APC/Cy7 | Human | Biolegend | 317417 | 1:100 |
| CD19-PerCP/Cy5.5 | Human | Biolegend | 302229 | 1:100 |
| CD20-AF700 | Human | Biolegend | 302322 | 1:100 |
| CD24-PE/Cy7 | Human | Biolegend | 311119 | 1:100 |
| IgD-Brilliant Violet 421 | Human | Biolegend | 348225 | 1:100 |
| CD25-PE | Human | Biolegend | 356103 | 1:100 |
| CD3 | Human | Biolegend | 317303 | 1:100 |
| CD28 | Human | Biolegend | 302913 | 1:100 |

[1]Antibody specificity and fluorochrome
[2]Species specificity of the antibody
[3]BD Biosciences, San Diego, CA; Biolegend, San Diego, CA; eBioscience, San Diego, CA; Caltag Laboratories, Burlingame, CA
[4]Catalog number of the antibody
[5]Dilution used of the stock vial of antibody Flow cytometry and FACS purification. Single cell suspensions from mouse and human spleens or human peripheral blood were obtained, counted and $0.2-1\times10^6$ cells were cell surface stained with specific antibodies. Frozen human splenocytes were thawed and washed twice prior to staining. Intracellular Foxp3, IgD and IgM staining was performed using the anti-mouse/rat Foxp3-PE staining kit from eBioscience using anti-Foxp3, -IgD or -IgM in the final step (San Diego, CA) per manufacturer instructions. Cells were acquired on a LSRII flow cytometer (BD Biosciences, San Diego, CA) and data were analyzed using FlowJo software (Tree Star, Inc., Ashland, OR). Fluorochrome labeled and/or EGFP expressing cells were sorted using a FACSAria cell-sorter (BD Biosciences, San Diego, CA).

Histolological analysis. Frozen section (6 M) of spleens from B10.PL mice treated with 250 μg anti-CD20 antibody (18B12IgG1) or isotype control (2B8msIgG1) were fixed with acetone for 10 minutes. The fixed splenic sections then were stained with anti-mouse IgM-PE-Dazzle 594, IgD-Alex Fluor 488, anti-mouse CD3-Brilliant Violet 421 and anti-mouse CD209b (SIGN-R1)-APC and images were captured with Olympus VS120 fluorescent microscope at 80× magnification.

EAE induction. EAE was induced by the i.v. adoptive transfer of $1\times10^6$ MBP-specific encephalitogenic T cells activated in vitro with MBP $Ac_{1-11}$ peptide into sublethally irradiated (360-380 rad) mice as described[2,35]. Clinical symptoms of EAE were scored daily as follows: 0, no disease; 1, limp tail; 1.5, hind limb ataxia; 2, hind limb paresis; 2.5, partial hind limb paralysis; 3, total hind limb paralysis; 4, hind and fore limb paralysis; and 5, death.

Sorting and adoptive transfer of B cells. Total splenic B cells from 8-10 wk old mice were purified by negative selection using magnetic cell sorting (STEMCELL Technologies, Vancouver, BC, Canada) followed by FACS purification of FO (B220$^+$IgM$^+$ CD21$^{int}$CD23$^+$ CD93$^-$) or MZ (B220$^+$IgM$^{hi}$CD21$^{hi}$CD23$^-$ CD93$^-$) from anti-CD20-depleted mice or FO (IgD$^{hi}$), MZ, BD$_L$ (B220$^+$IgM$^+$ CD21$^{int}$CD23$^+$ CD93$^-$ IgD$^{low/-}$), or T2 (B220$^+$IgM$^{hi}$CD21$^{low/-}$ CD23$^+$ CD93$^+$) from WT or Tnfsf18$^{-/-}$ mice. B cell purities were ~99% as determined by flow cytometry. For some experiments FACS purified Bells were incubated with anti-mouse GITRL (10 g/ml) at 4° C. for 60 min for GITRL blocking. B cells were washed in PBS and $5-20\times10^6$ cells were i.v. injected into each recipient mouse. EAE or CHS challenge was induced three days later or splenic CD4$^+$Foxp3$^+$ cells were enumerated on day ten. For CHS, B cells were transferred one day after sensitization. We have found that BD$_L$ functional activity is equivalent on both the B10.PL and C57BL/6 backgrounds, and thus both strains were utilized in the studies described.

Induction of CHS. C57BL/6 mice were sensitized by epicutaneous application of 100 μL 3% (wt/vol) oxazolone (4-ethoxymethylene-2-phenyl-2-oxazolin-5-one) (Sigma-Aldrich, St. Louis, MO) in an acetone:ethanol mixture (1:3 v/v) to shaved abdominal skin. After 4 days, ear thickness was measured using a micrometer. Mice were then challenged by application of 10 μL 1% (wt/vol) oxazolone in an acetone:olive oil mixture (1:1 v/v) to both sides of the ears and ear thickness was measured every 24 hr for five days.

RNA sequencing and PC analysis. Total RNA was isolated from sorted B cells using RNAqueous®-4PCR kit (Ambion, Austin, Tx). RNA sequencing was performed by PerkinElmer (Waltham, MA) using the TruSeq stranded mRNA kit (Illumina, San Diego, CA) on an Illumina HiSeq2500, running HiSeq Control Software V2.2.68 & Real-time Analysis (RTA) software V1.18.66.3. Basecall files (*.bcl) generated by the Illumina instruments were de-multiplexed and converted to fastq.gz format using bcl2Fastq v1.8.2, one file per direction, 2 files per sample. For samples that were sequenced on multiple lanes and/or multiple flow cells, resulting fastq.gz files were concatenated into single file sets. The raw fastq files were then mapped to the whole mouse genome build mm9 using Tophat v2.1.0 with parameters --no-novel-juncs--no-coverage-search. Cufflinks was used to estimate the transcript abundance in Fragments Per Kilobase of exon model per Million mapped fragments (FPKM). The average FPKM was calculated for each sample and log 2FPKM was used for PC analysis. Differential expression analysis was conducted with Cuffdiff[62] to calculate the most differentially expressed significant genes based on a Benjamini-Hochberg adjusted p-value<0.05 an absolute fold change of 2 or greater. All significantly differentially expressed genes (log 2 fold change<-1 or >1; adjusted p-value<0.05) were ordered by descending fold change for gene set overrepresentation analysis. This gene list was submitted to g:Profiler version r1741_e90_eg37[63] as an ordered query to identify overrepresented terms and pathways within the Gene Ontology[64,65] biological process and KEGG[66,67] databases.

B cell development assays. C57BL/6 mice were sublethally irradiated (500 rad) and on days 11, 13, 15, 17, 19, 21 and 24 the absolute number of splenic T2, FO and $BD_L$ was determined by flow cytometry. C57BL/6 mice were lethally irradiated (950 rad) and transplanted with $5 \times 10^6$ total BM cells from C57BL/6J CD45.1 mice. C57BL/6J CD45.1 mice were sublethally irradiated (500 rad) and 15 days later splenic T2 B cells were FACS purified and labeled with carboxyfluorescein diacetate, succinimidyl ester (CFSE) (Invitrogen, Carlsbad, CA) prior to adoptive transfer ($1.25 \times 10^6$) into C57BL/6J CD45.2 recipient mice. Donor (CD45.1$^+$CFSE$^+$) T2, FO and $BD_L$ were quantitated 24 and 48 hr post-transfer. C57BL/6J mice were sublethally irradiated (500 rad) and on days 11 post-irradiation, they were adoptively transferred CFSE labeled FO or $BD_L$ ($1.5 \times 10^6$) from C57BL/6J CD45.1 donor mice. Donor (CD45.1$^+$ CFSE) FO and $BD_L$ were quantitated 24 and 48 hr post-transfer.

Isolation of human splenocytes and peripheral blood mononuclear cells. Human splenic tissue was obtained from the Wisconsin Donor Network and Tissue Bank, Versiti Wisconsin (Milwaukee, WI) through written informed consent and approved by the Institutional Review Board (IRB) of Versiti Wisconsin as non-human subject research. Portions of human splenic tissue were digested with collagenase D (1 mg/mL) (Roche) for 1 hr followed by dissociation using gentleMACS™ C tubes in combination with the gentleMACS Dissociator (Miltenyi Biotec, San Diego, CA)[68,69]. Red blood cells were lysed with RBC lysis buffer (eBioscience) and lymphocytes were further purified using 60% percoll (Sigma, St. Louis, MO). Cells were washed and stored frozen in liquid nitrogen. Peripheral blood lymphocytes were isolated from buffy coats obtained from Versiti Wisconsin from healthy donors in a non-human subject research manner. Buffy coats were diluted 2× with PBS and lymphocytes were separated using a 60% percoll gradient.

In vitro co-culture of human B cells and Treg. B cells, APC (CD19$^-$ CD3$^-$) and CD4$^+$ CD25$^{hi}$ Tregs were FACS purified from human splenocytes or peripheral blood from the same donor. The sorted Tregs were labeled with 3 M CFSE and cultured alone ($0.5 \times 10^5$) or with sorted B cells ($1 \times 10^5$) in the presence of anti-CD3 (OKT3) (2 µg/ml) and irradiated (3000 rad) APC or in the presence of plate-bound anti-CD3 (10 mg/ml) and anti-CD28 (10 mg/ml). After 96 hr the cells were stained with CD4, CD25 and DAPI (Thermo Fisher Scientific, Waltham, MA) and proliferation of Treg were determined by dye dilution by flow cytometry[3].

Statistical analysis. Data were analyzed using GraphPad prism (San Diego, CA) and were presented as mean±SEM. Statistical significance was determined using the unpaired t-test. p-values<0.05 were considered significant.

REFERENCES

1 Wolf, S. D., Dittel, B. N., Hardardottir, F. & Janeway, C. A., Jr. Experimental autoimmune encephalomyelitis induction in genetically B cell-deficient mice. *J. Exp. Med.* 184, 2271-2278 (1996).
2 Mann, M. K., Maresz, K., Shriver, L. P., Tan, Y. & Dittel, B. N. B cell regulation of CD4+CD25+T regulatory cells and IL-10 via B7 is essential for recovery from experimental autoimmune encephalomyelitis. *J. Immunol.* 178, 3447-3456 (2007).
3 Ray, A., Basu, S., Williams, C. B., Salzman, N. H. & Dittel, B. N. A novel IL-10-independent regulatory role for B cells in suppressing autoimmunity by maintenance of regulatory T cells via GITR ligand. *J. Immunol.* 188, 3188-3198 (2012).
4 Fillatreau, S., Sweenie, C. H., McGeachy, M. J., Gray, D. & Anderton, S. M. B cells regulate autoimmunity by provision of IL-10. *Nat. Immunol.* 3, 944-950 (2002).
5. Tedder, T. F. B10 cells: a functionally defined regulatory B cell subset. *J. Immunol.* 194, 1395-1401 (2015).
6 Ray, A. & Dittel, B. N. Mechanisms of Regulatory B cell Function in Autoimmune and Inflammatory Diseases beyond IL-10. *J. Clin. Med.* 6, doi:10.3390/jcm6010012 (2017).
7 Ray, A., Mann, M. K., Basu, S. & Dittel, B. N. A case for regulatory B cells in controlling the severity of autoimmune-mediated inflammation in experimental autoimmune encephalomyelitis and multiple sclerosis. *J. Neuroimmunol.* 230, 1-9 (2010).
8 Mauri, C. & Menon, M. Human regulatory B cells in health and disease: therapeutic potential. *J. Clin. Invest.* 127, 772-779 (2017).
9 Rudensky, A. Y. Regulatory T cells and Foxp3i. *Immunol. Rev.* 241, 260-268 (2011).
10 Liao, G. et al. GITR engagement preferentially enhances proliferation of functionally competent CD4+CD25+ FoxP3+ regulatory T cells. *Int. Immunol.* 22, 259-270 (2010).
11 Ronchetti, S. et al. Glucocorticoid-induced tumour necrosis factor receptor-related protein: a key marker of functional regulatory T cells. *J. Immunol. Res.* 2015, 171520, doi:10.1155/2015/171520 (2015).
12 Zhang, A. H., Skupsky, J. & Scott, D. W. Effect of B-cell depletion using anti-CD20 therapy on inhibitory antibody formation to human FVIII in hemophilia A mice. *Blood* 117, 2223-2226 (2011).
13 Allman, D. et al. Resolution of three nonproliferative immature splenic B cell subsets reveals multiple selection points during peripheral B cell maturation. *J. Immunol.* 167, 6834-6840 (2001).
14 Basu, S., Ray, A. & Dittel, B. N. Cannabinoid receptor 2 is critical for the homing and retention of marginal zone B lineage cells and for efficient T-independent immune responses. *J. Immunol.* 187, 5720-5732 (2011).
Seidel-Guyenot, W., Alt, R., Perschon, S., Knop, J. & Steinbrink, K. B cells are not required for T cell priming in low zone tolerance to contact allergens and contact hypersensitivity. *Eur. J. Immunol.* 34, 3082-3090 (2004).
16 Saito, T. et al. Notch2 is preferentially expressed in mature B cells and indispensable for marginal zone B lineage development. *Immunity* 18, 675-685 (2003).
17 Allman, D. & Pillai, S. Peripheral B cell subsets. *Curr. Opin. Immunol.* 20, 149-157 (2008).
18 Meyer-Bahlburg, A., Andrews, S. F., Yu, K. O., Porcelli, S. A. & Rawlings, D. J. Characterization of a late transitional B cell population highly sensitive to BAFF-mediated homeostatic proliferation. *J. Exp. Med* 205, 155-168 (2008).
19 Barr, T. A. et al. B cell depletion therapy ameliorates autoimmune disease through ablation of IL-6-producing B cells. *J. Exp. Med* 209, 1001-1010 (2012).
20 Loder, F. et al. B cell development in the spleen takes place in discrete steps and is determined by the quality of B cell receptor-derived signals. *J. Exp. Med* 190, 75-89 (1999).
21 Srivastava, B., Quinn, W. J., 3rd, Hazard, K., Erikson, J. & Allman, D. Characterization of marginal zone B cell precursors. *J. Exp. Med* 202, 1225-1234 (2005).

22 Mayer, R. J. et al. CD23 shedding: requirements for substrate recognition and inhibition by dipeptide hydroxamic acids. *Inflamm. Res.* 51, 85-90 (2002).

23 Woodland, R. T. & Schmidt, M. R. Homeostatic proliferation of B cells. *Semin. Immunol.* 17, 209-217 (2005).

24 Katz, S. I., Parker, D. & Turk, J. L. B-cell suppression of delayed hypersensitivity reactions. *Nature* 251, 550-551 (1974).

Gorczynski, R. M. Immunity to murine sarcoma virus-inducted tumors. II. Suppression of T cell-mediated immunity by cells from progressor animals. *J. Immunol.* 112, 1826-1838 (1974).

26 Russell, A. S., Liburd, E. M. & Diener, E. In vitro suppression of cell mediated autoimmunity in NZB mice. *Nature* 249, 43-45 (1974).

27 Mizoguchi, E., Mizoguchi, A., Preffer, F. I. & Bhan, A. K. Regulatory role of mature B cells in a murine model of inflammatory bowel disease. *Int. Immunol.* 12, 597-605 (2000).

28 Mizoguchi, A., Mizoguchi, E., Takedatsu, H., Blumberg, R. S. & Bhan, A. K. Chronic intestinal inflammatory condition generates IL-10-producing regulatory B cell subset characterized by CD1d upregulation. *Immunity* 16, 219-230 (2002).

29 Mauri, C. & Bosma, A. Immune regulatory function of B cells. *Annu. Rev. Immunol.* 30, 221-241 (2012).

30 Rosser, E. C. & Mauri, C. Regulatory B cells: origin, phenotype, and function. *Immunity* 42, 607-612 (2015).

31 Heine, G. et al. Autocrine IL-10 promotes human B-cell differentiation into IgM- or IgG-secreting plasmablasts. *Eur. J. Immunol.* 44, 1615-1621 (2014).

32 Barr, T. A., Brown, S., Ryan, G., Zhao, J. & Gray, D. TLR-mediated stimulation of APC: Distinct cytokine responses of B cells and dendritic cells. *Eur. J. Immunol.* 37, 3040-3053 (2007).

33 Lino, A. C. et al. LAG-3 Inhibitory Receptor Expression Identifies Immunosuppressive Natural Regulatory Plasma Cells. *Immunity* 49, 120-133 e129 (2018).

34 Blair, P. A. et al. CD19(+)CD24(hi)CD38(hi) B cells exhibit regulatory capacity in healthy individuals but are functionally impaired in systemic Lupus Erythematosus patients. *Immunity* 32, 129-140 (2010).

35 Dittel, B. N., Merchant, R. M. & Janeway, C. A., Jr. Evidence for Fas-dependent and Fas-independent mechanisms in the pathogenesis of experimental autoimmune encephalomyelitis. *J. Immunol.* 162, 6392-6400 (1999).

36 Pescovitz, M. D. Rituximab, an anti-cd20 monoclonal antibody: history and mechanism of action. *Am. J. Transplant* 6, 859-866 (2006).

37 Clark, E. A. & Ledbetter, J. A. How does B cell depletion therapy work, and how can it be improved?*Ann. Rheum. Dis.* 64 Suppl 4, iv77-80, doi:10.1136/ard.2005.042507 (2005).

38 Weiner, G. J. Rituximab: mechanism of action. *Semin. Hematol.* 47, 115-123 (2010).

39 Bruhns, P. & Jonsson, F. Mouse and human FcR effector functions. *Immunol. Rev.* 268, 25-51 (2015).

Geisberger, R., Lamers, M. & Achatz, G. The riddle of the dual expression of IgM and IgD. *Immunology* 118, 429-437 (2006).

41 Lykken, J. M. et al. Acute and chronic B cell depletion disrupts CD4+ and CD8+ T cell homeostasis and expansion during acute viral infection in mice. *J. Immunol.* 193, 746-756 (2014).

42 Kobayashi, M. et al. Functional B-1 progenitor cells are present in the hematopoietic stem cell-deficient embryo and depend on Cbfbeta for their development. *Proc. Natl. Acad. Sci. USA* 111, 12151-12156 (2014).

43 Ghosn, E. E. et al. Distinct B-cell lineage commitment distinguishes adult bone marrow hematopoietic stem cells. *Proc. Natl. Acad. Sci. USA* 109, 5394-5398 (2012).

44 Zhang, X. Regulatory functions of innate-like B cells. *Cell. Mol. Immunol.* 10, 113-121 (2013).

Savage, H. P. & Baumgarth, N. Characteristics of natural antibody-secreting cells. *Ann. N.Y. Acad. Sci.* 1362, 132-142 (2015).

46 Cunningham, A. F. et al. B1b cells recognize protective antigens after natural infection and vaccination. *Front. Immunol.* 5, 535, doi:10.3389/fimmu.2014.00535 (2014).

47 Pillai, S., Cariappa, A. & Moran, S. T. Marginal zone B cells. *Annu. Rev. Immunol.* 23, 161-196 (2005).

48 Zhang, Y., Garcia-Ibanez, L. & Toellner, K. M. Regulation of germinal center B-cell differentiation. *Immunol. Rev.* 270, 8-19 (2016).

49 Moore, T. C., Gonzaga, L. M., Mather, J. M., Messer, R. J. & Hasenkrug, K. J. B Cell Requirement for Robust Regulatory T Cell Responses to Friend Retrovirus Infection. *MBio.* 8, doi:10.1128/mBio.01122-17 (2017).

50 Arellano, B., Graber, D. J. & Sentman, C. L. Regulatory T cell-based therapies for autoimmunity. *Discov. Med.* 22, 73-80 (2016).

51 Takeuchi, Y. & Nishikawa, H. Roles of regulatory T cells in cancer immunity. *Int. Immunol.* 28, 401-409 (2016).

52 Naismith, R. T. et al. Rituximab add-on therapy for breakthrough relapsing multiple sclerosis: a 52-week phase II trial. *Neurology* 74, 1860-1867 (2010).

53 Bar-Or, A. et al. Rituximab in relapsing-remitting multiple sclerosis: a 72-week, open-label, phase I trial. *Ann. Neurol.* 63, 395-400 (2008).

54 Tipton, T. R. et al. Antigenic modulation limits the effector cell mechanisms employed by type I anti-CD20 monoclonal antibodies. *Blood* 125, 1901-1909 (2015).

55 Beers, S. A. et al. Antigenic modulation limits the efficacy of anti-CD20 antibodies: implications for antibody selection. *Blood* 115, 5191-5201 (2010).

56 Beers, S. A. et al. Type II (tositumomab) anti-CD20 monoclonal antibody out performs type I (rituximab-like) reagents in B-cell depletion regardless of complement activation. *Blood* 112, 4170-4177 (2008).

57 Ivanov, A. et al. Monoclonal antibodies directed to CD20 and HLA-DR can elicit homotypic adhesion followed by lysosome-mediated cell death in human lymphoma and leukemia cells. *J. Clin. Invest.* 119, 2143-2159 (2009).

58 Alduaij, W. et al. Novel type II anti-CD20 monoclonal antibody (GA101) evokes homotypic adhesion and actin-dependent, lysosome-mediated cell death in B-cell malignancies. *Blood* 117, 4519-4529 (2011).

59 Lim, S. H. et al. Anti-CD20 monoclonal antibodies: historical and future perspectives. *Haematologica* 95, 135-143 (2010).

60 Bologna, L. et al. Mechanism of action of type II, glycoengineered, anti-CD20 monoclonal antibody GA101 in B-chronic lymphocytic leukemia whole blood assays in comparison with rituximab and alemtuzumab. *J. Immunol.* 186, 3762-3769 (2011).

61 Ray, A. et al. Gut Microbial Dysbiosis Due to *Helicobacter* Drives an Increase in Marginal Zone B Cells in the Absence of IL-10 Signaling in Macrophages. *J. Immunol.* 195, 3071-3085 (2015).

62 Trapnell, C. et al. Differential analysis of gene regulation at transcript resolution with RNA-seq. *Nat. Biotechnol.* 31, 46-53 (2013).

63 Reimand, J. et al. g:Profiler-a web server for functional interpretation of gene lists (2016 update). *Nucleic Acids Res.* 44, W83-89 (2016).
64 Ashburner, M. et al. Gene ontology: tool for the unification of biology. The Gene Ontology Consortium. *Nat. Genet.* 25, 25-29 (2000).
65 The Gene Ontology, C. Expansion of the Gene Ontology knowledgebase and resources. *Nucleic Acids Res.* 45, D331-D338 (2017).
66 Kanehisa, M. & Goto, S. KEGG: kyoto encyclopedia of genes and genomes. *Nucleic Acids Res.* 28, 27-30 (2000).
67 Kanehisa, M., Furumichi, M., Tanabe, M., Sato, Y. & Morishima, K. KEGG: new perspectives on genomes, pathways, diseases and drugs. *Nucleic Acids Res.* 45, D353-D361 (2017).
68 Thome, J. J. et al. Spatial map of human T cell compartmentalization and maintenance over decades of life. *Cell* 159, 814-828 (2014).
69 Meng, W. et al. An atlas of B-cell clonal distribution in the human body. *Nat. Biotechnol.* 35, 879-884 (2017).

What is claimed is:

1. A method for treating an autoimmune disease or an inflammatory condition in a subject in need thereof comprising:

Administering to the subject in need thereof a therapeutically effective amount of glucocorticoid-induced tumor necrosis factor receptor ligand positive (GITRL$^+$), immunoglobulin D low (IgD$^{low}$), CCR7$^+$, CXCR5$^+$ B cells.

2. The method of claim 1, wherein administration of the GITRL$^+$ IgD$^{low}$ B cells stimulates proliferation of CD4$^+$ Foxp3$^+$ T regulatory cells.

3. The method of claim 1, wherein the B cells are GITRL$^+$ IgD$^{low}$ CCR7$^+$ CXCR5$^+$ CD23$^+$ CD24$^-$ B cells.

4. The method of claim 1, wherein the B cells are administered using adoptive cell transfer.

5. The method of claim 1, wherein the B cells are administered by infusion.

6. The method of claim 1, wherein the autoimmune disease or inflammatory condition is selected from the group consisting of multiple sclerosis, Guillian-Barré syndrome, autism, thyroiditis, Hashimoto's disease, Graves' disease, rheumatoid arthritis, ankylosing spondylitis, polymyalgia rheumatica, psoriasis, vitiligo, eczema, scleroderma, fibromyalgia, Wegener's granulomatosis, peripheral neuropathy, diabetic neuropathy, celiac disease, Crohn's disease, ulcerative colitis, type I diabetes, leukemia, lupus erythematosus, and hemolytic dysglycemia.

7. The method of claim 1, wherein the B cell is an engineered B cell that comprises a suicide gene selected from the group consisting of Herpes simplex virus thymidine kinase (HSV-TK), human inducible caspase 9 (icasp9), mutant human thymidylate kinase (mtmpk), and human CD20.

8. The method of claim 1, wherein the B cell is derived from a chronic lymphocytic leukemia cell line.

9. The method of claim 1, wherein the B cell does not express β 2-microglobulin.

10. The method of claim 1, wherein the B cell does not express class II major histocompatibility complex transactivator (CIITA).

11. The method of claim 1, wherein the autoimmune disease or inflammatory condition is multiple sclerosis.

* * * * *

SEQUENCE LISTING

```
<160> NUMBER OF SEQ ID NOS: 5

<210> SEQ ID NO 1
<211> LENGTH: 23
<212> TYPE: DNA
<213> ORGANISM: Artificial Sequence
<220> FEATURE:
<223> OTHER INFORMATION: synthetic

<400> SEQUENCE: 1
tagtccttcc taccccaatt tcc                                              23

<210> SEQ ID NO 2
<211> LENGTH: 21
<212> TYPE: DNA
<213> ORGANISM: Artificial Sequence
<220> FEATURE:
<223> OTHER INFORMATION: synthetic

<400> SEQUENCE: 2
ttggtcctta gccactcctt c                                                21

<210> SEQ ID NO 3
<211> LENGTH: 20
<212> TYPE: DNA
<213> ORGANISM: Artificial Sequence
<220> FEATURE:
<223> OTHER INFORMATION: synthetic

<400> SEQUENCE: 3
tgcagtatcc cggagaaggg                                                  20

<210> SEQ ID NO 4
<211> LENGTH: 22
<212> TYPE: DNA
<213> ORGANISM: Artificial Sequence
<220> FEATURE:
<223> OTHER INFORMATION: synthetic

<400> SEQUENCE: 4
ttctcatttc catagttctc ac                                               22

<210> SEQ ID NO 5
<211> LENGTH: 11
<212> TYPE: PRT
<213> ORGANISM: Artificial Sequence
<220> FEATURE:
<223> OTHER INFORMATION: synthetic

<400> SEQUENCE: 5

Ala Ser Gln Lys Arg Pro Ser Gln Arg Ser Lys
1               5                   10
```